United States Patent
Naidoo et al.

(10) Patent No.: US 11,216,159 B2
(45) Date of Patent: Jan. 4, 2022

(54) CONFIGURATION ELEMENT FOR GRAPHIC ELEMENTS

(71) Applicant: FISHER-ROSEMOUNT SYSTEMS, INC., Round Rock, TX (US)

(72) Inventors: Julian K. Naidoo, Cedar Park, TX (US); Daniel R. Strinden, Austin, TX (US); Robert B. Havekost, Austin, TX (US); Stephen G. Hammack, Austin, TX (US); Stephen C. Gilbert, Austin, TX (US); Matthew Joseph Sullivan, Austin, TX (US); Larry O. Jundt, Round Rock, TX (US); Roberta Coffman, Austin, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 15/722,463

(22) Filed: Oct. 2, 2017

(65) Prior Publication Data
US 2018/0046339 A1    Feb. 15, 2018

Related U.S. Application Data

(63) Continuation-in-part of application No. 15/692,450, filed on Aug. 31, 2017, now Pat. No. 10,691,311,
(Continued)

(51) Int. Cl.
| | | |
|---|---|---|
| G06F 3/0484 | (2013.01) | |
| G05B 19/418 | (2006.01) | |
| G05B 15/02 | (2006.01) | |

(52) U.S. Cl.
CPC .......... G06F 3/0484 (2013.01); G05B 15/02 (2013.01); G05B 19/4188 (2013.01);
(Continued)

(58) Field of Classification Search
CPC ... G06F 3/0484; G06F 17/50; G05B 19/4188; G05B 15/02; G05B 2219/31467;
(Continued)

(56) References Cited

U.S. PATENT DOCUMENTS 5,241,624 A    8/1993   Torres
5,564,007 A    10/1996  Kazen-Goudarzi et al.
(Continued)

FOREIGN PATENT DOCUMENTS

CN    1313966 A    9/2001
CN    1702582 A    11/2005
(Continued)

OTHER PUBLICATIONS

Notice of Reasons for Rejection for Japanese Application No. 2015-536840, dated Jan. 9, 2018.
(Continued)

*Primary Examiner* — Charles R Kasenge
(74) *Attorney, Agent, or Firm* — Marshall, Gerstein & Borun LLP

(57) ABSTRACT

A configuration element is presented on a configuration display view for configuring a graphic element object. The graphic element object is to be instantiated on a process control display view, and corresponds to a process entity in a process plant. The configuration element object has a set of properties for an attributed of the graphic element object and includes a link to a configuration display object from which the configuration display view is instantiated. The instantiation of the configuration element object includes a visual representation of the set of properties for the attribute of the graphic element object, and a link to the graphic element object to send data corresponding to a property configured in the configuration element from the set of
(Continued)

properties. The configured property corresponds to at least one configured attribute of the graphic element.

31 Claims, 15 Drawing Sheets

Related U.S. Application Data which is a continuation of application No. 14/048,516, filed on Oct. 8, 2013, now Pat. No. 9,792,004.

(60) Provisional application No. 61/711,105, filed on Oct. 8, 2012, provisional application No. 61/711,110, filed on Oct. 8, 2012.

(52) U.S. Cl.
CPC ........... *G05B 2219/25067* (2013.01); *G05B 2219/31418* (2013.01); *G05B 2219/31467* (2013.01); *G05B 2219/31472* (2013.01); *G05B 2219/32128* (2013.01); *Y02P 90/02* (2015.11)

(58) Field of Classification Search
CPC ........... G05B 2219/31418; G05B 2219/32128; G05B 2219/25067; G05B 2219/31472; Y02P 90/18; Y02P 90/24; Y02P 90/22; Y02P 90/16
See application file for complete search history.

(56) References Cited

U.S. PATENT DOCUMENTS

| | | |
|---|---|---|
| 5,777,616 A | 7/1998 | Bates et al. |
| 5,812,394 A | 9/1998 | Lewis et al. |
| 5,950,201 A | 9/1999 | Van Huben et al. |
| 6,014,612 A | 1/2000 | Larson et al. |
| 6,211,877 B1 | 4/2001 | Steele et al. |
| 6,282,175 B1 | 8/2001 | Steele et al. |
| 6,577,323 B1 | 6/2003 | Jamieson et al. |
| 6,839,852 B1 | 1/2005 | Pantuso et al. |
| 6,942,143 B1 | 9/2005 | Iida et al. |
| 6,975,966 B2 | 12/2005 | Scott et al. |
| 6,990,652 B1* | 1/2006 | Parthasarathy ........... G06F 8/34 717/107 |
| 7,010,450 B2 | 3/2006 | Law et al. |
| 7,030,747 B2 | 4/2006 | Scott et al. |
| 7,043,311 B2 | 5/2006 | Nixon et al. |
| 7,089,530 B1 | 8/2006 | Dardinski et al. |
| 7,110,835 B2 | 9/2006 | Blevins et al. |
| 7,117,052 B2 | 10/2006 | Lucas et al. |
| 7,146,231 B2 | 12/2006 | Schleiss et al. |
| 7,237,109 B2 | 6/2007 | Scott et al. |
| 7,272,815 B1 | 9/2007 | Eldridge et al. |
| 7,330,768 B2 | 2/2008 | Scott et al. |
| 7,389,204 B2 | 6/2008 | Eryurek et al. |
| 7,421,458 B1 | 9/2008 | Taylor et al. |
| 7,526,347 B2 | 4/2009 | Lucas et al. |
| 7,647,126 B2 | 1/2010 | Blevins et al. |
| 7,680,546 B2 | 3/2010 | Gilbert et al. |
| 7,729,789 B2* | 6/2010 | Blevins .................. G05B 17/02 700/83 |
| 7,783,370 B2 | 8/2010 | Nixon et al. |
| 7,890,927 B2 | 2/2011 | Eldridge et al. |
| 7,904,821 B1 | 3/2011 | Tertitski et al. |
| 7,984,420 B2 | 7/2011 | Eldridge et al. |
| 8,028,272 B2 | 9/2011 | Eldridge et al. |
| 8,028,275 B2 | 9/2011 | Eldridge et al. |
| 8,060,222 B2 | 11/2011 | Eldridge et al. |
| 8,065,131 B2* | 11/2011 | McDonald ............. G05B 17/02 703/18 |
| 8,065,202 B1 | 11/2011 | Ballaro et al. |
| 8,127,060 B2 | 2/2012 | Doll et al. |
| 8,127,241 B2* | 2/2012 | Blevins ............. G05B 19/41885 715/771 |
| 8,135,481 B2* | 3/2012 | Blevins .................. G05B 17/02 700/51 |
| 8,225,271 B2 | 7/2012 | Eldridge et al. |
| 8,229,579 B2 | 7/2012 | Eldridge et al. |
| 8,368,640 B2 | 2/2013 | Dardinski et al. |
| 8,473,917 B2 | 6/2013 | Weatherhead et al. |
| 8,896,603 B2* | 11/2014 | Hammack .......... G05B 19/0426 345/440 |
| 9,043,003 B2 | 5/2015 | Campney et al. |
| 9,164,647 B2 | 10/2015 | Ueno et al. |
| 9,792,004 B2 | 10/2017 | Hammack et al. |
| 2002/0161772 A1 | 10/2002 | Bergelson et al. |
| 2003/0236576 A1 | 12/2003 | Resnick et al. |
| 2004/0075689 A1* | 4/2004 | Schleiss ................ G05B 15/02 715/771 |
| 2004/0153804 A1* | 8/2004 | Blevins .................. G05B 15/02 714/33 |
| 2004/0186927 A1 | 9/2004 | Eryurek et al. |
| 2004/0201602 A1 | 10/2004 | Mody et al. |
| 2004/0260408 A1 | 12/2004 | Scott et al. |
| 2005/0027376 A1 | 2/2005 | Lucas et al. |
| 2005/0027377 A1 | 2/2005 | Lucas et al. |
| 2005/0096872 A1* | 5/2005 | Blevins .................. G05B 17/02 702/183 |
| 2005/0125787 A1 | 6/2005 | Tertitski et al. |
| 2005/0251380 A1 | 11/2005 | Calvert et al. |
| 2006/0015195 A1 | 1/2006 | Lehman et al. |
| 2006/0071067 A1 | 4/2006 | Iida |
| 2006/0117268 A1 | 6/2006 | Talley et al. |
| 2006/0206860 A1 | 9/2006 | Dardinski et al. |
| 2006/0206866 A1 | 9/2006 | Eldrige et al. |
| 2007/0005266 A1 | 1/2007 | Blevins et al. |
| 2007/0132779 A1 | 6/2007 | Gilbert et al. |
| 2007/0139441 A1* | 6/2007 | Lucas .............. G05B 19/41885 345/619 |
| 2007/0150081 A1 | 6/2007 | Nixon et al. |
| 2007/0156264 A1 | 7/2007 | Schleiss et al. |
| 2007/0165031 A1* | 7/2007 | Gilbert ............. G05B 19/41885 345/473 |
| 2007/0168060 A1* | 7/2007 | Nixon ...................... G06F 8/20 700/83 |
| 2007/0168065 A1 | 7/2007 | Nixon et al. |
| 2007/0168174 A1* | 7/2007 | Davari ................... G06F 30/00 703/18 |
| 2007/0171921 A1 | 7/2007 | Wookey et al. |
| 2007/0174225 A1 | 7/2007 | Blevins et al. |
| 2007/0208549 A1 | 9/2007 | Blevins et al. |
| 2008/0066004 A1 | 3/2008 | Blevins et al. |
| 2008/0163164 A1 | 7/2008 | Chowdhary et al. |
| 2008/0188960 A1* | 8/2008 | Nixon ............. G05B 19/41865 700/86 |
| 2008/0189638 A1 | 8/2008 | Mody et al. |
| 2008/0312757 A9* | 12/2008 | Nixon .................. G05B 19/042 700/83 |
| 2009/0024656 A1 | 1/2009 | Wellman |
| 2009/0088875 A1 | 4/2009 | Baier et al. |
| 2009/0118845 A1 | 5/2009 | Eldridge et al. |
| 2009/0118846 A1 | 5/2009 | Eldridge et al. |
| 2009/0125128 A1 | 5/2009 | Eldridge et al. |
| 2009/0125129 A1 | 5/2009 | Eldridge et al. |
| 2009/0125130 A1 | 5/2009 | Eldridge et al. |
| 2009/0125131 A1 | 5/2009 | Eldridge et al. |
| 2009/0132996 A1 | 5/2009 | Eldridge et al. |
| 2009/0177543 A1 | 7/2009 | Ram et al. |
| 2009/0217200 A1* | 8/2009 | Hammack .......... G05B 19/0426 715/810 |
| 2010/0017746 A1* | 1/2010 | Husoy .................. G06F 3/0484 715/781 |
| 2010/0082554 A1 | 4/2010 | Beatty et al. |
| 2010/0168874 A1* | 7/2010 | Lucas ................... G06F 9/4488 700/17 |
| 2010/0188410 A1* | 7/2010 | Gilbert .................. G06F 9/4488 345/473 |
| 2010/0191554 A1 | 7/2010 | Singh et al. |
| 2010/0222899 A1* | 9/2010 | Blevins .................. G05B 17/02 700/80 |
| 2010/0222902 A1 | 9/2010 | Eldridge et al. |
| 2010/0223593 A1 | 9/2010 | Eldridge et al. |

(56) References Cited

U.S. PATENT DOCUMENTS

| | | | |
|---|---|---|---|
| 2010/0228373 A1* | 9/2010 | Lucas | G05B 19/41845 700/108 |
| 2010/0235767 A1 | 9/2010 | Hammack et al. | |
| 2010/0275139 A1 | 10/2010 | Hammack et al. | |
| 2010/0305720 A1 | 12/2010 | Doll et al. | |
| 2010/0305721 A1 | 12/2010 | Kostadinov et al. | |
| 2011/0016099 A1 | 1/2011 | Peer et al. | |
| 2011/0029102 A1 | 2/2011 | Campney et al. | |
| 2011/0230980 A1 | 9/2011 | Hammack et al. | |
| 2012/0029661 A1* | 2/2012 | Jones | G05B 19/0426 700/17 |
| 2012/0030089 A1 | 2/2012 | Ram et al. | |
| 2012/0041570 A1* | 2/2012 | Jones | G05B 19/0426 700/17 |
| 2012/0198547 A1 | 8/2012 | Fredette et al. | |
| 2012/0215464 A1 | 8/2012 | Daubney | |
| 2013/0125007 A1 | 5/2013 | Chaudhri et al. | |
| 2013/0145279 A1 | 6/2013 | Ricci | |
| 2013/0145297 A1 | 6/2013 | Ricci et al. | |
| 2013/0346908 A1 | 12/2013 | Zhang | |
| 2014/0075371 A1 | 3/2014 | Carmi | |
| 2014/0088776 A1 | 3/2014 | Brandt et al. | |
| 2014/0100668 A1 | 4/2014 | Jundt et al. | |
| 2014/0100669 A1 | 4/2014 | Hammack et al. | |
| 2014/0100676 A1 | 4/2014 | Scott et al. | |
| 2014/0108985 A1 | 4/2014 | Scott et al. | |
| 2014/0250420 A1 | 9/2014 | Smith et al. | |
| 2015/0105878 A1 | 4/2015 | Jones et al. | |
| 2015/0106753 A1 | 4/2015 | Tran et al. | |

FOREIGN PATENT DOCUMENTS

| | | |
|---|---|---|
| CN | 1716137 A | 1/2006 |
| CN | 1950761 A | 4/2007 |
| CN | 1950771 A | 4/2007 |
| CN | 101095131 A | 12/2007 |
| CN | 102013045 A | 4/2011 |
| CN | 102033747 A | 4/2011 |
| CN | 102043403 A | 5/2011 |
| CN | 102419578 A | 4/2012 |
| CN | 102819425 A | 12/2012 |
| EP | 0 816 998 A2 | 1/1998 |
| EP | 2 482 186 A1 | 8/2012 |
| EP | 2 608 025 A1 | 6/2013 |
| EP | 2 801 941 A1 | 11/2014 |
| GB | 2 398 659 A | 8/2004 |
| JP | 02-208693 A | 8/1990 |
| JP | 06-309425 A | 11/1994 |
| JP | 11-282655 A | 10/1999 |
| JP | 2000-222184 A | 8/2000 |
| JP | 2001-195255 A | 7/2001 |
| JP | 2004-85243 A | 3/2004 |
| JP | 2004-133900 A | 4/2004 |
| JP | 2005-339494 A | 12/2005 |
| JP | 2006-252145 A | 9/2006 |
| JP | 2007-157039 A | 6/2007 |
| JP | 2007-536648 A | 12/2007 |
| JP | 2008-118068 A | 5/2008 |
| JP | 2010-257464 A | 11/2010 |
| JP | 2010-266915 A | 11/2010 |
| JP | 2012-73993 A | 4/2012 |
| JP | 2012-103978 A | 5/2012 |
| WO | WO-2010/037145 A2 | 4/2010 |
| WO | WO-2014/058889 A1 | 4/2014 |

OTHER PUBLICATIONS

Notice of Reasons for Rejection for Japanese Application No. 2015-536843, dated Jan. 9, 2018.
Office Action for Chinese Application No. 201380063079.6, dated Aug. 2, 2017.
Office Action for Chinese Application No. 201380063079.6, dated Oct. 30, 2017.
Examination Report for Application No. GB1505495.0, dated Sep. 28, 2016.
Examination Report for Application No. GB1505495.0, dated Sep. 30, 2015.
International Preliminary Report on Patentability for Application No. PCT/US2013/063894, dated Apr. 8, 2015.
International Preliminary Report on Patentability for Application No. PCT/US2013/063914, dated Apr. 8, 2015.
International Search Report and Written Opinion for Application No. PCT/US2013/063894, dated Jan. 7, 2014.
International Search Report and Written Opinion for Application No. PCT/US2013/063914, dated Jan. 22, 2014.
Office Action for Chinese Application No. 201380063079.6, dated Jan. 23, 2017.
Office Action for Chinese Application No. 201380063079.6, dated Sep. 1, 2016.
Office Action for Chinese Application No. 201380064166.3, dated May 2, 2017.
Office Action for Chinese Application No. 201380064166.3, dated Sep. 7, 2016.
Search Report for Application No. GB1521910.8, dated Jun. 2, 2016.
Office Action for Chinese Application No. 201611003855.5, dated Nov. 27, 2018.
Examination Report for Application No. GB1505494.3, dated Jan. 29, 2019.
Extended European Search Report for Application No. 18187614.5, dated Jan. 18, 2019.
Decision of Dismissal of Amendment for Japanese Application No. 2015-536840, dated Jun. 4, 2019.
Notice of Reasons for Rejection for Japanese Application No. 2015-246013, dated Nov. 12, 2019.
Notice of Reasons for Rejection for Japanese Application No. 2018-196323, dated Oct. 21, 2019.
Notice of Reasons for Rejection for Japanese Application No. 2018-196324, dated Oct. 21, 2019.
Notification of First Office Action for Chinese Application No. 201510947366.4, dated Jun. 21, 2019.
Office Action for Chinese Application No. 201710969588.5, dated Jul. 22, 2019.
Second Office Action for Chinese Application No. 201611003855.5, dated Aug. 14, 2019.
Third Office Action for Chinese Application No. 201611003855.5, dated Nov. 22, 2019.
Combined Search and Examination Report for Application No. GB1917091.9, dated Mar. 5, 2020.
Second Office Action for Chinese Application No. 201510947366.4, dated Mar. 11, 2020.
Decision of Refusal for Japanese Application No. 2015-246013, dated May 26, 2020.
Examination Report for Application No. GB1521910.8, dated Sep. 2, 2020.
Office Action for European Application No. 18187614.5, dated Dec. 3, 2020.
Third Office Action for Chinese Application No. 201510947366.4, dated Sep. 2, 2020.
Fourth Office Action for Chinese Application No. 201510947366.4, dated Mar. 25, 2021.

* cited by examiner

FIG. 7

CONFIGURATION ELEMENT FOR GRAPHIC ELEMENTS

CROSS REFERENCE TO RELATED APPLICATIONS

This application is a continuation-in-part application which claims the benefit of and priority to U.S. application Ser. No. 15/692,450, entitled "Derived and Linked Definitions with Override" and filed on Aug. 31, 2017, which claims the benefit of and priority to U.S. application Ser. No. 14/048,516, entitled "Derived and Linked Definitions with Override" and filed on Oct. 8, 2013, which claims the benefit of U.S. Provisional Application No. 61/711,110 entitled "Process Plant Configurations Using Flexible Objects" and filed on Oct. 8, 2012, and claims the benefit of U.S. Provisional Application No. 61/711,105 entitled "Configurable User Displays In A Process Control System" and filed on Oct. 8, 2012, the entire contents of which are hereby incorporated by reference herein.

Further, this application is related to U.S. application Ser. No. 14/048,533, originally entitled "Dynamically Reusable Classes" and filed Oct. 8, 2013, the entire contents of which are hereby incorporated by reference herein. This application is also related to U.S. application Ser. No. 14/048,496, originally entitled "Method And Apparatus For Managing Process Control Configuration" and filed Oct. 8, 2013, the entire contents of which are hereby incorporated by reference herein.

TECHNICAL FIELD

The present invention relates generally to process plants and, more particularly, to the use of flexible objects in configuring and viewing the operation of a process plant or process control system.

DESCRIPTION OF THE RELATED ART

Distributed process control systems, like those used in chemical, petroleum or other process plants, typically include one or more process controllers communicatively coupled to one or more field devices via analog, digital or combined analog/digital buses. The field devices, which may be, for example, valves, valve positioners, switches and transmitters (e.g., temperature, pressure, level and flow rate sensors), are located within the process environment and perform process functions such as opening or closing valves, measuring process parameters, etc. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART and FOUNDATION® Fieldbus field devices. The control modules in the controller send the control signals over the communication lines to the field devices to thereby control the operation of the process plant.

Information from the field devices and the controller is usually made available over a data highway to one or more other hardware devices, such as operator workstations, personal computers, data historians, report generators, centralized databases, etc., typically placed in control rooms or other locations away from the harsher plant environment. These hardware devices run applications that may, for example, enable an operator to perform functions with respect to the process, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc.

As an example, the DeltaV™ control system, sold by Emerson Process Management, includes multiple applications stored within and executed by different devices located at diverse places within a process plant. A configuration application, which resides in one or more operator workstations, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Presently, configuration applications typically include a library of template objects or items, such as function block template objects and, in some cases, control module template objects. These configuration applications are used to configure a control strategy for a process plant and to provide display views at user interfaces of a process plant. The template objects all have default properties, settings and methods associated therewith. The engineer using the configuration application can select these template objects and essentially place copies of the selected template objects into a configuration screen to develop a module, e.g., a control module. During the process of selecting and placing the template objects into the configuration screen, the engineer interconnects the inputs and outputs of these objects and changes their parameters, names, tags and other properties to create a specific control module for a specific use in the process plant. After creating one or more such control modules, the engineer may store the created module in the library or in a configuration data storage area. The engineer can then instantiate the control module (e.g., cause an executable file corresponding to the control module to be created) and download it to the appropriate controller or controllers, field devices, and other process elements for execution during operation of the process plant.

Thereafter, the engineer generally creates one or more displays for operators, maintenance personnel, etc. within the process plant by selecting and building display objects in a display creation application. These displays are typically implemented on a system wide basis in one or more of the workstations and provide preconfigured displays to the operator or maintenance persons regarding the operating state of the control system or the devices within the plant. Typically, these displays take the form of alarming displays that receive and display alarms generated by controllers or devices within the process plant, control displays indicating the operating state of the controllers and other devices being controlled within the process plant, maintenance displays indicating the functioning state of the devices within the process plant, etc. These displays are generally preconfigured to display, in known manners, information or data received from the process control modules, devices, or other process elements within the process plant. In some known systems, displays are created through the use of objects that each have a graphic associated with a physical or logical element, and that are each communicatively tied to the physical or logical element to receive data about the physical or logical element. An object may change the graphic on the display screen based on the received data to illustrate, for example, that a tank is half full, to illustrate the fluid flow measured by a flow sensor, etc.

Similar to the control configuration application, a display creation application may have template graphical display items, such as tanks, valves, sensors, operator control buttons like slide bars, on/off switches, etc. which may be placed on a screen in any desired configuration to create an operator display, maintenance display and the like. Template graphical display items may be stored in a template library along with configuration objects, or may be stored in a different template library. When placed onto the screen, individual graphic items may be interconnected on the screen in a manner that provides some information or display of the inner-workings of the process plant to different users. However, to animate the graphic display, the display creator must manually tie each of the graphical items to data generated within the process plant, such as data measured by sensors or indicative of valve positions, etc. by specifying a communication link between the graphic item and the relevant data source within the process plant. This process is tedious, time consuming and maybe fraught with error. Moreover, once a display is created, it remains static in its configuration and layout.

While the control template objects within the control configuration application and the display items within the display creation application are convenient because they can be copied and used to create many different control modules and graphical displays, there is often a need to create numerous of the same control module and graphical display for different equipment and displays within the process plant. For example, many medium to large sized process plants have numerous instances of the same or similar equipment that can be controlled and viewed using the same basic general control modules and displays.

To address this problem, U.S. Pat. No. 7,043,311 (the entire disclosure of which is hereby expressly incorporated by reference herein) discloses a process plant configuration system that uses class objects also called module class objects (and generally referred to herein as class objects or classes) to enable a user to create numerous control modules, unit or equipment modules, or display modules from a common module class object. These control, equipment or display modules are created as instances of the module class or class object and include all of the features and properties of the module class object, thereby making it easier to create a number of similar control, equipment or display objects from a single or common class module object. Instances may, in turn, have their own children objects, so that objects may have multi-generational or multi-level relationships. Thereafter, each of the instances, children objects, or multi-level children objects created from a module class object may be changed automatically by making and storing changes to its respective parent object. For example, module instances retain their connection to the module class object and are updated automatically when the class module is changed or updated. Similarly, children objects and multi-level children objects created from a parent object that is not a class object may be changed automatically by making and storing changes to the parent object. In an embodiment, at least some of the children objects are stored in a system configuration data storage area or other data storage area which is logically and/or physically separate from the library.

However, in a typical control system used in, for example, a process plant, there can be hundreds of similar items (such as control modules or display elements) that must be defined. These items include control strategies associated with the control of flow or pressure, for example, as well as the display components used to represent these control strategies in graphic displays. It is now fairly typical to implement a configuration system that use classes or module class objects to configure these common items, wherein the configuration system includes a library of module class objects, and enables a user to produce many copies or instances of any particular module class object for use in the plant. In these systems, modifications to the objects must be made to the module class object first, which then causes these changes to be automatically propagated to all of the instances, children objects, and multi-level children objects (if any) of the module class object. In fact, these configuration systems are designed to allow only small adjustments to be made directly on the module instances, such as changing parameter values in the module instances. For example, typical class behavior for control strategies enables an instance of a class item to be modified only on the parameter level, and only if that specific parameter has been granted change access from within the module class. As a result, many different module class objects must be developed to configure process plant items (such as plant equipment) that only differ from each other by small or minor amounts. Unfortunately, as more and more of these module class objects are defined, the original productivity gains obtained by using configuration class objects decrease.

Still further, as noted above, current configuration systems that use class based configuration items are typically designed to assure that, when a change is made to a class item, that change is immediately propagated to all of the module instances of that class. This feature is designed into the configuration system because instances actually share, or point to, their respective parent items or objects (e.g., the class item or object) for their definitions. Although this automatic change propagation feature makes control system design easier and more effective in the early stages of the design, once the control system is installed and running in a plant, it may not be acceptable or practical to change all of the instances associated with a particular module class object at the same time. Importantly, a given module class object typically experiences many changes as part of its lifetime. After a module class object has been created, subsequent changes to the module class (which may be structural changes or parameter value changes) result in a modified module class whose changes need to be distributed to module instances, to one or more children objects, and/or to other module classes such as derived module classes. However, as a practical matter, each affected child object running in the plant may need to be individually tested and verified on actual process equipment, and thus the user may need to delay the change to the module class object for months or years waiting for an appropriate time to update all of the module instances for that class object. Moreover, because changes to a module class object are automatically distributed to derived objects, a single change to a module class could affect hundreds and possibly thousands of module instances and children objects. Many process industries cannot deal with the resulting disruptive downloads required, spanning multiple areas of the plant, during the plant operations phase. As a result, control systems are being initially engineered with module instances tied to a module class object, only for these instances to be eventually converted into classless control modules before the system enters the plant operations phase.

For the various reasons described above, class instances are in many cases being broken off of or are being disassociated from the original class object to allow changes to be made to the class instance, which thereby creates a new class module or which allows changes to be made to the class object without being propagated to all of the instances immediately. However, this operation destroys the advantages of using class based configuration objects in the first place.

Even in smaller systems in which class/instance connections are not being severed, it is still difficult to define and debug a new change to a control object without affecting all of the instances in the class because, on the one hand, it is not possible to implement new changes on an instance, and because, on the other hand, when any change is made to the class object, this change is automatically applied to each instance of the class object. Here again, one of the children objects, e.g., an instance, must be temporarily broken off from the class object so that the new change can be designed and tested on the instance. In this case, the change, once complete, must be manually made on the class object and the user must clean up the instance used for testing and re-attach the instance to its proper class object. Thus, in effect, to deal with these issues, the user must create an entire separate class object to handle slight variations between instances by breaking more and more classes off from the original class object for testing purposes, or must abandon the class concept completely.

Still further, most configuration systems used in the market today do not use classes to configure graphic displays for the control system. Typically, the graphics are defined separately from the control strategies, and one graphics item is often used with multiple different control strategy classes. Thus, when a change is made to a particular graphics item, the user must verify that the changed graphics item works with all of the control strategy instances, on all of the displays. As modifications to control strategies occur and the control strategy classes proliferate in the manners noted above, each graphics item for each instance needs to be verified, which becomes time consuming and impractical.

While graphics utilities can be used to update similar graphics items, the utility would make all of the selected graphics items identical. Thus, in the end, this solution is similar to using classes for graphics items. Moreover, designing instance differences in graphics is difficult and requires programming skills. Because a wide variety of variations are allowed and in fact are expected in graphics items, it is necessary to design a system, using special forms, that specifies which variations are to be allowed or enabled with override structures in each of the graphics display item created from a common graphics object. These variations include, for example, specifying changes such as allowing the user on an instance to define the rotation for part of the item, select what strings and variables must be shown in the display and which ones are optional, etc. Without this up front design, the graphic objects cannot even have small changes made thereto. Unfortunately, a configuration system which attempts to design or pre-specify the allowable changes in the graphics items quickly becomes unusable, as variations on graphics items is very common. As a result, maintaining graphics cost effectively is an ongoing problem within control systems, and is only exacerbated when the step of maintaining graphics must be coordinated with the changes being made to control module classes used in the control configuration system.

In a more general sense, users want to configure a display out of reusable graphical components and be able to see the changes they made from the original graphical definition. Additionally, they want to be able to make changes to the definition in one place and have these changes applied to the displays for which the graphical definition is used, and thereafter maintain the specific changes they made on the various displays. Currently, in some display systems, display components can be grouped into dynamos, which are a combination of basic shapes, such as rectangles and text blocks configured with the animations and event handler behaviors. These basic shapes can be configured into various combinations to represent equipment or data from part of the plant. Some dynamos are typically provided out of the box as part of the display configuration system, while other dynamos are created and maintained by project engineering, and still other dynamos are configured by the customer. Currently, when these dynamos are used on a display, a complete copy is placed in the display for each instance that uses the original dynamo. However, there is no hard link back to the original dynamo. However, each instance may change several aspects of the dynamo, such as the animation expression paths, position orientation or other visual aspects required to allow this particular display to fit within the current display field of the user interface on which the display element is used.

There are several problems and limitations to this approach. Generally speaking, the customer is trying to minimize the financial cost and is trying to maximize quality and reliability of the displays. However, invariably, one or more changes are needed to a dynamo definition. After a change is made to a master or original dynamo, the customer needs to put those changes into production by updating all the displays that use that specific dynamo. However, because there is no hard link between the original dynamo being changed and its copies, determining where the dynamo is used is a serious issue. Typically, each created dynamo includes a string field to store the dynamo name and version. However, not all customers use this technique and, in any event, this field can be inadvertently cleared or deleted by a user during an edit session, thereby losing the named connection back to the original dynamo. Moreover, if a new dynamo is created from an existing dynamo and this reference value is not updated, the string will have the incorrect reference to the original dynamo name and version. Further, if a difference was a change on the display or to the dynamo, it is only possible to know what is different in the dynamo, but not why. Thus, it is difficult for users to determine if a change needs to be incorporated into a particular dynamo being used in a particular display when changes are made to the original dynamo.

Still further, while the user can update the instance to the new dynamo and retain the instance specific changes, the user typically does not know which changes are in the new master and which are instance specific, and so cannot determine which differences within the display item should be left in place. Currently, updating to a new version of a dynamo requires a complete recopy of the dynamo to replace the values configured on the display. This process overwrites any changes on the display item that are instance specific. As a result, the user must then manually reapply all changes previously made to the display item or instance, and if the user forgets some of the changes, these changes are lost. This operation negatively affects the quality of the operator displays and also takes longer because it entails a manual process. Still further, the original dynamo levels are only one level deep. As a result, a dynamo can only be built from the basic shapes and not from other dynamos, which prevents building up a set of dynamos to be used as the basis for other dynamos.

SUMMARY

A configuration system uses a simplified configuration pane or form to configure properties of attributes of a graphic element, such as the graphic element's shape, dynamic behaviors, etc. The simplified configuration panes are provided as objects, which can be configured, published and reference other objects, such as a graphic element object, instead of using scripts. Thus, a configuration element may be configured to include properties that are most commonly used for a particular graphic element, rather than exposing all possible properties in the configuration system, which may number in the thousands. For example, a graphic element object for a valve may have a particular shape and designation. Common properties for such a graphic element includes fill color for the shape, line thickness for the shape, font, font size and dynamic behaviors. A configuration element for the valve graphic element may be configured to include a set of options for fill color, line thickness, font, font size and dynamic behaviors. When the configuration element is instantiated, a user is presented with the set of options to configure the properties for the valve graphic element. The graphic element object is linked and bound to the configuration element object such that upon instantiation, the graphic element is displayed with the properties defined in the configuration element object. Subsequent changes to the configuration element object would then propagate to the graphic element objects that are linked to the configuration element object.

BRIEF DESCRIPTION OF THE DRAWINGS

FIG. 7 is an example depiction of a configuration screen which may be used by a configuration operator to configure a process plant using module class objects;

DESCRIPTION OF EMBODIMENTS

Figure 1:
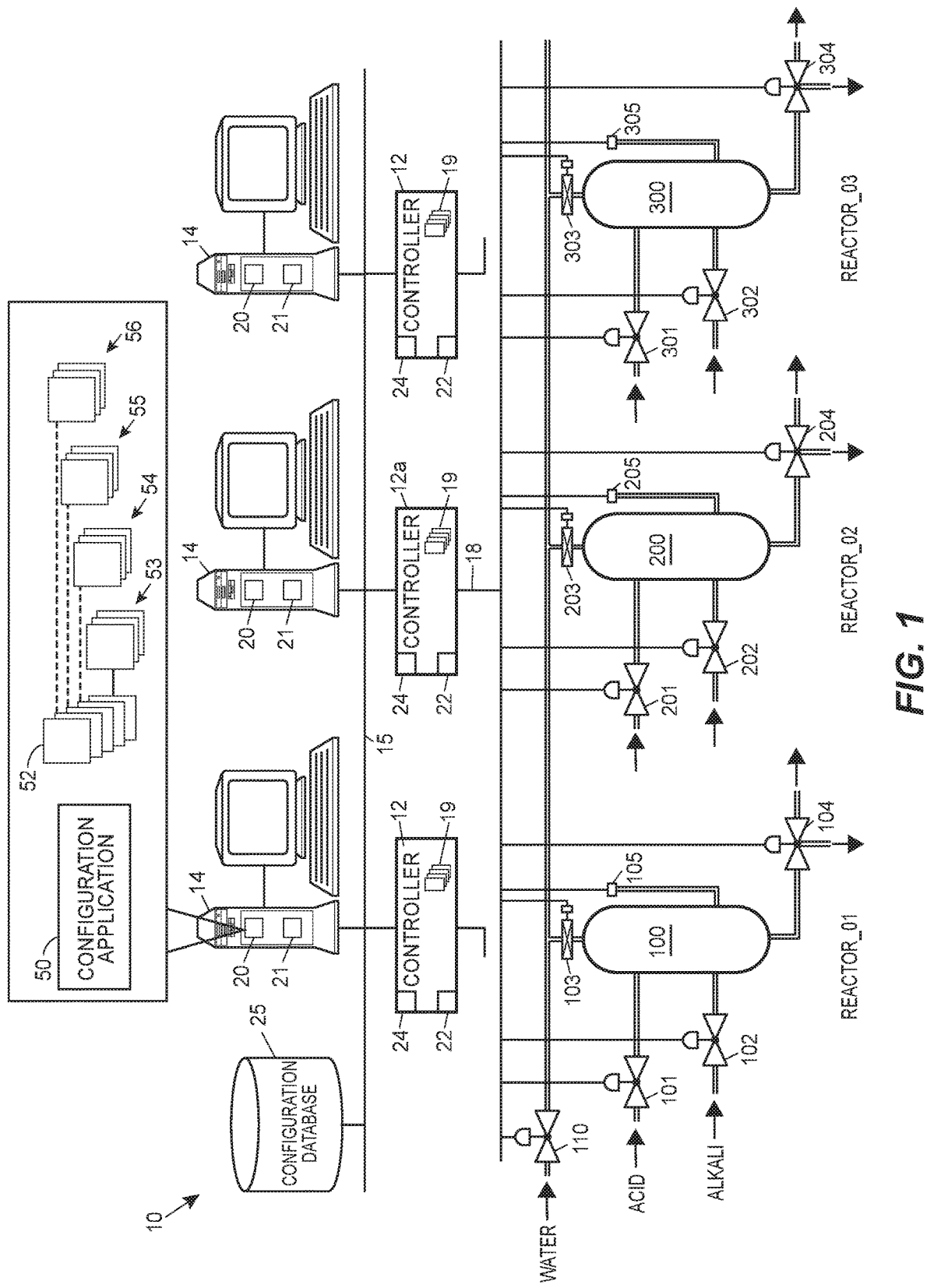
FIG. 1 is a block diagram of an example distributed process control network located within a process plant or process control system, including a workstation that implements a configuration application that uses module class objects to configure control and display activities for the process plant or process control system.

Referring now to FIG. 1, a process plant 10 includes one or more process controllers 12 coupled to numerous workstations 14 via, for example, an Ethernet connection or bus 15. The controllers 12 are also coupled to devices or equipment within the process plant 10 via sets of communication lines or buses 18, with only the set of communication lines 18 connected to the controller 12a being illustrated in FIG. 1. The communication lines or buses 18 may be, for example, wired connections, wireless connections, or a combination of wired and wireless connections. The controllers 12, which may be implemented by way of example only using the DeltaV controller sold by Fisher-Rosemount Systems, Inc., are capable of communicating with control elements, such as field devices and function blocks within field devices distributed throughout the process plant 10 to perform one or more process control routines 19 to thereby implement desired control of the process plant 10 or of one or more processes operating in the process plant 10. The workstations 14 (which may be, for example, personal computers) may be used by one or more configuration engineers to design the process control routines 19 to be executed by the controllers 12 and display routines to be executed by the workstations 14 or other computers, and to communicate with the controllers 12 so as to download such process control routines 19 to the controllers 12. Furthermore, the workstations 14 may execute display routines that receive and display information pertaining to the process plant 10 or elements thereof during operation of the process plant 10.

Each of the workstations 14 includes a memory 20 for storing applications, such as configuration design applications and display or viewing applications, and for storing data, such as configuration data pertaining to the configuration of the process plant 10. Each of the workstations 14 also includes a processor 21 that executes the applications to enable a configuration engineer to design process control routines and other routines and to download these process control routines to the controllers 12 or to other computers or to collect and display information to a user during operation of the process plant 10. In some embodiments, a remote computing device is in communicative connection with the workstations 14 (e.g., via a network or web-based interface) so that a configuration engineer may execute applications remotely from the workstations 14.

Still further, each of the controllers 12 includes a memory 22 that stores control and communication applications and a processor 24 that executes the control and communication applications in any known manner. In one case, each of the controllers 12 stores and executes a controller application that implements a control strategy using a number of different, independently executed, control modules or blocks 19. The control modules 19 may each be made up of what are commonly referred to as function blocks wherein each function block is a part or a subroutine of an overall control routine and operates in conjunction with other function blocks (via communications called links) to implement process control loops within the process plant 10, e.g., to control the operation of one or more processes performed by the process plant 10.

As is well known, function blocks, which may be objects in an object oriented programming protocol, typically perform one of an input function, such as that associated with a field device such as a transmitter, a sensor or other process parameter measurement device; a control function, such as that associated with a control routine that performs PID, fuzzy logic, etc. control; or an output function which controls the operation of some device, such as a valve or other field device, to perform some physical function within the process plant 10. Of course hybrid and other types of complex function blocks exist such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function chart, ladder logic, etc. and are not limited to being designed using function block or any other particular programming technique.

The workstations 14 may provide a graphical depiction of the process control routines 19 within the controllers 12 to a user via a display screen illustrating the control elements within the process control routines 19 and the manner in which these control elements are configured to provide control of the process plant 10. In the system of FIG. 1, a configuration database 25 is connected to the Ethernet bus 15 to store configuration data used by the controllers 12 and the workstations 14 and, in some cases, to serve as a data historian by collecting and storing data generated in the process plant 10 for future use. In an embodiment, the configuration database 25 may include library items (e.g., templates and class modules) and system configuration items (e.g., objects created from library items) corresponding to the configuration data. As such, the configuration database 25 may be logically and/or physically partitioned into a library data storage area and a system configuration storage area.

In the process plant 10 illustrated in FIG. 1, the controller 12a is communicatively connected via the bus 18 to three sets of similarly configured reactors (which are replicated equipment within the plant 10) referred to herein as Reactor_01, Reactor_02 and Reactor_03. Reactor_01 includes a reactor vessel or tank 100, three input valve systems (which are equipment entities) 101, 102 and 103 connected so as to control fluid inlet lines providing acid, alkali and water, respectively, into the reactor vessel 100 and an outlet valve system 104 connected so as to control fluid flow out of the reactor vessel 100. A sensor 105, which can be any desired type of sensor, such as a level sensor, a temperature sensor, a pressure sensor, etc., is disposed in or near the reactor vessel 100. For the purpose of this discussion, the sensor 105 is assumed to be a level sensor. Moreover, a shared header valve system 110 is connected on the water line upstream of each of the reactors Reactor_01, Reactor_02 and Reactor_03 to provide a master control for controlling the flow of water to each of those reactors.

Similarly, Reactor_02 includes a reactor vessel 200, three input valve systems 201, 202 and 203, an outlet valve system 204 and a level sensor 205 while Reactor_03 includes a reactor vessel 300, three input valve systems 301, 302 and 303, an outlet valve system 304 and a level sensor 305. In the example of FIG. 1, the reactors Reactor_01, Reactor_02 and Reactor_03 may produce salt with the input valve systems 101, 201 and 301 providing acid, the input valve systems 102, 202 and 302 providing alkali and the input valve systems 103, 203 and 303, in conjunction with the shared water header 110, providing water to the reactor vessel 100. The outlet valve systems 104, 204 and 304 may be operated to send product out of a flow line directed to the right in FIG. 1 and to drain waste or other unwanted material out of a flow line directed to the bottom in FIG. 1.

The controller 12a is communicatively coupled to the valve systems 101-104, 110, 201-204 and 301-304 and to the sensors 105, 205 and 305 via the bus 18 to control the operation of these elements to perform one or more operations with respect to the reactor units, Reactor_01, Reactor_02 and Reactor_03. Such operations, generally called phases, may include, for example, filling the reactor vessels 100, 200, 300, heating the material within the reactor vessels 100, 200, 300, dumping the reactor vessels 100, 200, 300, cleaning the reactor vessels 100, 200, 300, etc.

The valves, sensors and other equipment illustrated in FIG. 1 may be any desired kinds or types of equipment including, for example, Fieldbus devices, standard 4-20 ma devices, HART devices, wireless HART devices, etc. and may communicate with the controller 12 (e.g., any of the controllers 12 or 12a) using any known or desired communication protocol such as the Fieldbus protocol, the HART protocol, a wireless HART protocol or other wireless protocol, the 4-20 ma analog protocol, etc. Generally, devices that are located within the process environment and that perform a function directly impacting the control of the process (e.g., a physical function such as opening or closing valves, a measurement function to be used in a control algorithm or loop, and/or other function) are referred to herein as "field devices."

Still further, other types of devices may be connected to and be controlled by the controllers 12 in accordance with the principles discussed herein. For example, a controller 12 may be connected to one or more input/output (I/O) devices (not shown) which, in turn, may be connected to one or more field devices. An I/O device typically is used by a controller 12 to enable communications between the one or more field devices, the controller 12, and/or the process control system. As such, the I/O device may also be a participant in the direct execution of a control algorithm or loop to control a process. Accordingly, controllers, I/O devices, and field devices are generally and categorically referred to herein as "process control devices." Of course, the term "process control device" is not limited to only controllers, I/O devices and field devices, but may also include other devices that participate in or are required for control algorithms and/or loops to be executed to control a process in a process plant or process control system.

Additionally, other numbers and types of controllers may be connected within the plant 10 to control other devices or areas associated with the process plant 10 and the operation of such additional controllers may be coordinated with the operation of the controller 12a illustrated in FIG. 1 in any desired manner. In some embodiments, the process plant 10 of FIG. 1 includes one or more nodes for wireless communications (not shown) within the process plant 10, such as access points, gateways between wireless and wired networks within the plant 10, gateways to other networks, repeaters, routers, etc. within or external to the plant 10, and the like. These nodes for wireless communications may be communicatively coupled (using a wired protocol, a wireless protocol, or a combination thereof) to controllers 12, workstations 14, the configuration database 25, field devices, other wireless-enabled nodes, and other databases or data storage devices.

Generally speaking, the process plant 10 of FIG. 1 may be used to implement batch processes in which, for example, one of the workstations 14 or the controller 12a executes a batch executive routine, which is a high level control routine that directs the operation of one or more of the reactor units (as well as other equipment) to perform a series of different steps (commonly referred to as phases) needed to produce a product, such as a particular type of salt. To implement different phases, the batch executive routine uses what is commonly referred to as a recipe which specifies the steps to be performed, the amounts and times associated with the steps and the order of the steps. Steps for one recipe might include, for example, filling a reactor vessel with the appropriate materials or ingredients, mixing the materials within the reactor vessel, heating the materials within the reactor vessel to a certain temperature for a certain amount of time, emptying the reactor vessel and then cleaning the reactor vessel to prepare for the next batch run. Each of the steps defines a phase of the batch run and the batch executive routine within the controller 12a will execute a different control algorithm for each one of these phases. Of course, the specific materials, amounts of materials, heating temperatures, times, etc. may be different for different recipes and, consequently, these parameters may change from batch run to batch run depending on the product being manufactured or produced and the recipe being used. Those skilled in the art will understand that, while control routines and configurations are described herein for batch runs in the reactors illustrated in FIG. 1, control routines may be used to control other desired devices to perform any other desired batch process runs or to perform continuous process runs, if so desired.

As will also be understood, the same phases or steps of a batch process can be implemented on each of the different reactor units of FIG. 1 at the same or at different times. Furthermore, because the reactor units of FIG. 1 generally include the same number of and types of equipment, the same generic phase control routine for a particular phase may be used to control each of the different reactor units, except that this generic phase control routine has to be modified to control the different hardware or equipment associated with the different reactor units. For example, to implement a fill phase for Reactor_01 (wherein the reactor unit is filled), a fill control routine will open one or more valves associated with the input valve systems 101, 102 and 103 for a certain amount of time, for example, until the level meter 105 senses that the vessel 100 is full. However, this same control routine may be used to implement a fill phase for Reactor_02 by merely changing the designation of the input valve(s) to be those associated with the valve systems 201, 202 and 203 instead of the valve systems 101, 102 and 103 and by changing the designation of the level meter to be the level meter 205 instead of the level meter 105.

Figure 2:
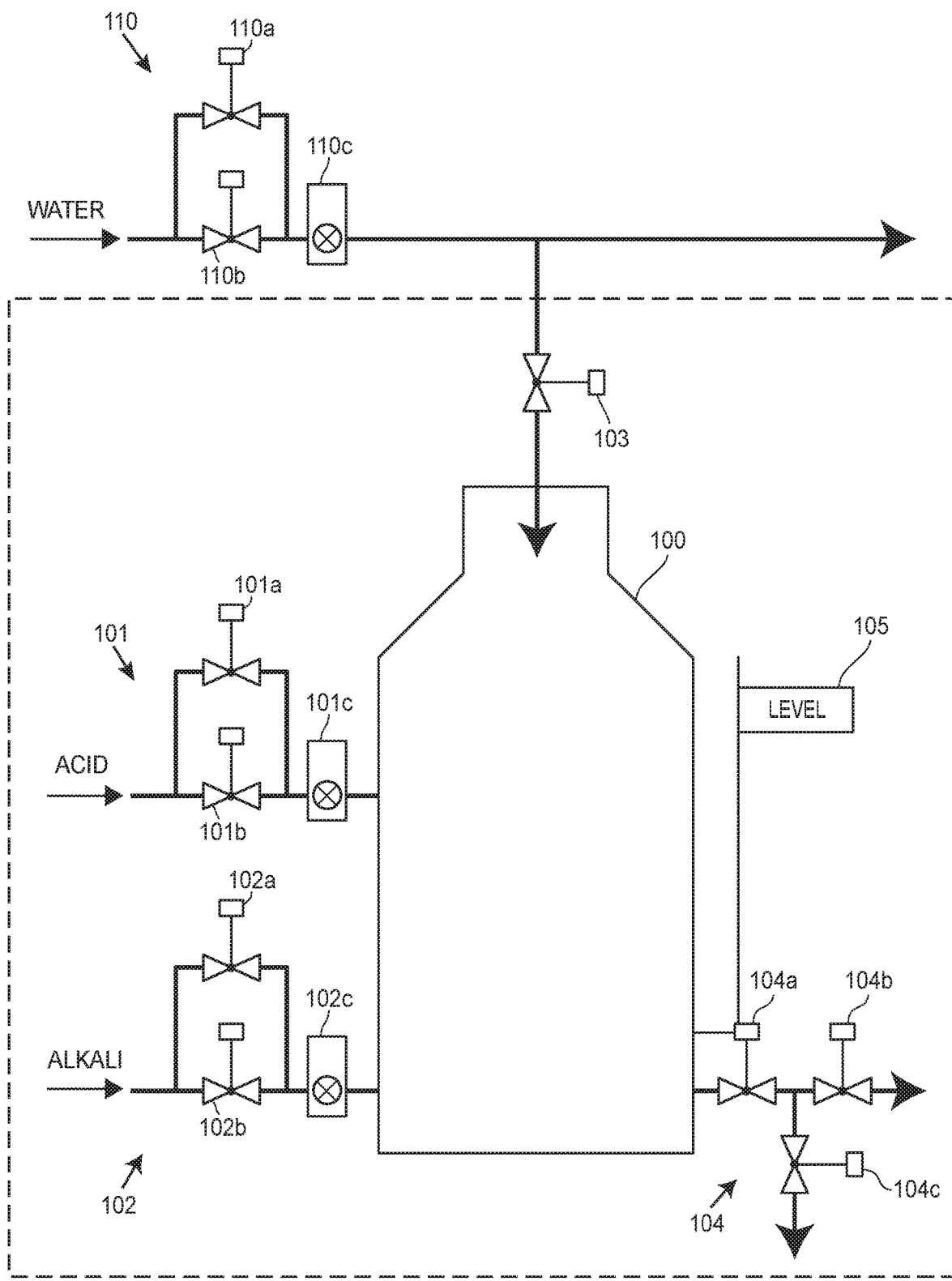
FIG. 2 is a diagram of a reactor unit of FIG. 1.
Figure 3:
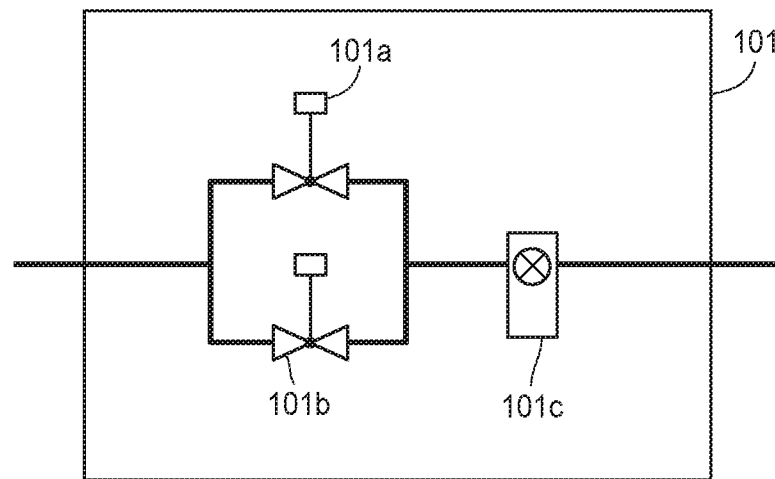
FIG. 3 is a diagram of a totalizer equipment entity used in the reactor unit of FIG. 2.

FIG. 2 illustrates one of the reactors of FIG. 1, in particular the Reactor 01, in more detail. As similarly illustrated in FIG. 1, Reactor_01 of FIG. 2 includes the reactor tank 100, the input valves systems 101, 102, 103 and 110 for the input of acid, alkali and water into the tank 100, the outlet valve system 104 for removing material from the tank 100 and the level sensor 105. As further illustrated in FIG. 2, each of the input valve systems 101, 102 and 110 uses a similar equipment entity, referred to as a totalizer, which includes two valves disposed in parallel with one another and a flow measurement device disposed downstream of the two valves. The totalizer for the input valve system 101, which is illustrated in more detail in FIG. 3, includes an on/off type valve named coarse valve 101a, an on/off type valve named fine valve 101b and a flow meter 101c disposed downstream of the valves 101a and 101b. The totalizer 101 has one or more control modules or routines associated therewith that are used to control the input of the acid using the measurements made by the flow meter 101c. A first such control routine may perform fast flow control through the totalizer 101 using the coarse valve 101a and the fine valve 101b while a second such control routine may perform accurate flow control through the totalizer 101 using the coarse valve 101a and the fine valve 101b.

As will be understood from FIG. 2, the alkali input valve system 102 includes a totalizer having a coarse valve 102a, a fine valve 102b, and a flow meter 102c and the shared water input valve system 110 includes a coarse valve 110a, a fine valve 110b, and a flow meter 110c. Each of the totalizers 101, 102, and 110 has the same type of replicated equipment therein although they are used in different places on the same unit, i.e., the Reactor_01 unit. Likewise, Reactor_02 and Reactor_03 also include totalizes at the input valve systems 201, 202, 301 and 302.

Figure 4:
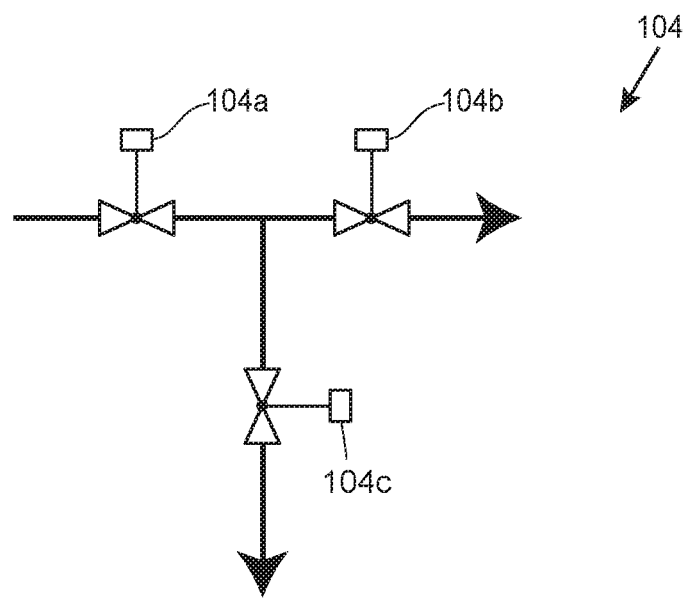
FIG. 4 is a diagram of an outlet valve system used in the reactor unit of FIG. 2.

Similarly, the outlet valve system 104 is another piece of replicated equipment including three valves. As best illustrated in FIG. 4, the outlet valve system 104 includes a main outlet valve 104a which must be opened for any material to be released from the tank 100, a product valve 104b which must be opened in conjunction with the main outlet valve 104a to deliver product from the tank 100, and a drain valve 104c which must be opened in conjunction with the main outlet valve 104a to drain material, such as waste product, cleaning fluids, etc. from the tank 100 into a drainage or refuge system. Of course, one or more control routines are associated with the outlet valve system 104 to control the states of the valves 104a, 104b and 104c to close the tank 100, to drain the tank 100 or to empty product from the tank 100.

To create and change a process configuration, a configuration application 50 stored in one of the workstations 14 of FIG. 1 includes a set of module class objects 52 for use in configuring the process control plant 10. The module class objects are especially useful when configuring a plant with numerous sets of replicated equipment. Generally speaking, a different module class object 52 can be created for each different type of physical unit or equipment that is replicated or used within the process plant 10, for each type of control activity that is replicated or used within the process plant 10, for each different type of display application that is replicated or used in the process plant 10, etc. Once created, the module class objects 52 can be used to configure elements of the process plant 10 that correspond to module class objects.

The module class objects 52, which are essentially generic versions of process entities and are not tied to any particular process entity, can have lower-level objects or instances 53, 54, 55 and 56 (referred to herein as module objects or module blocks) associated therewith. The term "process entity," as used herein, generally refers to a subset of the process plant 10 or environment that may be integrally identified, categorized or grouped. For example, a process entity may be a physical area of the plant, a type of equipment, a type of control function, a group of related displays, or other category. Process entities may include other process entities. For example, a process entity corresponding to "valves" may include lower level process entities such as "gas valves" or "water valves," and the lower level process entity "water valves" may include still lower level process entities such as "unidirectional water valve" and "bidirectional water valve."

As mentioned above, as used herein, module class objects generally are generic or categorical indications of process entities. A module object 53, 54, 55, 56 may be created or derived from a module class object and thus may inherit the same structure and properties as the module class object from which it was created or derived. However, each module object is tied to a particular entity within the process plant 10. Thus, a single module class object 52 may be created to represent a particular type of reactor unit (no matter how many of those reactor units are present within the plant 10), while a different module object 53 may exist or be created for each of the different reactor units of that type actually present within the plant 10.

The module objects created or derived from a module class object are associated with and owned by the module class object. As a result, changes made to the module class object can be reflected in or propagated to each of the module objects associated with that module class object. Therefore, when a number of module objects have been created from a particular module class object, with each of the different module objects tied to different process entities, each of the different module objects can be changed by simply changing the module class object and having the changes propagated down to the associated module objects. As will be discussed, the propagation may automatically occur when the module class object is changed, or the time of propagation may be selected.

The module class objects 52 of FIG. 1 may be what are commonly referred to as objects in an object oriented programming environment or language. As a result, these objects have the ability to own or to refer to other objects. Generally speaking, the module class objects 52 are high level objects which can include indications or definitions of individual elements such as control routines, equipment or other elements associated with a process entity along with a definition or indication of the manner in which those individual elements interact with one another, such as the way in which physical elements are interconnected or the way in which logical elements operate in conjunction with the physical elements. In other words, a module class object may be an object within, for example, an object oriented programming language, that provides the basis for control and viewing of a particular piece of or group of equipment, a control element, a display, etc. within the process plant 10 and may be useful for creating many instances of that element to be used to configure different replicated equipment within the process control plant 10.

Basically, each module class object is a configuration container including a generic definition of a process entity in the form of all of the different control and/or display applications or routines that are applicable to that entity to be used by the controllers 12 to control that entity or by the workstations 14 to perform display activities with respect to that entity. The module class object may represent a process entity of any nature, such as a unit, a piece of equipment, a control entity, a display application, etc. During the configuration of the process plant 10, the module class object may be used to create configuration instances of the process entity for any number of different process entities that conform to the definition provided by the module class object, with each configuration instance (the module object created from the module class object) being associated with or tied to a different actual process entity. These different module objects include, among other things, control routines and/or display routines bound to particular process entities as disposed within the process plant 10, with these control routines being able to be downloaded and used within the controllers 12 of FIG. 1 to perform actual control activities on the process entities and with the display routines being able to be downloaded to workstations 14 to perform actual display activities with respect to the entities during operation of the process plant 10.

Different types of module class objects may reflect process entities of different scopes and, therefore, contain control and/or display routines configured to operate on or with respect to process entities of different scope. The larger the scope of the process entity, such as a unit, the more control and/or display routines will typically be associated with the module class object and the easier it is to configure sections of the plant using those module class objects. However, the larger the scope of the process entity associated with a module class object, the less likely that the process will include replicated equipment at that scope and, thus, the less likely the module class object is to be useful on a large scale. Conversely, the lower the scope of the process entity associated with a module class object, the more likely the module class object is able to be used in various different locations of the plant, but the less amount of configuration is performed when using that module class object in any particular instance. In any event, the module class objects enable configuration to be performed for different replicated equipment at higher levels of abstraction than at the control module level, which makes configuring a process plant with replicated units and other equipment easier and less time consuming when using module class objects, especially module class objects of a large scope, such as at the unit level.

Consequently, multiple levels of objects are possible. For example, objects corresponding to instances 53, 54, 55, 56 created from module class objects 52 (e.g., "instance objects") may themselves be parent objects to a set of one or more instance children objects (not shown). One or more of the instance children objects may be a parent object to yet another level of children objects, and so on. As used herein, a "process element object" generally refers to a lowest level of object which corresponds to an elemental process entity to which a configuration is downloaded, such as a valve, sensor, graphic shape, or controller. Thus, a process element object may be an instance object that has no children objects.

In one example, when configuring a process control system, a configuration engineer may create a single module class object for the different elements replicated within the process plant, such as for the different reactors of FIG. 1. Thereafter, the configuration engineer may create instances of the module class object (module objects) for each of the actual reactors of FIG. 1. Each such created module object will include control routines used by the controller 12*a* to operate one of the reactors of FIG. 1 and is specifically tied to or bound to the equipment within the one of the reactors of FIG. 1. These control routines can then be downloaded to the controller 12*a* and used during operation of the process plant 10. However, once created, each of the module objects is still tied to the module class object and can be controlled by the module class object to be changed, to provide or reject access to the module object, etc.

While there are many different possible types of module class objects that can be created or used within a process plant to perform configuration activities within the process plant, four specific types discussed herein as examples include unit module class objects, equipment module class objects, control module class objects and display module class objects. Generally speaking, each different type of module class object is designed or intended for a different scope of control or use within the process plant 10. A unit module class object is intended to be used to represent (and to configure) control activities for a broad scope of equipment within a process plant. In particular, a unit module class object is intended to model or be used to configure an inter-related set of equipment (typically replicated equipment) such as, for example, the reactors of FIG. 1, having individual elements that work in concert with one another in some known manner.

An equipment module class object is intended to be used to represent (and to configure) control activities for a less broad scope of physical equipment within the process plant. The equipment associated with an equipment module class object is generally one or more physical entities, such as valves, flow meters, etc. that make up a subsystem of a unit and the equipment module class object may include one or more commands or algorithms, which may be command driven algorithms (CDAs), state driven algorithms (SDAs), sequential function chart (SFC) algorithms, function block diagram (FBD) algorithms, phase algorithms, etc., to be performed on the piece of equipment. Thus, an equipment module class object is aimed at configuring the control of multiple low level components or entities within a unit to provide a basic set of functions on that equipment as used within the unit. As is known, a command driven algorithm (command driven control logic) is used when the low level components must be coordinated through multiple steps to accomplish a function. For example, a valve may need to be opened for a particular amount of time and then closed while another valve is opened and then closed. The totalizer 101 of FIG. 3 uses this type of command driven algorithm to first initiate and then manipulate the coarse valve and the fine valve based on the readings of the flow meter to provide the desired total flow through the totalizer. A state driven algorithm (state driven control logic) may specify the states of different low-level components which can be manipulated in a single step. Such a state driven algorithm might be used in the outlet valve system 104 of FIG. 4 in which the states of the different valves therein are controlled differently (but in a single step) based on the desired state of the outlet valve system 104 to close the tank 100, to drain the tank 100 or to deliver product from the tank 100.

A control module class object is intended to be used to represent (and to configure) individual control elements or control modules within the process plant. A control module class object provides or specifies a particular type of control to be performed on a plant entity, such as a valve, meter, etc., a piece of equipment or even on a unit. Generally speaking, a control module class object provides a particular type of control programming, such as a set of communicatively interconnected function blocks defining some control module to be executed in a controller, useful to perform replicated control activities within a process plant. In most cases, a control module class object may provide a generic control strategy to manipulate a single device or a related set of devices.

A display module class object is intended to be used to represent (and to configure) display activities to be viewed by a user, such as to a control operator, during operation of the process plant 10. Thus, a display module class object may specify the programming needed to generate a display of a certain type within an operator workstation 14 of FIG. 1 and the programming needed to be run in one or more of the workstations 14 (as well as any other devices within the process plant 10) to enable that display to obtain the proper information from the plant during operation of the plant 10. Types of display class modules include, for example, alarm displays, configuration viewing displays, operation viewing displays, diagnostic displays, etc. Of course a display module class object may provide a display representing or tied to any desired scope of physical elements or entities within a process plant. For example, a display module class object may display information about an entire area, a unit, a piece of equipment, a control element, or any combination of these elements within the process plant 10.

Figure 5:
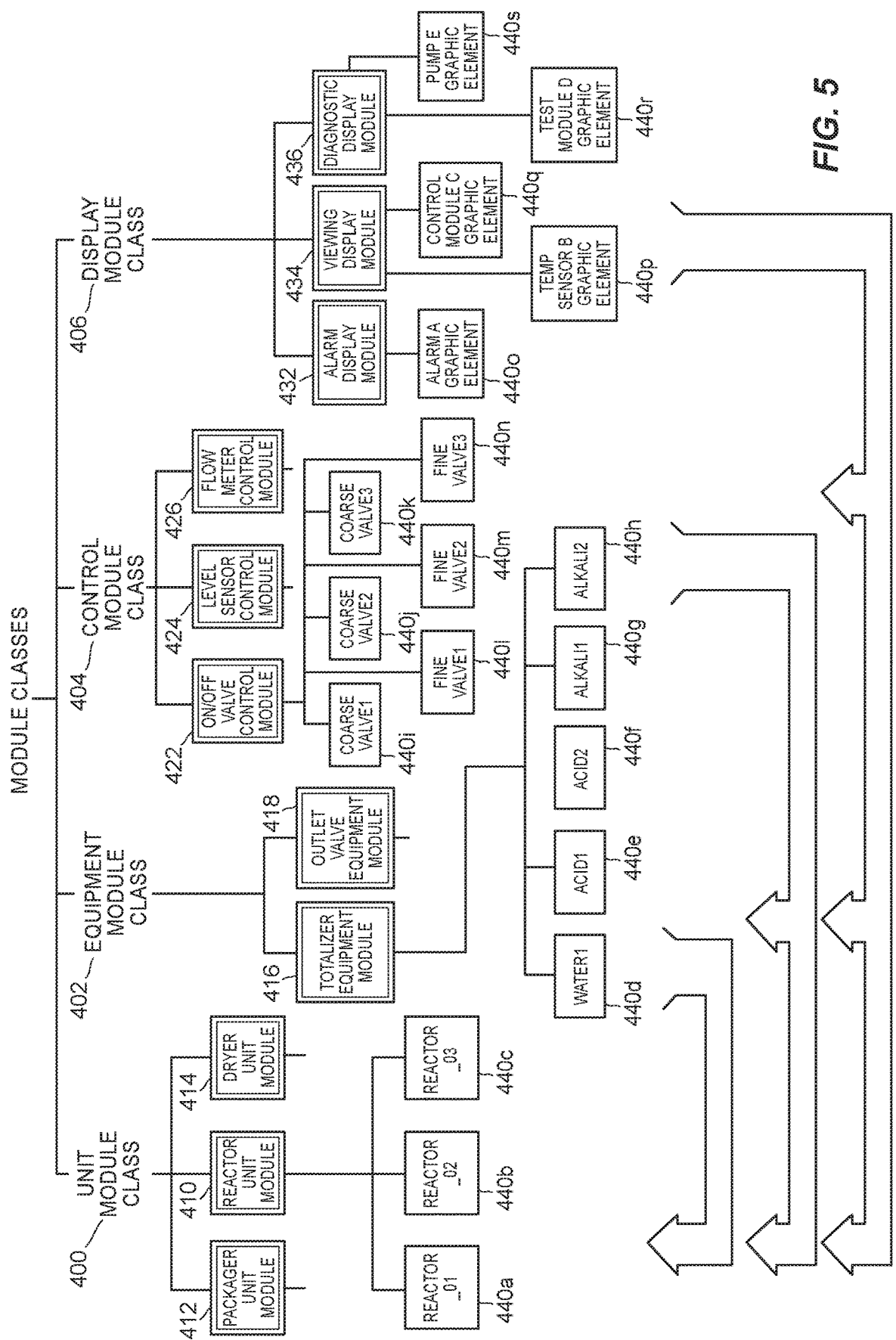
FIG. 5 is an example logical diagram illustrating the interrelationships between module class objects and associated module objects for unit, equipment, control and display types of module class objects.

Referring to FIG. 5, a hierarchical graph illustrates the interconnections between the different types of module class objects used in the configuration application 50 of FIG. 1 and the interrelationship between module class objects and module objects developed from those module class objects. Starting at the top of the graph of FIG. 5, module class objects (or "class objects," as interchangeably referred to herein) are separated by module class type into one of a unit module class type 400, an equipment module class type 402, a control module class type 404 and a display module class type 406. Of course, other types of module class objects may be provided or used as well, with the four types illustrated herein being merely exemplary module class types. Individual module class objects (which may be high level objects in, for example, an object oriented programming language, and are represented in FIG. 5 with a double outline for the sake of clarity) fall under each of the different types of module classes 400, 402, 404 and 406. In particular, there may be numerous different unit module class objects for different units or types of units within the process plant 10. For example, a reactor unit class module object 410 may represent a particular type or configuration of a reactor within the process plant 10. Likewise, a packager unit module class object 412 may represent a particular type or configuration of a packaging unit within the process plant 10 and a dryer unit class module object 414 may represent a particular type or configuration of a dryer unit within the process plant 10. Of course, there may be more than one reactor unit module class object to represent reactors that are different from one another in physical makeup. Further, no attempt is being made to list all of the different types of units within a plant that can be represented or modeled with a unit module class object, and one of ordinary skill in the art will realize that there are many different types of units in different types of plants that may be modeled or represented with unit module class objects.

Similarly, there may be many different equipment module class objects used to represent, model and configure different types of equipment within the process plant 10. Examples illustrated in FIG. 5 include a totalizer equipment module class object 416 and an outlet valve equipment module class object 418, each of is associated with different types of equipment (and preferably replicated equipment) within the process plant 10. In the same manner, there may be many different types of control module class objects, illustrated in FIG. 5 as an on/off valve control module class object 422, a level sensor control module class object 424, and a flow meter control module class object 426. Moreover, display module class objects are illustrated in FIG. 5 as an alarm display module class object 432, a viewing display module class object 434 and a diagnostic display module class object 436. Of course, any other desired unit, equipment, control and display module class objects may be created and used within the configuration application 50 of the process plant 10 according to the principles described herein.

Each module class object may have sub-objects associated therewith or owned thereby. These sub-objects may be module class objects in themselves or, as illustrated in FIG. 5, may be module objects which are created as instances of the module class objects to which they belong. Such instances are interchangeably referred to herein as "module objects," "instances," "instance objects" or "module instance objects" of the module class object on which they are based or from which they are created. FIG. 5 illustrates that the reactor unit module class object 410 has three reactor module objects named Reactor_01 (reference 440*a*), Reactor_02 (reference 440*b*) and Reactor_03 (reference 440*c*) associated therewith, with these reactor module objects corresponding to (i.e., bound to) the respective reactor class object 410 of FIG. 1. FIG. 5 also illustrates the totalizer equipment module class object 416 as having or owning five different children module objects named Water1, Acid1, Acid2, Alkali1 and Alkali2 (references 440*d*-440*h*). Likewise, the on/off valve control module class object 422 is illustrated as including children module objects named Coarse_Valve1, Coarse_Valve2, Coarse_Valve3, Fine_Valve1, Fine_Valve2 and Fine_Valve3 (references 440*i*-440*n*). Additionally, FIG. 5 illustrates the Alarm_A graphic element object 440*o* based on the alarm display module object 432, the Temp_Sensor_B graphic element 440*p* and the Control_Module_C graphic element 440*q* based on the viewing display module object 434, and the Test_Module_D graphic element 440*r* and the Pump_E graphic element 440*s* based on the diagnostic display module 436. In a similar manner, each of the other unit, equipment, control and display module class objects of FIG. 5 may have one or more module objects associated therewith. However, for the sake of simplicity, these module objects are not illustrated in FIG. 5.

In the graph of FIG. 5, each of the Reactor_01, Reactor_02, and Reactor_03 unit module objects, the Acid1, Acid2, Alkali1, Alkali2 and Water1 totalizer (equipment) module objects (references 440*a-h*), the Coarse_Valve1, Coarse_Valve2, Coarse_Valve3, Fine_Valve1, Fine_Valve2 and Fine_Valve3 control module objects (references 440*i*-440*n*), the Alarm_A, Temp_Sensor_B, Control_Module_C, Test_Module_D, Pump_E graphic element objects (references 440*o*-440*s*) and the other unit, equipment, control and display module class objects are individual objects tied to actual process elements within the process plant 10, such as units, equipment, control modules, display applications, and graphical or graphic display elements within the process plant 10. As such, the objects 440*a*-440*s* are referred to interchangeably herein as "process element objects," "process element module objects," or "element objects." Similarly, each of the objects 440*a*-440*s* is a "child" or a "child object" of its respective "parent" or "parent object" 410-436. For example, because there are multiple physical acid totalizers used in the plant 10, there will be multiple acid totalizer process element module objects created in the configuration routine, with a separate child acid totalizer process element module object existing for each of the individual acid totalizers that exists within the plant 10. However, each of the child separate totalizer process element module objects is tied to or is owned by the same parent totalizer module class object 416. Of course, the graph of FIG. 5 illustrates only a limited number of module class objects, module objects, instance objects, and process element objects associated therewith, and it will be understood that other types of module class objects may be provided and that any desired number of module objects, instance objects, and process element objects may be created from each of the different module class objects.

Furthermore, an object that is a child of a parent object may itself have children objects. For example, the class object flow meter control module 426 may include two children instance objects, e.g., "Water_Flow_Meter module" and "Solvent_Flow_Meter module" (not illustrated). Water_Flow_Meter module may include respective children process element module objects corresponding to respective actual flow meter elements within the process plant 10, such as "Water_Flow_Meter1" and "Water_Flow_Meter_2." As such, the process element objects "Water_Flow_Meter1" and "Water Flow_Meter_2" are based on "Water_Flow_Meter module," which is based on flow meter control module 426.

Each of the module class objects of FIG. 5 (and therefore each of the module objects of FIG. 5) may include, as part of the object, a definition or indication of the physical or logical process elements that define or make up the module and, if desired, the manner in which those process elements interact either physically or logically with one another to perform some activity within the process plant 10. For example, unit module class objects will typically include an indication of all of the physical and control elements within or making up the process entity being defined as the unit. The unit module class object may also define the particular makeup of the individual parts and how those parts are physically tied together to operate as a unit. Likewise, an equipment module class object will typically include the control routines or control modules to be used to control the entity defined as the piece of equipment and commands which use the control routines or control modules to define the manner in which the parts interact either physically or logically, to operate as a piece of equipment when disposed within the plant 10. Similarly, each control module class object will define a control activity, typically in the form of a control algorithm of some sort, to be performed within the plant. Also, each display module class object may define, among other things, a display screen configuration, the information to be displayed, and graphic or graphical elements representing various elements of the process plant 10 and to be presented on the display screen, as well as the data to be collected and the data manipulations to be performed on collected data, if any, for specified types of units, equipment, areas of the plant, or any other physical or logical entity within the plant 10.

As part of a module class definition, a module class object may indicate or define other module class objects to be incorporated or used therein. When this is the case, the module objects created from that module class object will incorporate, refer to or include other module objects created from other module class objects according to the relationships defined at the module class level. Although not strictly necessary, unit module class objects may incorporate other unit module class objects, equipment module class objects, control module class objects and display module class objects, while equipment module class objects may incorporate other equipment module class objects, control module class objects and display module class objects. Control module class objects may incorporate or refer to other control module class objects and display module class objects. However, if desired, other module class object interrelationships may be used as well. These incorporation relationships are illustrated by the large arrows at the bottom of the graph of FIG. 5 indicating that any of the display module class objects may be included in or referred to by any of the control, equipment and unit module class objects, that any of the control module class objects may be included in or referred to by any of the equipment and the unit module class objects and that any of the equipment module class objects may be included in or referred to by any of the unit module class objects. It will be understood that module class objects may incorporate other module class objects of the same type. For example, a unit module class object may incorporate, as part of its definition, another unit module class object. In a similar manner, an equipment module class object may include another equipment module class object, a control module class object may include another control module class object and a display module class object may include another display module class object. Of course, if desired, a module class object may use or incorporate another module class object multiple times. For example, a reactor unit module class object may incorporate or use the totalizer equipment module class object numerous times because the reactors being modeled by the reactor unit module class object include multiple instances of totalizers.

It will also be understood that, when a first module class object incorporates or uses a second module class object, any module object created from or as an instance of the first module class object will incorporate or use a module object created from or as an instance of the second module class object. Thus, when the reactor unit module class object 410 uses a totalizer module class object 416 as an element or part thereof, the Reactor_01 module object will use or include one of the totalizer module objects, such as the Acid1 module object 440e, as an element or part thereof. Similarly, if a totalizer equipment module class object incorporates or includes an outlet valve equipment module class object, a module object created from the totalizer equipment module class object, which will be uniquely named as, for example, Totalizer_1, will include a module object created from the outlet valve equipment module class object and uniquely named, for example, Outlet_Valve_2. In this manner, the relationships between the module class objects as defined at the module class object level are reflected in the module objects developed or created from these module class objects. This interconnection or referencing between module class objects (and therefore module objects) enables great variability and high transferability of objects during configuration activities so that, after a set of primitive module class objects, such as control and equipment module class objects, are created, more complex module class objects, such as unit module class objects, may be easily created by referencing the primitive module class objects. Of course, while module class objects can reference or use other module class objects, they can also or instead define or use simple objects or process element objects, such as valves, sensors, etc. which have no associated module class object. These simple or process element objects will be fully defined in terms of the control routines used therefor, within the module class object itself.

Figure 6:
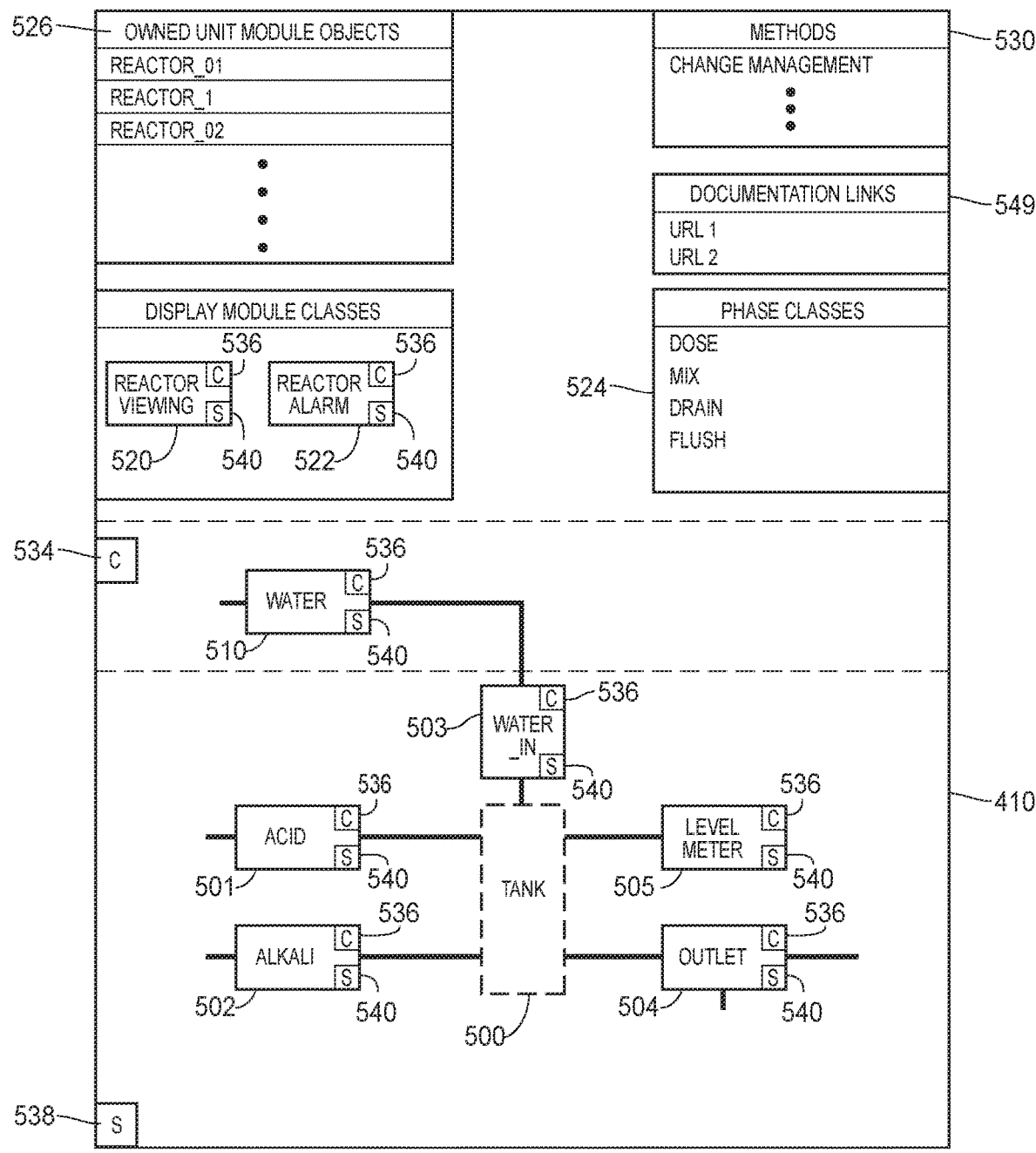
FIG. 6 is an example logical diagram of reactor unit module class object, which can be used to perform configuration activities for reactors within the plant of FIG. 1.

An example reactor unit module class object 410 is illustrated in FIG. 6 to show one manner of describing or defining the entities associated with or present within a unit module class object. As illustrated in FIG. 6, the reactor unit module class object 410 includes an indication of a tank 500, which is a simple object or process element object within the process plant 10 for which no module class object exists. The tank 500 is illustrated in dotted lines because there is no control or low-level activities need to control, or perform input/output activities with respect to the tank. As a result, the tank 500 is included merely to illustrate the interconnections between the other objects associated with the reactor unit module class object 410. The reactor unit module class object 410 also includes three totalizers 501, 502 and 510 named Acid, Alkali and Water, respectively, which are three different references to the totalizer equipment module class object 416 of FIG. 5. The Water totalizer module class object 510 is illustrated in a section of the unit module class object 410 that is separated by dotted lines to indicate that this is a shared module class object and, thus, that the unit module class object 410 has shared control over this object with other unit module class objects. The outlet object 504 of FIG. 6 is a reference to the outlet valve equipment module class object 418 of FIG. 5, the level sensor 505 is a reference to the level sensor control module class object 424 of FIG. 5 and the water_in valve 503 is a reference to a valve object which may be a simple valve element (and so fully defined within the unit module class object 410) or which may be a reference to a valve control module class object defined elsewhere in the configuration strategy. The physical interconnections between the different entities or parts of the reactor unit module class object 410 are also illustrated for the sake of defining the interconnections between these different elements. As noted above, the unit module class object 410 or other module class objects of any type, can include simple elements which are fully defined within the module class object (including any generic control routines associated therewith) and/or can include references to module class objects defined exterior to the module class object.

The unit module class object 410 also includes two example display module class objects called a reactor viewing display 520 and a reactor alarm display 522 which are references to the viewing display module class object 434 and the alarm display module class object 432 of FIG. 5. These objects define generic display activities for displaying the state (e.g., the fill level of the tank) and alarms associated with any of the equipment or parts of the reactor unit defined in the reactor unit module class object 410. Similarly, the unit module class object 410 may include other elements, such as phase class objects, illustrated in the box 524 as a Dose, a Mix, a Drain and a Flush phase class object, each of which defines a generic control routine to be operated on the unit defined by the unit module class object 410. The unit module class object can have zero or more associations to phase class objects. The phase class objects 524 can be defined elsewhere and imported into the unit module class object 410 in any desired manner. In a sense, the phase classes 524 are commands or routines that may be operated on a unit defined by the unit module class object 410 to perform different functions, such as filling the unit, heating the unit, emptying the unit, cleaning the unit, etc.

Moreover, the unit module class object 410 may include a memory or section 526 that stores references to the module class objects which are created by the configuration application 50 (FIG. 1) from this unit module class object 410. The section 526 is essentially a list of the module objects that were created from and that are owned by the unit module class object 410. (Of course this list or other indication of the owned module objects can be stored in the workstation or by the configuration application 50 in any desired manner and does not have to be physically contained in the unit module class object 410). In any event, in the example of FIG. 6, the unit module class object 410 owns module class objects Reactor_01 440*a*, Reactor_02 440*b*, Reactor_03 440*c*, etc., each of which has been created from the reactor unit module class object 410.

The unit module class object 410 also includes a set of methods 530 that can be performed by the unit module class object 410 either during or after the configuration activities. The methods 530 may include a change management method or application that automatically propagates changes made to the unit module class object 410 to each of the module objects 526 owned by the unit module class object 410. Other methods may include security control methods which perform security or access control with respect to the unit module class object 410 and/or with respect to any of the unit module objects 526 owned thereby or methods that enable a user or configuration engineer to specify change parameters and/or security parameters for the module class object or any module objects created therefrom. Of course different methods 530 may perform any other procedure on or with respect to the unit module class object 410.

If desired, the unit module class object 410 may control the manner in which changes made to the module class object 410 are propagated to the unit module objects 526 as well as the manner in which security access is set up in the unit module objects 526. One manner of providing this functionality is to set one or more flags or parameters within the unit module class object 410 to specify the manner in which changes are to be propagated to and security is to be handled in the unit module objects 526. In particular, one or more change propagation parameters may be set to specify whether or not changes made to the unit module class object 410 are to be automatically propagated to the one or more of the module class objects 526. These change propagation parameters may be stored in the unit module objects 526 and may specify for the entire unit module object, or on a sub-element by sub-element basis, whether changes made to the unit module class object are to be reflected in the unit module object. For example, the unit module class object 410 may include a global change parameter 534 (marked "C") which may be set in each unit module object created from the unit module class object 410 to enable or disable changes made to the unit module class object 410 from being automatically reflected in the unit module object Likewise, each sub-element or block, such as the blocks 501-505, 510, 520 and 522 may include a change parameter 536 specifying, for that block only, whether changes made to that block in the unit module class object 410 are to be reflected in the unit module object. Of course, the different blocks of a unit module object may be set differently so that, for example, changes made to the Acid block 501 of the unit module class object 410 will be propagated to the corresponding Acid block of a particular one of the module objects 526 but so that changes made to the Alkali block 502 of the unit module class object 410 will not be propagated to the Alkali block of the particular one of the unit module objects. Furthermore, the different unit module objects created from a unit module class object may have the change parameters set differently from one another so that changes to the Alkali block 502 within the unit module class object 410 are propagated to the corresponding Alkali block of a first one of the unit module objects 526 but not to the corresponding Alkali block of a second one of the unit module objects 526. Of course, the change management method of the unit module class object 410 may access and use the change parameters of the unit module objects 526 to make or not make a change within those objects when the change is made in the unit module class object 410.

In a similar manner, the unit module class object 410 may include one or more security parameters which specify the manner in which security or access is controlled in each of the unit module objects 526. The unit module class object 410 may include a global security parameter 538 (marked "S") which may provide any desired level of security to the entire reactor unit module object created from the reactor unit module class object 410 and/or may include a different security parameter 540 for each sub-element of the unit module class object 410, such as for each of the blocks 501-505, 510, 520, 522, etc. which specifies a level of security for each of those blocks on a block by block basis. The global security parameter 538 may be a locking parameter that locks the unit module class object to all users except those having a preauthorized security access level. Of course, the security parameters 538 and 540 may specify any one of a number of different levels of security, such as no access, limited access, access to particular types or identities of users, etc., and the security levels may be set to be different in the different blocks and in the different unit module objects created from the same unit module class object. If desired, part of the security measures may include providing encryption on one or more methods or algorithms associated with the unit module class object.

It will be understood that the change and security parameters of the unit module class object 410 may be set to a default value, and that the corresponding change and security parameters of each unit module objects 526 created from the unit module class object 410 may take on this default value when created. However, the default change and security parameters may also be individually changed (by a user with proper security access) in the unit module objects 526 after these unit module objects are created. While the change and security parameters are discussed herein with respect to a reactor unit module class object, similar change and security parameters may be provided in other types of unit module class objects as well as in any desired types of equipment module class objects, control module class objects, display module class objects, etc.

If desired, the unit module class object 410 may include references, such as URLs or other references, to documentation stored for or associated with the unit class module object, including documentation associated with the unit or any sub-elements of the unit associated with the unit module class object 410. Such references are illustrated in FIG. 6 as references 549.

The embodiment shown in FIG. 6 depicts change parameters and security parameters as being associated with the unit module class object 410, and as indicating change propagation and security guidelines as applied to children or derived objects of the module class object 410. In some embodiments, the change parameters and/or the security parameters may additionally or alternatively be associated with a respective child object or a respective derived object of the module class object 410 (e.g., with reactor object 440*a*), and may indicate guidelines as to whether or not the respective child or derived object receives changes or incorporates security restrictions from one or more parent objects.

Figure 7:
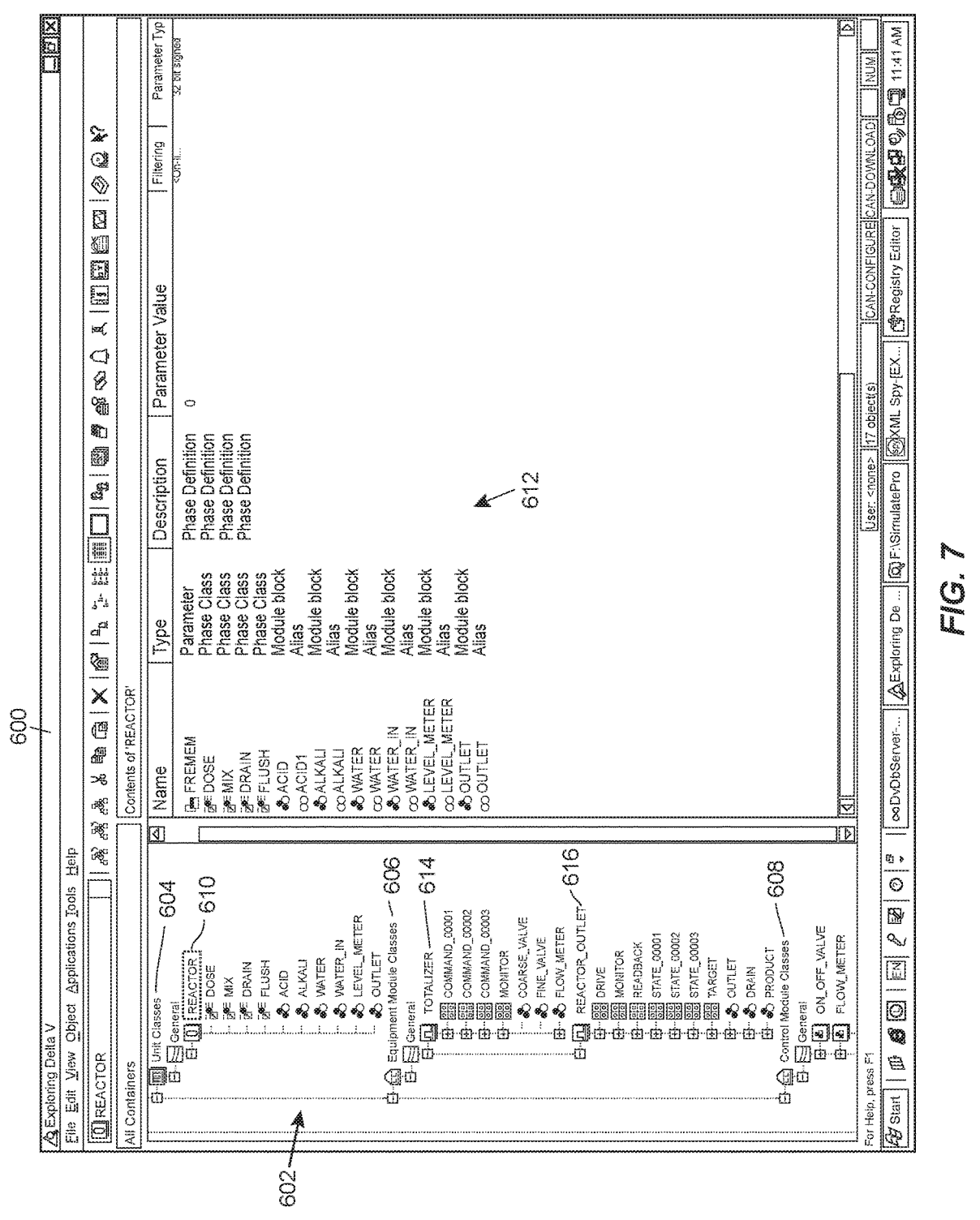

FIG. 7 depicts a screen display which may be created by the configuration application 50 of FIG. 1 during the process of a configuration engineer creating and using module class objects to configure the process plant 10. Generally, a screen display includes an explorer view on the left-hand side of the screen, which provides an organizational tree structure depicting the configuration of the process plant 10. Likewise, a screen display generally includes one or more information views on the right-hand side thereof. These information views provide further information about selected ones of the elements in the explorer view. The information that is able to be displayed to a user or changed by a user in the information views may be determined or controlled by the control and security parameters of FIG. 6 set for each of the different module class objects or sub-elements thereof. Thus, a particular element within the explorer view may be displayable or exposed to a user for viewing and/or changing based on the security and control parameters set in the module class object and propagated to the module objects depicted in the explorer view. Of course, as explained earlier, information may be hidden at all time, may be displayable or changeable only by a user entering a password or other security code, may be displayable at all times and not changeable, may be displayable and changeable at all times or any other combination of these or other security and change parameters. Still further, if desired, the displayability, visibility, or changeability of an element may be indicated in the explorer view using highlighting, graying out, color or any other technique to inform the user which elements can be displayed in more detail or changed.

In FIG. 7, a screen display 600 includes a portion of an explorer configuration view 602 depicted on the left-hand side of the display. The portion of the explorer view 602 illustrates a library which stores numerous module class objects, including unit module class objects 604, equipment module class objects 606 and control module class objects 608. A Reactor unit module class object 610 (which may correspond to the reactor unit module class object 410 of FIG. 6) is stored within the unit module class library 604 and includes indications of numerous sub-elements including a Dose, a Mix, a Drain, and a Flush phase class objects, and an Acid, an Alkali, a Water, and an Outlet equipment module class objects, a Water_In and a Level_Meter control module class objects and other objects as desired. Thus, as defined in the unit module class library 604, the Reactor unit module class object 610 includes indications of phase classes as well as indications of equipment module class objects and control module class objects. Because the Reactor unit module class object 610 is selected in the screen 600, the elements thereof are depicted in more detail on the right-hand side 612 of the screen 600.

Still further, the equipment module class library 606 includes a totalizer equipment module class object 614 (which may correspond to totalizer equipment module class object 416 of FIG. 7) and a Reactor_Outlet equipment module class object 616. The totalizer equipment module class object 614 includes three different portions of an algorithm (such as one of the algorithms 564 of FIG. 7) called Command_00001, Command_00002 and Command_00003. The module class object 614 also includes references to control module objects called Coarse_Valve and Fine_Valve (which are on/off type control module class objects) and Flow_Meter (which is a flow meter type control module class object). Still further, the Reactor_Outlet equipment module class object 616 includes a state driven control algorithm having different states called State_00001, State_00002 and State_00003, a Target, a Drive, a Monitor and a Readback module and an Outlet, a Drain and a Product valve control module object (which may be indications of or references to module blocks of the on/off control module class object type and which are named Outlet, Drain and Product or which may be simple objects). The command and state driven algorithms associated with the Totalizer and the Reactor_Outlet module class objects 614 and 616 may be any desired routines and may refer to control module objects within the equipment module class object to be used with those commands. In particular, the CDA or SDA command algorithms of the equipment module class objects may include expressions or actions which refer to control modules (or other equipment modules) by incorporating the names of those modules to indicate which piece of equipment is to be manipulated when performing the algorithm. The use of the name of the control module (or another equipment module) within these algorithms specifies the control module object referenced by or associated with the equipment module object in which the algorithm is located and the specific names will be bound or instantiated when the equipment module object is created from the equipment module class object.

Of course if desired, the screen illustrated in FIG. 7 and similar screens may be used by a configuration engineer to create and specify control algorithms within the Dose or other phase classes, or for any of the other modules, such as unit module class objects, equipment module class objects, and display module class objects to thereby create any desired module class object. After creating one or more module class objects as described above, the configuration engineer may then use these module class objects to configure elements within the process plant 10.

Any of the equipment or control modules could be designated within a unit module class object as a shared or a non-shared module object. A non-shared module object is completely owned by the higher level module object in which the non-shared module object is created. A shared module object is owned or associated with more than one higher level module object. The shared or non-shared nature of a module object influences the depiction of a module object in the explorer view. In particular, a non-shared module object designation results in a module object being depicted only under the higher level object within the control strategy, while a shared module object designation results in the shared module block or module object being depicted under each of the higher level module objects which share that element as well as a stand-alone module object in the explorer hierarchy.

It will be understood that, in a similar manner, the configuration engineer may use any other unit module class objects, equipment module class objects and control module class objects as well as display module class objects to create configuration elements for units, equipment, control elements and display elements within the process control environment according to the principles described therein. Further, the configuration engineer may make changes to the elements of the configuration of different process entities on a global basis by changing one or more of the unit module class objects and having those changes propagated to each of the module objects created from and associated with those unit module class objects. This feature makes changes within the configuration easier and less time consuming to make after a configuration has already been created. Moreover, the configuration engineer may specify an access level to different elements or components of module objects within the configuration system by setting security parameters within the module class objects. As noted above, the configuration engineer may specify a security on a module by module basis at any level, such as at the unit module level, the equipment module level, the control module level and the display module level. In this manner, some elements of a unit module object may be viewable while others may not be viewable.

Figure 7A:
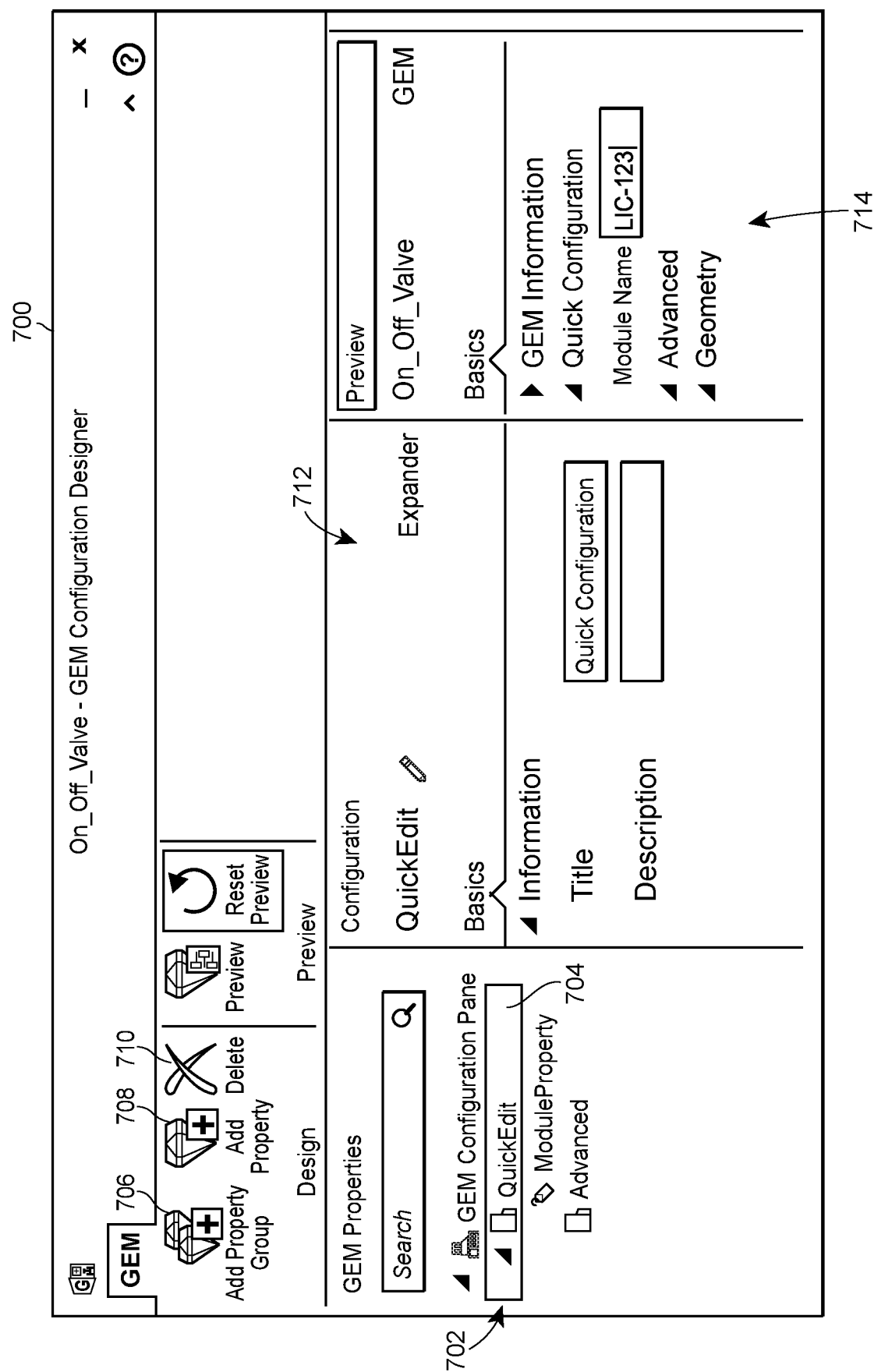
FIG. 7A is a second example depiction of a configuration screen which may be used by a configuration operator to configure a user interface for configuring a graphic element.

FIG. 7A depicts a screen display which may be created by the configuration application 50 of FIG. 1 during the process of a configuration engineer or operator creating and using a simplified configuration user interface (UI) to, in turn, create and use graphical objects to configure the process plant 10. Once configured, the simplified configuration UI may be stored as a configuration element object, which, when instantiated, instantiates a configuration display object in turn, resulting in a configuration display view for configuring a graphical object using a set of properties defined during the configuration of the simplified configuration UI. As with the screen display of FIG. 7, the screen display includes an explorer view on the left-hand side of the screen, which provides an organizational structure depicting the configuration of a configuration UI, including the properties and/or groups of properties to be included in the configuration UI for configuring a graphic element Likewise, the screen display generally includes one or more information views on the right-hand side thereof. In FIG. 7A, the information views provide further information about selected ones of the elements in the explorer view. As with the screen display of FIG. 7, the information that is able to be displayed to a user or changed by a user in the information views may be determined or controlled by the control and security parameters of FIG. 6 set for each of the different property groups or properties thereof.

In FIG. 7A, a screen display 700 includes a portion of an explorer configuration view 702 depicted on the left-hand side of the display 700. The portion of the explorer view 702 illustrates a library which stores numerous module class objects, including property module class objects 704. Property module class objects 704 may be individual properties or groups of properties of graphic elements. For example, with reference to FIG. 12 below, a Graphic Element Module or GEM of a valve includes several objects that define a module name (i.e., "DATADATA") and a shape, where the shape is comprised of two triangles, a semicircle and two connection line between the triangles and semicircle. In turn, the shape for the Valve GEM may have properties such as line thickness and fill color, and the name may have properties such as font style, font size and font color. Additional properties may include, but are not limited to, dynamic behaviors, dynamic behavior options, fonts, etc., and each may be defined by a value in configuring the GEM. The properties for the Valve GEM may be saved as a property group in a property module class object 704, shown in the explorer view 702 as "QuickEdit," with individual properties ("ModuleProperty") making up the group. Alternatively or in conjunction with property groups, properties may be presented individually in the explorer view 702. As such, when a simplified configuration UI is being created and configured, the configuration engineer or operator may select one or more of the library items defining individual properties or groups of properties to be included in the simplified configuration UI.

As seen in the tool menu of FIG. 7A, property groups may be added 706, individual properties may be added 708, or properties and property groups selected in the explorer view 702 may be deleted 710. For example, if a simplified user interface for a valve is being configured, the explorer view 702 may present all property groups for valves. The configuration engineer or operator may then add property groups, create additional property groups or modify existing property groups for configuring simplified configuration UIs.

Selection of the property group "QuickEdit" results in a display of the properties in an information view 712. In the information view 712, the configuration engineer or operator configures a simplified configuration UI, shown in a second information view 714, also referred to herein as a "preview." In this example, a simplified configuration UI is shown in the preview 714 as the simplified configuration UI is being configured. For instance, as seen in the information view 712, the title for the simplified configuration UI is "Quick Configuration", which is shown in the preview. In one example, the simplified configuration UI is a default configuration of basic properties such as size and position. The preview 714 eliminates any need to make a usage of the graphic element in order to see if the simplified configuration UI has the correct properties for the graphic element.

Generally speaking, the number of properties for a graphic element may number in the thousands. For example, each graphic element may have a shape, where shapes are stored within a class canvas and may number in the hundreds. In turn, each shape has a number of properties, such as color and line thickness. This results is a large number of properties for a configuration engineer to choose from, although the configuration engineer may not have use for the vast majority of properties. The simplified configuration UI allows a configuration engineer or operator of graphic objects a set of properties that are most likely to be used to configure attributes (e.g., shape) of the graphic object. Thus, the simplified configuration UI exposes the commonly-used properties to be configured for a graphic object, and exposes the properties in a logical order or groupings, with user-friendly names. The display screen 700 of FIG. 7A allows the simplified configuration UI to be configured to include the commonly-used properties for configuration of the graphic object, with different simplified configuration UIs being configured for different graphic objects (e.g., a reactor, a valve, etc.).

A configuration element object that is linked and bound to a graphic object, such as a GEM, is called upon when the graphic object is instantiated in order to provide definitions/values for the properties of the graphic object. For example, when the Valve GEM is instantiated, the configuration element object may instantiated, and values for the properties of the Valve GEM attributes are sent and displayed in a display view.

Figure 7B:
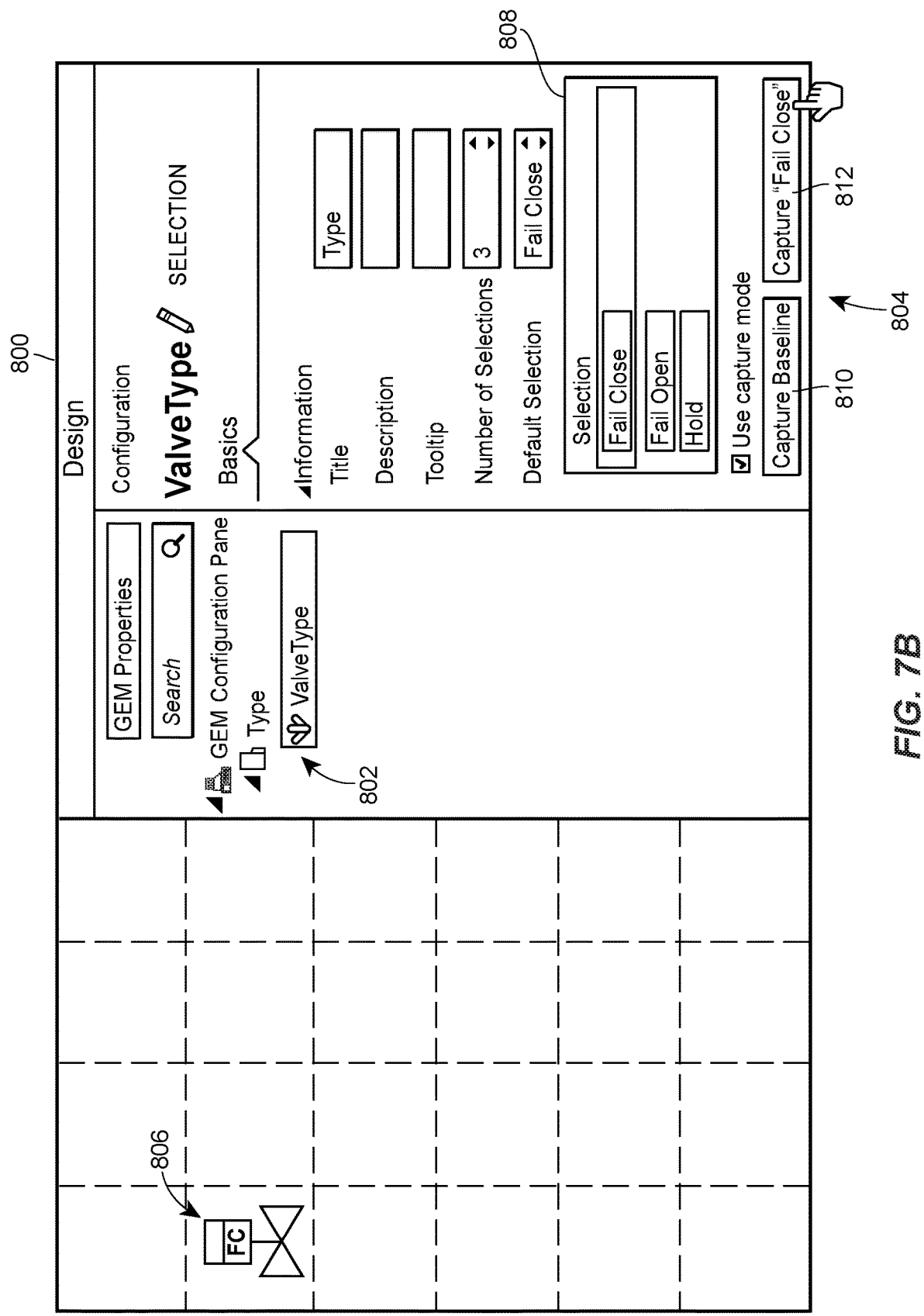
FIG. 7B is a third example depiction of a configuration screen which may be used by a configuration operator to configure a graphic element using the configured user interface of FIG. 7A.

FIG. 7B depicts a screen display 800 of a simplified configuration UI ("ValveType"), which may be created using the configuration application 50 of FIG. 1, as described above with reference to FIG. 7A. The screen display 800 includes a portion of an explorer configuration view 802 depicted on the left-hand side of the display 800, and an information view 804 on the right-hand side of the display 800. The portion of the explorer view 802 illustrates a library which may store numerous simplified configuration UIs ("GEM Configuration Panes"), which may be stored by type (e.g., "ValveType"). Selection of a type of simplified configuration UI results in a display of the simplified configuration UI in the information view 804. In the information view 804, the set of properties for a valve as defined during configuration of ValveType are displayed so that the configuration engineer or operator can, in turn, define values for the various properties of the Valve GEM in order to configuration the Valve GEM. In some cases, the values may be defined by direct input (e.g., text box) or by selection of options from a dropdown menu. In one example, default values may be provided for some or all of the properties of a graphic element, such as a default line thickness and color for the shape of a graphic element, and a default font and font size for the displayed name of the graphic element.

A preview 806 of the Valve GEM may be displayed as it is being configured and before creating a usage of the graphic element. In general, the simplified configuration UI provides a configuration display for configuring a graphic element object, where the graphic element object is to be later instantiated on a process control display view and corresponds to a process entity within a process plant. The simplified configuration UI presents a set of properties as defined during the configuration of the simplified configuration UI, each property in the set being selectable and definable to specify a value for an attribute of the graphic element object. For example, ValveType was configured to provide three selectable options 804 for a property of the valve—Fail Close, Fail Open and Hold. In this example, the option Fail Close is selected, and reflected in the preview 802 of the valve (i.e., "FC").

As mentioned above, a simplified configuration UI may be populated with default values of the various properties for the attributes of the graphic element. Using FIG. 7B as an example, a default dynamic behavior of the Valve GEM may be defined as "Hold" (i.e., the valve maintains its position (e.g., open or closed)). On the other hand, a graphic element may be loaded into the screen 800 for reconfiguration. That is, the graphic element already has a baseline configuration of properties for its attributes. Rather than reconfiguration the properties of the graphic element to default values in the simplified configuration UI, the values of the baseline configuration of the graphic element may be captured 810 (e.g., read) from the graphic element and used to populate the information view 804. Thus, if a configuration engineer or operator only needs to change one or less than all values for the graphic element, he/she is saved from having to redefine all the property values. For example, if only the dynamic behavior of the valve 806 is to be changed from "Hold" to "Fail Close" (i.e., in the event of failure, the valve closes), a user may capture 810 the baseline configuration of the Valve GEM, select "Fail Close" from the list of dynamic behaviors for the valve, and capture 812 the "Fail Close" property, and update the dynamic behavior property of the Valve GEM. The update of the Valve GEM may link and bind the updated property to the graphic element object of the Valve GEM, and store the property configuration as a configuration element object, such that whenever the Valve-GEM is instantiated, the graphic element object reads the property from the configuration element object, and a display object loads the graphic element object with the configured properties.

Of course, once the configuration system is complete and the module objects are bound to the individual process entities within the process plant 10, the control and display modules or elements associated with these modules may be downloaded to the proper controllers 12, devices, and workstations 14 of FIG. 1 for execution during operation of the process plant 10.

The techniques, systems and methods described herein allow for configuration of process plants and process control systems using flexible class objects, instance objects and process element objects. In an example, propagation of changes or modifications to a parent object are phased or delayed to one or more respective children objects so that the timing of configuration updates may be controlled in a process plant. The phasing and/or delay is indicated by a user, in an embodiment, and may be different for different children objects. In another example, changes made to a parent object are applied to selected children objects but not to all of the children objects of the parent. A user may indicate a selection of the desired children objects to which the changes are to be applied. In yet another example, changes made to a child object are selectively applied to its parent object and/or to one or more children objects. The selection of the desired parent and/or children object(s) to which the changes are to be applied may be indicated by a user. Additionally or alternatively, a user may make draft changes or modifications to various objects without automatic distribution and/or instantiation (e.g., creation of an executable file) of the changes. Different sets of draft changes may be saved as different versions of the various objects, and may be tested off-line without affecting the live operations of the run-time or real-time operations of the process plant.

Further, the techniques, systems and methods described herein apply to items or objects stored in a library (e.g., templates and/or user-created library objects) of the process control system or plant 10. Alternatively or additionally, the techniques, systems and methods apply to items or objects stored in a configuration database 25 of the process control system or plant 10, which, in some cases, are created or are derived, at least partially, from library items or objects.

Still further, one or more of the flexible configuration techniques and objects described herein may be used in a process plant, such as the process plant 10 of FIG. 1, or in other suitable process plants or process control systems. In an example, one or more of the techniques described herein is performed by a configuration application 50 executed on one or more workstations 14 of FIG. 1. In another example, one or more of the techniques described herein is performed at least partially by a remote application (e.g., a web client or other remote access means) that accesses the application. In some embodiments, one or more of the flexible configuration techniques are used in combination with other configuration techniques other than those described herein.

Moreover, the flexible configuration techniques and objects described herein are implemented using module classes such as those described in FIG. 5. The flexible configuration techniques described herein, however, may be implemented using other suitable module classes, software architectures, and/or programming techniques.

Item or Object Drafts:

As previously discussed, embodiments of the flexible configuration techniques, systems and methods described herein enable users to make changes to library and system configuration items or objects without requiring downloads that may adversely affect the runtime process plant or process control system. Library items or objects generally are template objects stored in a centrally accessible location or library (e.g., the configuration database 25 or other storage device that is accessible to the workstations 14 and to other interfaces and computing devices). System configuration items or objects (and some library items or objects) are generally based on or derived from one or more library items. For some items and objects, at least some aspects are customized by a user.

The term "item," as used herein, refers generally to objects such as a class object, an instance object, or a process element object. An item may be stored in a library (e.g., a "library item" or "library object"), or an item may be stored in a system configuration data storage area (e.g., a "configuration item" or "configuration object"). Additionally, the term "item," as used herein, may also generally refer to an item that is internal to and defined by an object, e.g., at least part of the content of an object. Possible internal items of objects include, for example, methods, actions, data fields or other attributes, an input, an output, a type of I/O (e.g., a type of an input/output card or device via which the controller, e.g., the controller 12 or 12a of FIG. 1, communicates with the system), functions or usages, definitions, parameter values, a reference to a parent object, a reference to a child object, a reference to another object that is neither a parent object nor a child object, and other internal items. An internal item may be absolutely defined (e.g., a data field storing a constant value or expression), or an internal item may be relatively defined, such as by a reference to an absolute value, an absolute expression, another object, or another reference. For example, internal items defined by a graphic display element object may include a reference to a parent object, one or more fields, triggers, functions, view definitions, event handlers, animations, placeholders, parameters, tables, etc. In another example, internal items defined by a control module element object may include a reference to a parent object, one or more inputs, outputs, parameters, function blocks, interconnections, field expressions, external references, actions, algorithms, transitions, etc.

The term "linked" item, as generally used herein, refers to an object or item whose structure and initial values are derived or created from a parent object or item, and/or whose structure and initial values are provided to a child object or item. As such, a linked item may be a parent item. Additionally or alternatively, a linked item may be a child item. Accordingly, an "unlinked" item, as generally used herein, refers to an item or an object that does not have a parent object and does not have any children objects. Linking (e.g., maintaining indications of parent/child object relationships) allows users to define a structure and initial values of a parent item or object, and then share the same structure and initial values with instance or children objects. For example, when a user wants to make a modification or change that affects all instances of a class object, the user merely modifies the class object, and the changes are distributed or propagated to the linked instances of the class object.

The term "current item" or "current object," as used herein, denotes an item or object which has been instantiated (and in some cases, downloaded), and which may executed during a run-time of a corresponding process element in the process plant 10. For example, when a current process element control object is instantiated, executable configuration code corresponding to the current process element control object is downloaded to a process element such as a controller 12 or 12a of FIG. 1, and the controller 12 or 12a is configured to operate, during run-time, according to the functions, inputs, outputs and other conditions as defined by the instantiated current process element control object. In another example, a current graphic display view object is instantiated at a user interface when a view corresponding to the definition included in the current graphic display view object is built and presented on the user interface. Typically, a change made to a particular internal item defined by an object typically does not affect other internal items defined by the object.

The terms "modification" and "tweak" are interchangeably used herein to denote one or more changes to the contents of an object while maintaining a link to its parent object. One example of a modification or change to a current item or object is the addition of a new internal item to the current item or object, such as the addition of a new parameter or action. Additionally or alternatively, a modification may include deleting an existing item of the current process element object, and/or may include changing a value, expression or reference of an item of defined by the object. In some scenarios, a modification includes a disabling of a particular item, so that the particular item is ignored during instantiation. For example, in a particular instance object, a user may disable an item that is defined in the parent class object. Such a capability allows a user to define instances that have less functionality than the rest of the class, but still include core class functionality. Any disabled content may be visually muted, made invisible, or otherwise rendered impotent, and is not used during run-time. Disabled content may be re-enabled by the user at any time. Generally, a modification may include resolving a reference to a constant value or expression, such as when a reference in a parent object is resolved to a constant value in a respective child object.

Any modifications, changes, and combinations thereof may be made to class items or objects, instance items or objects, process element items or objects, or internal items. In the case of instance objects and other children objects, changes or modifications to the children objects do not result in the child object being removed from its parent, in an embodiment. For example, modifications to an instance object does not remove the instance object from its class, and furthermore, does not affect other instances of the same class unless indicated as such by the user. In an embodiment, changes or modifications to items defined by a child object are indicated by a flag or other indicia within the child object, and may be labeled as such so as not to interfere with items at the class level. As such, this flexibility may reduce proliferation of parent objects, and make a single parent item or object applicable to a wider variety of applications by allowing more variation amongst its children items or objects.

Additionally, users are able to save a set of modifications to an item or object as a draft. Generally, draft objects are able to be tested without impacting the run-time process plant or system, e.g., the real-time operating environment of the process plant. ("Testing" of a draft object, as used herein, generally refers to the ability to do an initial check on the draft object itself to determine if the changes or modifications are correct, but typically does not imply full factory acceptance testing, which would require the draft object to work in an environment with other drafts.)

In an embodiment, only one draft for a particular object may exist at time. In an embodiment, multiple different drafts may exist for a particular object. A user may be able to add, delete or modify a draft object. In some embodiments, version control of draft objects is available. A draft object may be identified as a draft by a flag, a field or other indication included in or associated with the object. In an embodiment, a draft object is stored as a child object of the currently instantiated object, as a child object of a parent object of the current object, or as a child object of a library object from which the current object is derived. In some scenarios, other information corresponding to the draft object (e.g., author, time of storage, etc.) may also be stored.

Different drafts containing different modifications to a current object may be created and stored (e.g., simultaneously). The different drafts may be sequential in nature. For example, a first draft may correspond to configuring a legacy process device, and a second draft may correspond to configuring a newer model of the process device. Different drafts may differ in content. For example, a first draft may correspond to configuring a valve made by manufacturer A to perform a particular function, while a second draft may correspond to configuring a valve made by manufacturer B to perform a similar function. Indeed, any combination of sequential and/or content changes may be manifested across a set of drafts, for example, as desired by the user.

Drafts generally are not allowed to be instantiated or downloaded, but are allowed to be tested to ensure they work properly before they are published into editions that are allowed to be distributed and downloaded. In this manner, a user is able to make modifications to a current item or object, and store the modifications as a draft. When the user deems that the draft is acceptable, the user may publish the draft to generate a new edition of the item or object, e.g., a "published" or "approved" item or object. The new edition of the item or object is stored and is available for instantiation or download into the process plant or system.

Editions:

As such, editions help users to track and control changes to process elements. In particular, an item or object may go through changes as part of its lifetime. Initially, the object is created, and each subsequent change to the object (either structural such as adding/deleting a function block, or changing a parameter value) typically is distributed or propagated to its children objects. During live process plant operations, though, changes to parent items or objects (and incomplete, unapproved or untested changes in particular) should be prevented from entering the runtime system in an uncontrolled fashion. Accordingly, the flexible configuration techniques and objects described herein include "editions" to enable a user to control the distribution and propagation of changes. An "edition," as used herein, generally refers to a draft modification to a current object that has been approved or published, and is available for instantiation into a runtime environment. Editions or publications are able to be instantiated into a process plant or process control systems, while drafts are not allowed to be instantiated.

In an embodiment, drafts are published into editions when a user so indicates (e.g., only after a user approves the draft). Accordingly, when a draft modification to a process element item of an object is approved, a state of the process element item or object may change from a first state in which instantiation is prevented or not allowed (e.g., a "draft" state) into a second state in which instantiation is allowed (e.g., a "published" state). In an embodiment, only authorized users or users having a suitable security clearance are allowed to publish drafts into editions (e.g., to approve draft modifications to generate published modifications or editions). When multiple drafts are available, a user may select which of the multiple drafts is to be published into an edition.

Editions of objects may be identified by a flag, a field or other indication included in or associated with the object. In an embodiment, an edition or published modified object is stored as a separate object that indicates or links to, as its parent, a draft of the modified object, the current object, another edition, another object, or a library object. In some scenarios, other information corresponding to the edition of the object (e.g., author, time of publication, etc.) may also be stored. In an embodiment, a child item or object may be linked to both an edition of the parent object and to the parent object itself.

When multiple editions of an object are available, a user may indicate or select which of the multiple editions is to be instantiated, in an embodiment. For example, a user may indicate that different editions of the object are to be instantiated at different process elements within the process plant. Alternatively or additionally, a user may indicate different times of instantiation for an edition or for different editions. A user also may delete, disable or edit an edition, in some cases.

In some embodiments, only one draft (and not multiple drafts) is allowed to be stored. In such embodiments, only a current edition of a current object is allowed to be edited by a user. As such, after editing, a user saves the draft modified object, and, upon user direction, the draft modified object is published as a new current edition of the object. In an embodiment, the previous current edition may be automatically deleted if it does not have any children objects linked to it and if it is not the only edition, such as in the case of library items or objects. Thus, if the current edition does not have any children objects, subsequent publishing of modifications to the current edition may simply replace or overwrite the current edition (e.g. an additional current edition is not created). In an embodiment, one or more previous current editions may be hidden from or made inaccessible to users.

In an embodiment, publishing a parent item or object that has at least one child object automatically produces a new current edition of the child object. In an embodiment, re-naming an object does not create a new edition of the object, but re-naming an internal item defined by the object requires saving the renamed internal item as a draft, and publishing the renamed internal item draft as a new edition of the internal item.

In an embodiment, if a published item or object is referred to or incorporated into another published item or object (and optionally is nested as such to multiple levels of objects), creating a new edition of the innermost item or object may automatically create new editions of each of the containing items or objects at all levels of nesting.

Distribution or Propagation of Changes and Modifications:

The terms "distribution" and "propagation" are used interchangeably herein, and generally refer to a transfer of structure (such as function block usages, dynamo usages, shapes, parameter types, wires, etc. for control objects; and such as animations, view definitions, shapes, connectors, etc. for graphic element objects) and parameter values from a parent object to a child object, and/or from a child object to its parent object. Typically, modifications or changes in an edition or published object are propagated. In an embodiment, only the changed items included in the published edition of the object are propagated. In an embodiment, the entire edition of the object is propagated.

A policy setting may control the distribution or propagation process on a per object or per item basis. In an embodiment, the policy setting is changeable by a user such as a configuration designer or a system administrator. Access to changing policy settings are securely controlled in some configuration systems. The distribution or propagation policy setting includes at least two possible values: automatic and user-managed. In an example, if the policy is set to automatic for an equipment item defined in the library, then changes or modifications to the library-stored equipment item that are published in a new edition are automatically and immediately propagated to any linked items of that equipment item, resulting in new published editions of the linked items.

If the policy of the object is set to user-managed, though, newly published changes are not automatically and immediately propagated to linked items. Instead, a user manually initiates propagation (or creates a script or similar to initiate propagation) to selected linked items at selected times. In the example of the library-stored equipment item above, if its policy is set to user-managed, the user may select particular children system configuration items to receive the published changes at specified times. Further, if there are multiple stored editions of the library-stored equipment item, a user may indicate which of the multiple editions is to be propagated at which times.

Accordingly, the flexible configuration techniques and objects described herein allow a user to make changes to a parent object (e.g., a class object), to specify the children objects (e.g., instance objects) to which the changes are to be distributed or propagated, and to specify when the propagation is to occur. Thus, after publication, the changes made to parent objects may be immediately propagated to only the children objects that require the change, while other children objects may be updated with the change at a later time. Selection of the recipients of a change or modification may be performed on a per process entity or element basis, or may be performed on a group basis (e.g., an area of a plant, all devices of a certain manufacturer, all devices running release X, all meters in a certain test production line, etc.). Such selectivity in distribution and propagation may increase plant performance during runtime, as not all children objects are updated at once. Further, changes and modifications may be phased into a process plant in an optimized and controlled manner.

In an embodiment, for a parent object that has at least one child item and also has multiple existing editions, changing the distribution or propagation policy setting does not affect any published, currently instantiated editions of the parent object. However, if the contents of the parent item or object are subsequently changed, the content changes are propagated to all of its children items or objects so that the children use the resulting current edition of the parent object, and prior editions are deleted or disabled.

In an embodiment, propagation or distribution of parameter values from a parent object only occurs if the value has not been overridden in the child object.

Similar to parent objects, changes or modifications made to a child object (e.g., an instance object or a process element object) may also be selectively propagated or distributed to a respective parent object (e.g., a class object or an instance object). The timing and/or the content of the propagation is selected by a user, in an embodiment. In this manner, changes at a child object may be propagated to a parent object, which may in turn propagate the change to other children objects.

In an embodiment, a user may indicate that a particular item defined by a child object is to be hidden from the parent object (e.g., disabled). For example, if a particular parameter value is added to the child object, but is not generally applicable to the parent object and other children of the parent object, the particular parameter value may be flagged or otherwise hidden or disabled during propagation to the parent object.

Instantiation:

An edition may be selected for instantiation by a user, in an embodiment. Instantiation of a selected edition results in a corresponding process element executing, during run-time, according to the internal items defined by the selected edition. For example, in the case of a control object, a user desires a particular published edition of the control object to be downloaded to a corresponding device in the runtime system. The user instructs the system to generate a download edition from the selected edition, and to transmit the download edition to the process element in the runtime system. As such, during runtime, the process element executes an executing edition of the control object, where the executing edition includes a configuration that contains the modifications included in the edition. In another example, a user instructs the configuration system to instantiate a published graphic display element object included on a display view. The configuration system creates an executing edition of the graphic display element object. When the corresponding display view is built at runtime, the executing edition of the graphic display object is executed, resulting in a respective graphic element being included on the display view. When multiple editions are available, a user may select which of the multiple editions is to be instantiated.

In the above examples of instantiation, instantiation occurs at a time specified or indicated by a user, or after an event specified or indicated by a user. In some embodiments, the user may indicate that an edition of an object is to be instantiated immediately after publication. For example, the user may indicate that the instantiation of a first set of children objects corresponding to the edition is to be immediately performed after publication, the instantiation of a second set of children objects corresponding to the edition is to be delayed for a specified amount of time, and the instantiation of a third set of children objects corresponding to the edition is to be delayed until the user explicitly requests instantiation. As such, with the flexible configuration system techniques and objects described herein, a user is able to control when and which modifications are instantiated at various process control elements.

Indeed, the techniques and objects described herein provide users the functionality and the ability to more flexibly modify content of objects or items, and to more flexibly manage the distribution and the timing of the modifications within the process plant or process control system. For example, users may be able to create instances and usages of objects, create copies of objects, create derived items from objects, modify internal items (e.g., usages and instances) to add additional structure, modify internal items included in objects and in usages and instances (e.g., parameter and property values), hide or disable selected internal items, link and unlink objects, and/or control propagation and distribution of changes to items or objects.

Example Scenarios:

Next, several example scenarios are provided to illustrate the features, capabilities and operations of flexible configuration in process plants or process control systems. These example scenarios may be implemented by any one or more portions of the techniques illustrated by any of FIGS. 1-7, or combinations thereof. These example scenarios are not meant to be limiting, but are provided herein to illustrate some of the concepts, advantages and usages of the techniques, systems and methods described herein. Additionally, these scenarios are not an exhaustive set of possible scenarios. Further, although these example scenarios generally refer to a library item or object, the scenarios may be easily applied to other items and objects within the process plant or process control system, such as system configuration objects, graphic and display objects, instance objects, process element objects, class objects, and the like.

Figure 8:
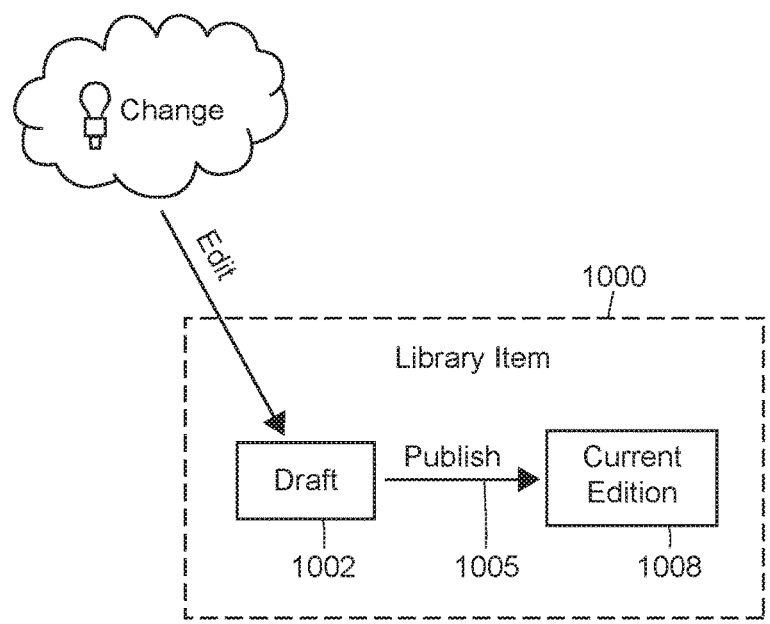
FIG. 8 is a block diagram of an example scenario in which a user modifies a module object stored in a library of the process control system of FIG. 1.

In a first example scenario illustrated in FIG. 8, a user performs tasks or executes one or more commands to create, change or modify a library item or object 1000. In an embodiment, the commands are received at a configuration system, e.g., via a workstation 14 or other user interface. When the user creates or edits the library item or object 1000 and saves it, a draft 1002 of the item is stored. The user may make additional edits to the draft 1002. At some point, the user approves of the changes and publishes 1005 the item. The publication 1005 results in a new edition 1008 of the library item 1000, as the library item 1000 in this first example scenario does not have any children. The new edition 1008 is available for instantiation into a runtime environment of the process plant or process control environment.

Figure 9:
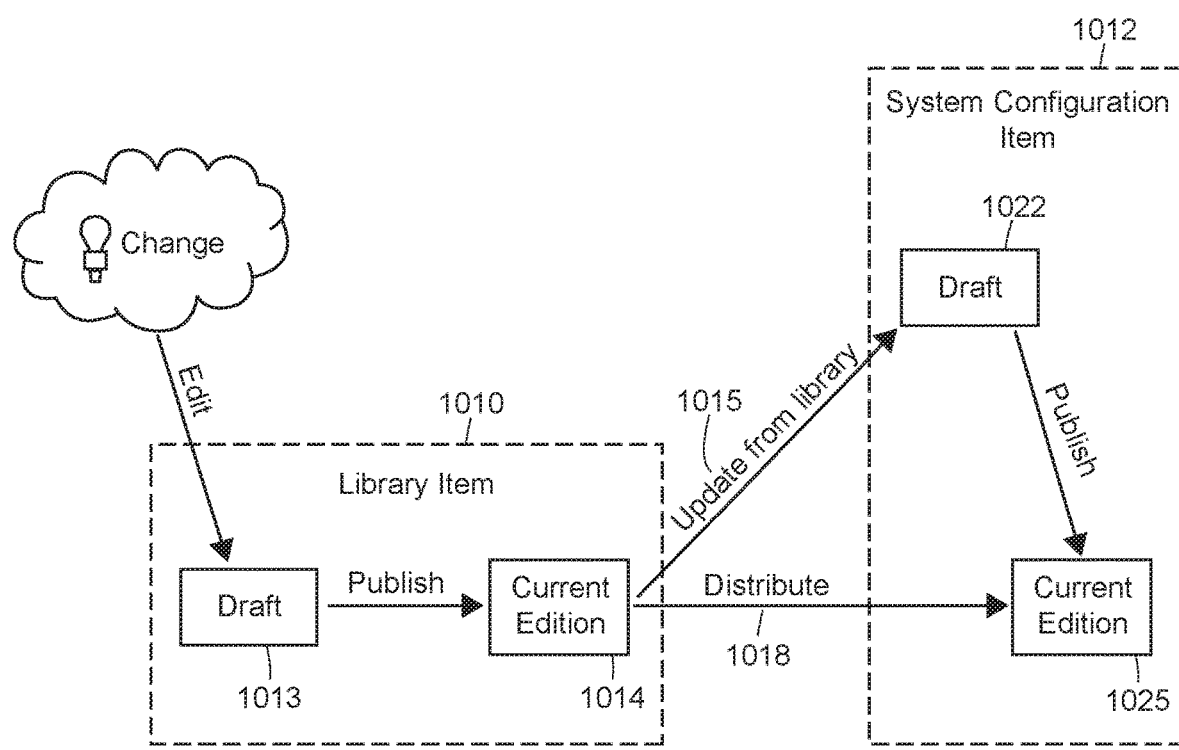
FIG. 9 is a block diagram of a second example scenario in which a user modifies a module object stored in a library of the process control system of FIG. 1.

In a second example scenario illustrated in FIG. 9, a library item 1010 may have a child item or object 1012, e.g., the library item 1010 is linked to another library item or to a system configuration item 1012. In this second scenario, a user makes changes to the library item 1010 and stores it as a draft modified library item 1013. At some point, the changes to the draft 1013 are approved, and the user publishes the draft 1013 to generate a current edition of the library edition 1014 that includes the changes. The user desires to control how the changes to the library item 1010 are distributed or propagated to its children 1012, e.g., in view of the operating phase of the process plant, staffing, procedural issues, and/or other concerns. User-managed distribution may improve operations in process plants (such as in refineries), as changes or modifications are able to distributed at an optimal time (e.g., proper support teams are in place to block valves, etc.).

To accomplish controlled propagation or distribution of the current edition 1014 of library item 1010, the user sets a policy setting that controls the distribution process for the library item 1010. In an embodiment, the policy setting may correspond to the library item 1010. In an embodiment, the policy setting may correspond to a usage or child 1012 of the library item 1010. In an embodiment, the policy setting may include two options: automatic 1018 and user-managed 1015. When the policy is set to automatic 1018, the published, current edition 1014 of the library item 1010 (or the changes included in the published edition 1014) is automatically distributed 1018 from the library item 1010 to child item 1012. When the policy setting is user-managed 1015, the user may create a draft 1022 of the current edition 1014. The draft 1022 may, in turn, be published as a new current edition 1025 of the child item 1012.

Figure 10:
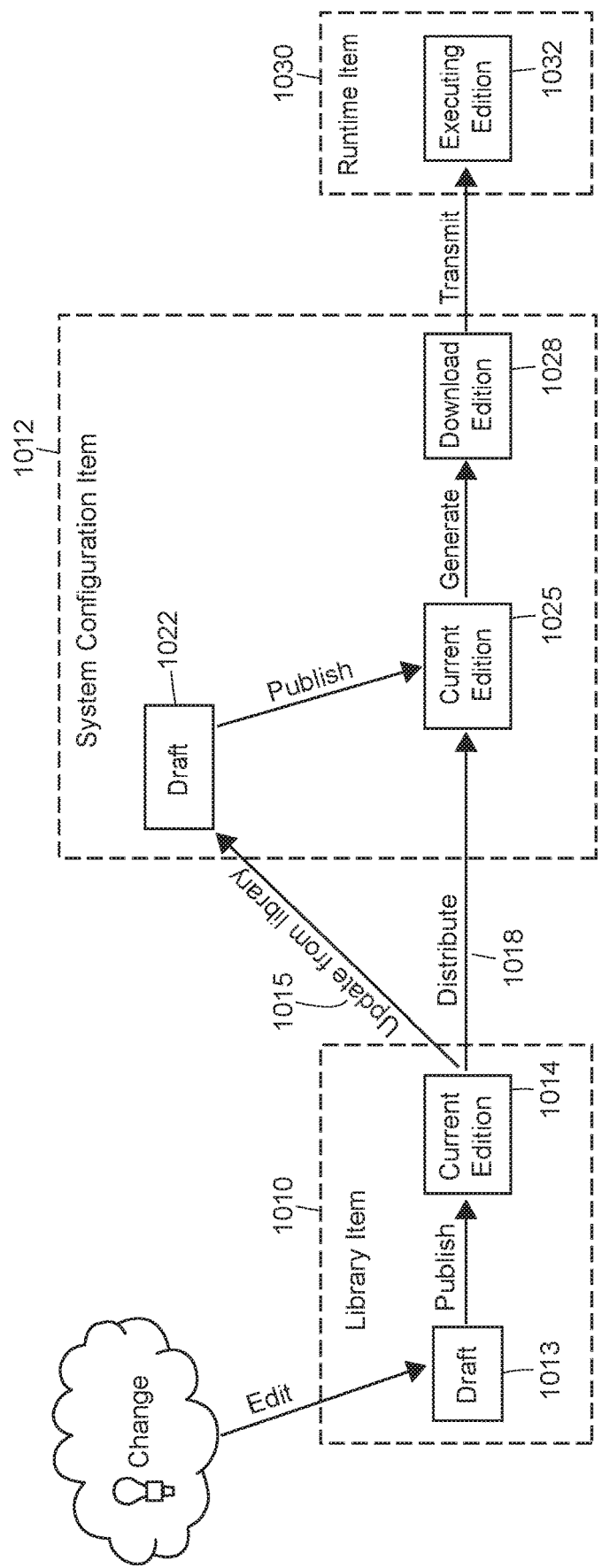
FIG. 10 is a block diagram of the second example scenario of FIG. 9 including additional actions.

As shown in FIG. 10, the new current edition 1025 of the system configuration item 1012 may be instantiated. For example, if the system configuration item 1012 corresponds to a control or function block, the current edition 1025 may be converted into a download edition 1028, which may be downloaded (e.g., automatically or by user indication) into the corresponding runtime item 1030 as an executing edition 1032. In another example, if the system configuration item 1012 corresponds to a graphic element, the current edition of the graphic element is instantiated at run-time when a display view including the graphical item is built.

On the other hand, referring back to FIG. 9, when the distribution policy setting indicates user-managed 1018, the user may manually propagate or distribute changes made to the library item 1010 to each of its children items 1012 as desired. Essentially, the current edition 1014 of the library item 1010 is "pulled" from the library for a child item 1012 by a user command 1018 (which may be explicitly entered by the user or included in a script). In an example, the user selects a target child item (e.g., a system configuration item 1012), and requests 1018 that the current edition 1014 of the library item 1010 (or the modifications therein) be propagated to the target child item 1012. Upon propagation, a draft 1022 of the system configuration item 1012 is created and stored. The user may or may not make additional edits to the draft system configuration item 1022. At some desired time, the user publishes the draft system configuration item 1022, resulting in a new edition 1025 of the system configuration item 1012 that can be instantiated.

Figure 11:
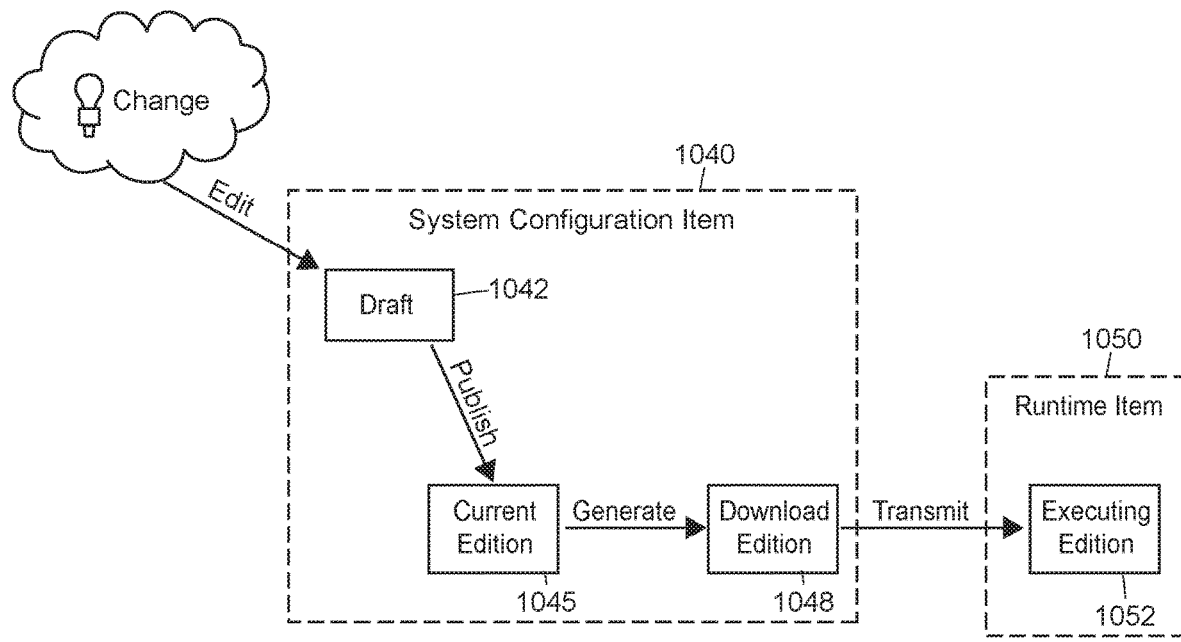
FIG. 11 is a block diagram of a third example scenario in which a user modifies a module object stored in a system configuration data storage area of the process control system of FIG. 1.

The previous scenarios describe modifications to library items 1000 and 1010. However, not only library items 1010 are modifiable. FIG. 11 illustrates a scenario in which the user makes changes directly to a system configuration item 1040 that is not a library template. The user saves the changes to the configuration item 1040 as a draft 1042, and after the draft 1042 is approved, the user publishes the draft 1042 into a current edition 1045 of the item 1040. In the example shown in FIG. 11, the user requests a download edition 1048 (e.g., executable) to be generated, and then subsequently requests that the download edition 1048 of the item 1040 be transmitted to the runtime item 1050, so that an executing edition 1052 is included in and executed by the corresponding runtime item 1050.

Other possible scenarios that illustrate the flexible techniques and objects described herein include:

1. User copies a library item that has multiple editions.

In this scenario, the distribution policy setting is set to user-managed. A library item with multiple editions exists in the library.

The user copies the library item to make a new library item with a different name. The resulting copy of the library item will have a single edition that matches the current edition of the original library item. However, the new library item is just a copy, and is unaffected by subsequent changes to the original library item.

2. User derives a library item from another library item.

An item (such as a display or faceplate) exists in the library. The item has a single tank showing one transmitter and two valves, for example.

The user selects a command to create a draft of a new library item derived from the first library item. The user then modifies the draft to add a second transmitter, saves the draft, and publishes the draft as the first edition of the derived library item.

The user subsequently modifies the original library item to add a third valve, saves the draft of the original library item, and publishes the draft into an edition. The user then distributes the edition of the modified, original library item. As a result of the distribution, the derived library item now contains three valves.

3. User creates an instance of a library item that has multiple editions.

The distribution setting is set to user-managed, and in this scenario, only one current edition is available at any time. A user creates a library item, and creates a first instance of the library item. The user then modifies the original library item, saves the modification as a draft, and publishes the modified, original library item. The publication results in a new edition of the original library item.

Next, the user creates a second instance of the library item. The second instance is based on the current edition of the library item (e.g., the modified, original library item), but the first instance is unaffected. That is, the first instance remains based on the original library item without the modification.

In an embodiment, when a new instance or usage is created from a library item that has multiple editions, the new instance or usage refers to the current, available edition of the library item.

4. User creates a usage of a library item that has multiple editions.

This scenario is similar to the previous scenario, but involves a usage of a library item instead of an instance. In this scenario, only one current edition is available at a time. If a new usage is created from an item that has multiple editions, the new usage is based on the current, available edition of the library item.

5. User modifies a library item that has a usage.

In this scenario, a system configuration item is based on a library item. The system configuration item includes a usage (such as a composite function block usage inside a module) of the library item. Distribution of changes is set to user-managed.

The user changes the library item on which the system configuration item is based, and observes that the library item now has a visual indicator (such as a stacked icon) to show that there are multiple editions of the library item. The user opens a references view on the library item, and sees that there is a usage (the composite function block usage in the module) that is not using the new (now current) edition of the library item, e.g., as included in the system configuration item.

6. User modifies a library item that has a usage in another library item.

This scenario is similar to the previous scenario, but the usage is included in another library item rather than in a system configuration item. In this scenario, the distribution policy only controls distribution to system configuration items, and remains set to user-managed. A change to a library item is automatically distributed to usages inside other library items, regardless of the policy setting. That is, distribution to library items is defaulted to "automatic" and is not able to be modified. Distribution is recursive if the affected library items are themselves used by other library items; new editions are created for all library items that have been affected by a change to another library item.

In some embodiments, modifiable policy settings are available for library items, and different, modifiable policy settings are available for non-library items such as configuration items.

7. User modifies a library item that has an instance.

In this scenario, an instance (such as a module instance) of a library item is stored as a system configuration item. Distribution is set to user-managed.

The user changes the library item, and observes that the library item now has a visual indicator (such as a stacked icon) to show that there are multiple editions. The user opens a references view on the library item, and sees that there is a system configuration instance that is not using the new (now current) edition of the library item.

8. User modifies a library item that has a derived library item.

In this scenario, a parent library item is used by a derived library item that is in turn used by a system configuration item. Distribution to system configuration items is set to user-managed, and distribution to library items is not modifiable and is defaulted to automatic.

The user modifies the parent library item. As the library item distribution setting is automatic, the derived library item is automatically updated. However, the system configuration item based on the derived library is not updated, as the distribution setting to configuration items is set to user-managed. As such, the system configuration item continues to use the previous edition of the derived library item. The user can see this by opening the references view on the parent library item, and observing that the derived library item is using the current edition of the parent library item, but the system configuration item is not.

9. User updates a usage in the context of the library item.

Building on the previous scenario, the users sees a stacked icon corresponding to the library item, indicating that not all instances of the library item have been updated. Distribution to system configuration items is set to user-managed.

The user opens the references view on the library item, and sees two rows corresponding to two displays, each using the library item. The user then changes one of the displays to use the current, updated edition of the library item. When the user opens the display, the user sees the current, updated edition of the library item, e.g., both the display and any library item usages show that they are using the current, updated edition.

Later, the user opens the references view on the second display, and changes the usage to use the current, updated edition of the library item. The user saves the second display, and the appearance of the usage indicates that the current, updated edition of the library item is being used.

As a result of the user changes, no items linked to the first edition of the library item exist in the system, so the first edition is automatically deleted by the system. In other embodiments, the first edition may be set to disabled or inactive.

Users can multi-select usages that are not current and choose to update them to the current edition. The indicator on the library item may disappear when all instances are using the newest edition. In the event that a usage or instance cannot be updated during a multi-select operation, the usage or instance is skipped and the update proceeds to the next item. At the end of the update, the user will be shown which items were not successfully updated.

10. User updates a library item usage in the context of the library item.

In an embodiment, changes to a library item are automatically distributed to usages inside other library items, regardless of system configuration distribution policy settings. In some embodiments, different library distribution policy settings may be available and modifiable by a user having permissions to do so.

11. User updates an instance in the context of the library item.

This scenario extends traditional class-based module behavior. A library item exists, and an instance of the library item is stored as a system configuration item. The instance, though, is not using the current edition of the library item. Distribution to system configuration objects is set to user managed.

The user selects the library item, and opens the references view. The user sees that the system configuration instance is not using the current edition of the library item, so the user selects the instance and executes a "make current" command. This command results in a new draft of the instance which uses the current edition of the library item. The user may then take steps to edit and/or publish the draft of the system configuration instance.

12. User updates derived item in the context of the library item.

Users are allowed to create library items that are based off of other library items. For example, a user may create a parent library module without any interlocks, and then may create a derived library module that has all the capabilities of the parent library module with the addition of interlocks. Changes to the parent library module's algorithm could flow through to the derived library module, so the user benefits by having the algorithm defined in one place.

13. User updates a usage in the context of the usage.

In this scenario, the user desires to update usages to use the current edition. For example, a control module object is stored as a system configuration object, and includes a function block usage of a single edition composite block with a single input connector. The single edition composite block is a library item, and distribution to system configuration objects is set to user-managed. The user modifies the composite block in the library to add another input connector, creating a new current edition for the library composite block. The user can see a graphic that indicates the library composite block has multiple editions.

Next, the user selects the function block usage on a particular control module, and selects the "make current" command. The usage of the particular control module updates to use the current edition, and thus shows the additional input connector. If the previous library composite block edition is not used in the system, the graphic changes to show that the library composite block no longer has multiple editions.

14. User updates library item usage in the context of the library item usage.

Like derived items, usages (e.g. function block) of library items in other library items may be defaulted to automatic updates, regardless of the distribution policy setting to configuration items. However, in the case where a change could not be automatically distributed to another library item due to some conflict, the user may manually correct the library item usage.

15. User updates an instance in the context of the instance.

In this scenario, a library module has a single edition, and an instance of the library module is stored as a system configuration item. Distribution to system configuration items is set to user-managed. The user modifies the library module and publishes the changes. A graphic on a display associated with the library module indicates that the library composite block has multiple editions.

The user selects the module instance, and selects the "make current" command. A draft of the instance is created that uses the current, modified edition of the library module. The user can then publish the draft to create a new current edition of the module instance. If the previous library module edition is no longer used anywhere in the system, the multiple editions indicator associated with the library is removed from the display.

16. User updates all instances contained in an equipment item.

This scenario is similar to the previous scenario, except the update is done in the context of an equipment item, such as an area, cell, or unit. A library module with a single edition exists, and two instances of the module exist in system configuration under an area. Distribution to system configuration is set to user-managed. The user modifies the library module, and a graphic is provided indicating that the library composite block has multiple editions.

On a display corresponding to the context (e.g., an area), the area is also marked as have instances that are not current. Upon expanding the area view, two module instances are marked as not being current. The user selects the area, and selects the "make current" command. Drafts of the instances that use the current edition of the library module are crated. The user may publish the drafts to create new current editions of the module instances, thus causing the "not current" markings to disappear from the display. If the previous library module edition is no longer used anywhere in the system, the multiple editions indicator corresponding to the library module may also disappear from the display.

17. User updates a derived item in the context of the derived item.

The library stores two items, a library display DISP1 and library display DISP2 derived from DISP1. The user changes DISP1 to add a text field, publishes DISP1, and distributes DISP1. Accordingly, DISP2 is automatically updated with the text field.

Similarly, the library stores a library device type VALVE which may have a faceplate associated with it. The library also stores a library device type DVC that is derived from VALVE, and includes additional information to the faceplate used by VALVE. In addition, the library stores an application specific library device type MfctrDVC which in turn adds even more information to the faceplate for DVC. When the user changes a parameter value for VALVE, the parameter value is updated in both DVC and MfctrDVC automatically when DVC and MfctrDVC do not override the parameter value.

As a follow-on to the above, the user creates an application-specific device type MfctrDVC-CriticalService by deriving this device type from the MfctrDVC device type. In doing so, the user overrides one of the parameters. In this follow-on scenario, when the user changes the same parameter's value in VALVE, the parameter value is updated in DVC and MfctrDVC automatically because DVC and MfctrDVC do not override the parameter value. However, the parameter value is not changed in MfctrDVC-CriticalService because the user has overridden the parameter value.

As such, in an embodiment, library items that are derived from other items are always updated when the parent library item changes, regardless of the distribution policy setting for system configuration items. However, due to conflicts, a current edition of a parent library item may not be automatically propagated to a derived library item that has structural changes. After a user corrects the issue, the user may manually update a derived library item.

18. User updates a usage that results in a rule violation.

In this scenario, distribution to system configuration objects is set to automatic. However, distributing a change made to a library item may not be able to update some or all of the children system configuration instances if a rule (e.g., a database rule) will be violated. This discrepancy may not be apparent to the user when saving the library item when distribution is tied to the later step of publication. In fact, the new edition might already be in use by other linked items before the discrepancy is discovered. In this situation, the user may edit the library item to correct the discrepancy, thus producing a new current edition of the library item that is usable for all instances without rule violations.

To illustrate, an update to a new edition with a new usage conflicts with the name of a usage that was added to an instance. For example, the library stores a library module LM with a usage named USAGE1. System configuration instances MA and MB of library module LM exist in area AreaA. The user then adds a usage USAGE2 to the instance MA.

The user adds a usage USAGE2 to the library module LM, publishes the library module LM, and distributes it. Since the instance MA already has a usage USAGE2, instance MA is left not current, and a "not current" indicator corresponding to instance MA. Instance MB, however, has no such usage, and is successfully updated.

19. User saves a library item after switching from user-managed to automatic system configuration distribution.

In this scenario, a library item is used by multiple displays. One display is using the current edition, while the other displays are using a previous edition. The user switches from user-managed to automatic distribution. Changing distribution from user-managed to automatic distribution does not affect the displays.

While the system configuration distribution setting is set to automatic, the user modifies the library item. Consequently, all instances of the library item are updated to use the current, modified edition. Since all of the system configuration instances are updated, the older editions of the library item are no longer referenced, and may be automatically deleted. The icon for the library item changes to indicate only one edition exists.

20. User downloads an instance that is not using the current edition of a library item.

A user may download, to a process element, a system configuration instance that is not using the current edition of a library item. The download request may result in a download warning being displayed.

21. User downloads an object with a usage that is not using the current edition of a library item.

A user may download, to a process element, a system configuration instance that does not include the current edition of a usage of a library item. The download request may result in a download warning being displayed.

22. User imports a file that contains a library item.

In this scenario, a user imports a file, and a list of items in the file is presented to the user. The user may select from an import behavior (such as skip, overwrite, etc.) for each item.

As the above example scenarios illustrate, a user may be able to perform at least the following actions or commands using the flexible configuration techniques, systems and methods described herein:

Edit—Opening and possibly modifying an item or object. Users may open a draft or an edition.

Save as Draft—Saving an opened (and possibly modified) item as a draft.

Test—Running a draft object without downloading or instantiating the draft object.

Approve—Approving a draft for publication.

Publish—Taking a draft and turning it into the current edition. Typically, publishing is performed after approving the draft.

Generate—Generate a download or runtime edition from a published or current edition.

Transmit—Transmit an edition to the runtime.

Download—An embodiment of the Transmit command that sends a download edition to the runtime. Typically, a download is performed in the context of a system configuration item.

Distribute/Propagate/Update—Updating another, linked object with modifications made to a particular object edition. An update, distribution or propagation of modifications to a particular object may result in updates of multiple other linked objects, e.g., children objects and/or a parent object.

Update from library—Updating (e.g., distributing or propagating) modifications to a library object edition to child objects derived from the library object. An update or propagation of a library object may result in updates of multiple levels of linked children. As such, a user may generate an instance or a derived item use from a current edition of a library item, for example.

Delete—Delete an object or item from storage.

Verify—Checking an item or object for errors. Both drafts and editions can be verified.

Differences—Determine differences between various editions of an object or item.

References—Determine references associated with an item or object.

In some embodiments, one or more of the above actions or commands may be hidden or unavailable to an end user. For example, the Generate and Transmit commands may be combined into the Download command, or a user may not be permitted to Delete an item unless the user has proper permissions.

In an embodiment, a user is able to request the flexible configuration system to show any differences between a draft, a current published edition, and a download edition for an item or object. For example, a user may request to see the difference between a draft and the current published edition, a draft and any edition in version control, a draft and the download edition, two different drafts, two different current editions, a current edition and the download edition, and other combinations.

In an embodiment, a user is able to request the configuration system to display all directly-linked children of a particular object, irrespective of whether or not a directly-linked child object is using the current edition of the particular object or not. Conversely, in an embodiment, a user is able to request a view to determine if a child object is using the current edition of its parent object.

Packages:

In some embodiments, the above described techniques of drafts, publishing and instantiation may be applied to groups of objects. A group or plurality of objects is generally referred to herein as a "package." In an embodiment, the members of a package are selected by a user. At least some of the members of a package are provided out-of-the-box (OOB) by a manufacturer or provider, in some cases.

For example, an OOB package may include a set of "starter" library items (e.g., modules, composites, displays, devices, etc.). A user may select various items from the starter collection of items to create a process solution, such as a control loop or a process model. If a user adds customized objects to an OOB package, the user may designate the augmented OOB package as a package different from the starter package.

Another example package may include a configuration implementation that is tailored to solve a specific process problem, e.g., a boiler package or a reactor package. Such packages typically are used as complete solutions to process control problems and, as such, are referred to herein as "solution packages." In an embodiment, solution packages include optional instantiation rules that are applied when a user makes an instance of the package. For example, when the boiler package is instantiated, a rule can state how all items in the package will be named according to a naming convention, using string substitution.

Similar to an item or object, one or more drafts may be created or edited for a current package. Draft packages may be published into editions, and editions may be selected for instantiation. In an embodiment, when a user wants to save a new edition of a package, the new edition may replace the previous edition, or the new edition may be stored concurrently with the previous edition.

These techniques of package drafts, package publishing, and package instantiation provide yet another level of flexibility to the user. In an example (but non-limiting) scenario, a library package is created and stored as a first draft of the package. For example, the library package corresponds to a template configuration of a boiler or of a reactor. The first draft of the package is published and stored as a first edition, and instantiated into the process plant or system. The first edition is subsequently modified (e.g., to correct issues and/or to add functionality to the boiler or to the reactor), and is subsequently published as a second edition of the package. Upon receiving a user indication to instantiate the second edition of the package, only the items included in the second edition of the package that are updated from the first version of the package are instantiated. Further, a user may indicate a timing of the instantiation of various updated items as required by logistical, performance, bandwidth, and/or other constraints. If the usage of the second edition needs to be terminated for any reason, the first edition may be re-instantiated into the process plant or system.

Graphical or Display Items or Objects:

Turning now to a discussion of flexible graphical or display items or objects, a "display," as generally referred to herein, is a graphical entity (e.g., most granular entity) that can be individually opened and viewed by an operator at runtime. Typically, flexible graphical or display items or objects are configured from other graphical objects, and may be stored in an object library or in a system configuration data storage entity. Displays may be instantiated by a downloading a published edition for execution during the process element's runtime, or may be instantiated in real-time or at run-time, such as when an operator requests a particular display view to be built. Types of displays that may be defined by flexible graphical items or objects include, for example:

1) Operation displays: Operation displays generally provide a window into or a representation of a process while it executes in a process plant. Typically, display views are configured from GEM and other library and/or system configuration objects, and may be instantiated on a local or a remote user interface.

2) Dashboard displays: Dashboard displays provide key metrics to operators and plant personnel. Dashboard displays may be configured from library and/or system configuration objects and instantiated on a local or remote user interface. In some embodiments, limited capability, features, or graphics included on a dashboard display may be configured and instantiated at runtime by an operator. Capabilities, features, and graphic elements and shapes that are included on a dashboard are generally referred to herein as "Gadgets." Generally speaking, a Gadget is a GEM that has been marked as available at runtime and can be placed on dashboard displays. As such, as used herein, the term "GEMs" generically refers to both GEMs that are Gadgets and GEMs that are not Gadgets. Examples of dashboards and Gadgets are provided in co-pending U.S. Provisional Application No. 61/711,105, filed on Oct. 8, 2012 and entitled "Configurable User Displays in a Process Control System," the entire contents of which are hereby incorporated by reference.

3) Layout displays: Layout displays provide regions or areas on a user interface to enable a user to organize other displays thereon. With a layout display, a user is able to create an arrangement of displays on a single monitor screen or across several monitor screens.

4) Form displays: Form displays provide a user interface for data entry during configuration or runtime. Users may utilize form displays to create or modify objects, to enter configuration or runtime data, to enter values, and to generally manipulate display items and objects.

A display typically contains one or more views, each of which is a different visual representation of the display. Each view of a display may contain shapes (e.g., rectangles, ellipses, and other shapes) and/or controls (e.g., labels or text boxes), and may have a corresponding object that is stored in the object library or as in a system configuration data storage entity. Some shapes, such as a rectangle, textbox or stack panel, may be built-in to and stored in the configuration system (e.g., are compiled and registered with the system). Other shapes may be created by the user, and corresponding shape objects may be stored in the object library or as a system configuration GEM or Gadget.

As previously discussed, a GEM or a Gadget is a reusable shape that combines one or more shapes with behaviors. GEMs and Gadgets may be created by a user, published into editions, and stored in the configuration system as objects, such as in the library or in the system configuration. GEMs may be linked to other objects, and subsequent changes to the GEM objects may be propagated to all uses of the GEM in other GEMs and displays, e.g., in a manner such as previously described. In an embodiment, Out of the Box (OOB) shapes, GEMs, Gadgets and displays (in some cases, corresponding to a customer's particular industry) are provided in a library of a configuration system, for example, as a set of primitive objects or a "starter set" of objects.

Figure 12:
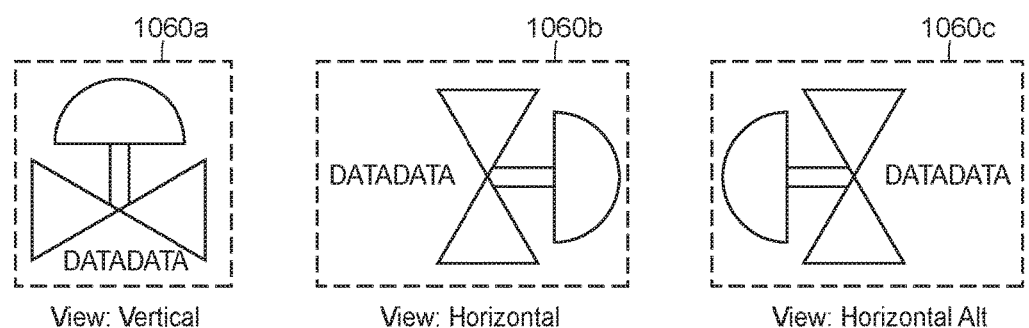
FIG. 12 illustrates three possible views of an example valve graphical element.

Like displays, a GEM may contain one or more visual representations or views. Each of the GEM views includes one or more built-in and/or created shapes. FIG. 12 illustrates three possible different views of an example Valve GEM, i.e., a vertical view 1060a, a horizontal view 1060b, and an alternate horizontal view 1060c. Views of GEMs can be used to present different levels of detail, arrangement of shapes, or to present a different focus of information pertaining to the GEM.

In addition to relatively static shapes and views, a display, GEM or Gadget may also contain dynamic behavior to allow the operator to see the process data, navigate through the process data, or change the process data. Dynamic behavior may include, for example, animations and event handling, both of which are discussed below.

Animations map process data from information sources within the process plant to the various shapes on the display to show the process data in a textual or graphical manner.

The animation result may be applied to a field of a shape (e.g., to a text field or to a visibility field) so that when a field value of an information source changes, the animation changes. Thus, an animation allows process data to be manipulated with functions (e.g., mathematical functions) to transform the raw process data into a meaningful visual presentation. For example, an animation may be applied to a rectangle shape to show a rectangle's fill percentage for a tanks level, or the animation may be applied to a text shape to display the fill percentage value textually.

Event handlers are configured to perform a defined response to event such as a mouse click, a keyboard operation, and an accelerator key movement. The defined response may be, for example, navigate to another display, acknowledge alarms, change a process set point, enter data, and other such actions.

As a GEM may be included in multiple visual representations or views, the animations and event handlers associated with the GEM can be created once and re-used in various views to provide different orientations or representations of the data. As such, the amount of custom code needed for creating the GEM and for modifying the GEM usage for each of its various views may be reduced.

In order to make the GEM reusable across many objects and information sources, the animations and event handler paths are partially or fully tokenized with placeholders, in an embodiment. A value of a placeholder value may be provided when configuring specific usages of the GEMs, or the placeholder value may be set programmatically at runtime. Animations and event handlers may reference a placeholder so that the value of the placeholder is substituted in the reference at runtime to resolve a path to the specific object. Additionally, similar to GEMs, displays may also support placeholders so that a display may be re-usable. Display instances can be created as part of the configuration or dynamically created at runtime by providing values for the various placeholder(s).

In some embodiments, reuse and sharing of information is effected by using global sets. Global sets allow a configuration designer to configure states and behaviors that is shared across many unrelated displays and GEMs, e.g., for the lifetime of a client Human Machine Interface (HMI) session. Items in a global set may be referenced and may be used by any displays or GEMs, thus allowing reuse and sharing between many items. In an embodiment, each item in a global set is stored in an object which is linked to an object corresponding to the global set.

In some embodiments, reuse and sharing of information is effected by using styles and/or style sets. A style is a collection of field name and value pairs, and a style set is a collection of styles. In an embodiment, all shapes support a style. When a shape is added to a view of a display or GEM by a user, the style field can be set to a desired style of a style set. As a result, the added shape uses the values defined in the style for each field. Styles and style sets may be represented in the configuration system by respective objects.

In some embodiments, named constants allow users flexibility in creating name-value pairs. For example, fields within a graphic element object are assigned a named constant as a value, such as TitleFont or TankBodyColor. Name constants allow project standards to be created and assigned to field values. If the project standards are changed, the named constant value can be updated in one central location. A named constant may include a name, title, description, and data type, for example. Any field value may be set to a value or to a named constant, such as fields on shape usages, animations, converters, tables, global sets and styles.

Patterns:

Display objects may relate to one another and to other objects by one or more patterns, such as a usage pattern or a derived pattern. Additionally or alternatively, configuration objects may relate to one another and to other objects by one or more patterns. The use of different types of patterns need not be mutually exclusive. For example, various aspects of several patterns may be combined.

Figure 13:
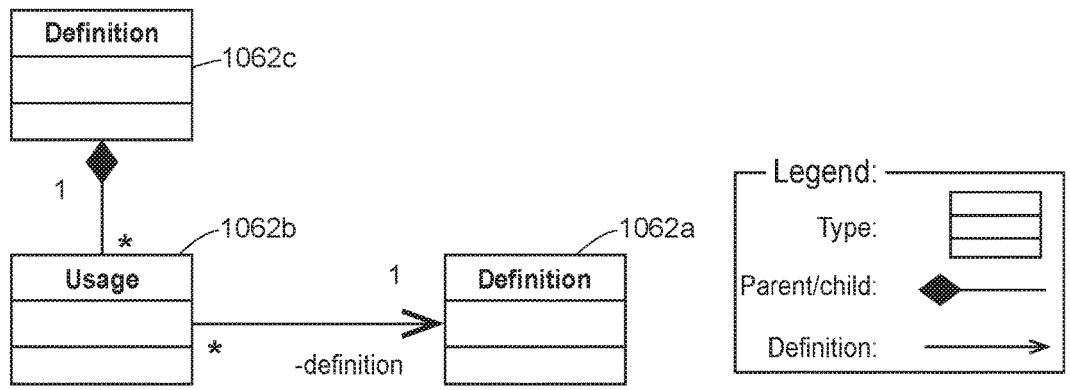
FIG. 13 illustrates a diagram of an example definition usage pattern.

A usage pattern is generally a containment or grouping of objects based on definitions. FIG. 13 illustrates a diagram of an example of a definition usage design pattern. With a usage pattern, a definition of a graphical object 1062*a* includes one or more usages 1062*b* of one or more other graphical items 1062*c*. When instantiated, these usages 1062*b* represent a graphical shape defined by the graphical object 1062*a* that is presented on a view of a display. Each usage 1062*b* may have a definition that includes defaults for internal items such as fields, events, and behaviors. Such internal items may be configured, in an embodiment.

Figure 14:
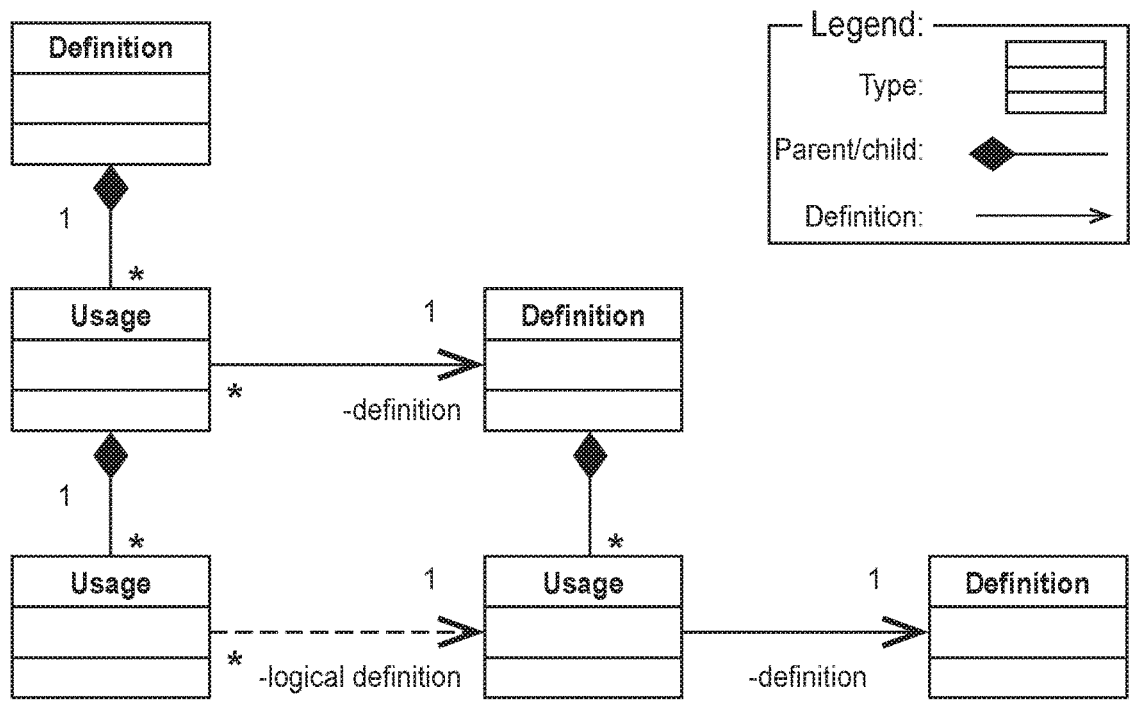
FIG. 14 illustrates a class diagram for an example nested definition usage pattern.

The definition usage pattern may be nested multiple levels, if desired. FIG. 14 illustrates a class diagram for an example nested definition usage design pattern. For example, a Display can contain a GEM, which can contain another GEM or shape.

Figure 15:
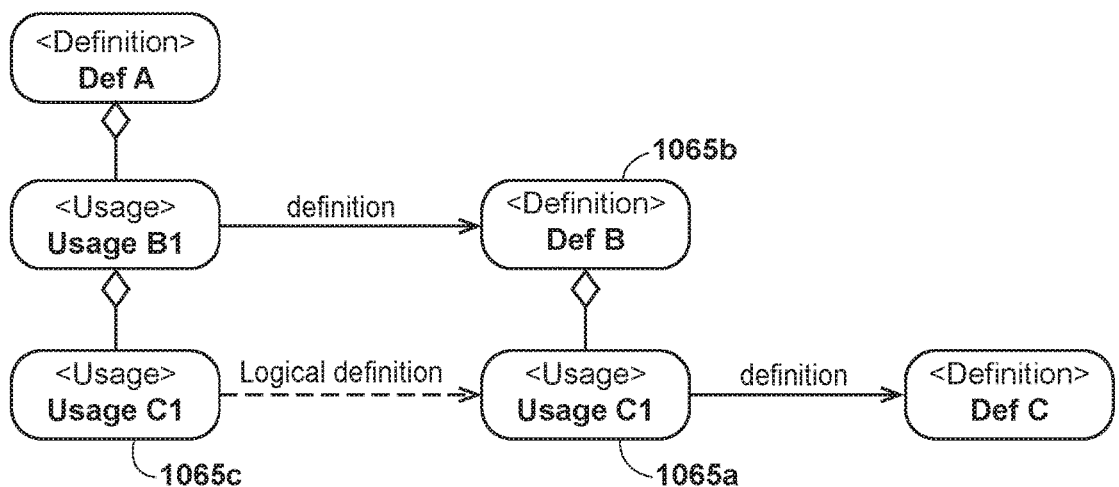
FIG. 15 illustrates an example of abstracted nested definition usage.

FIG. 15 illustrates an example of abstracted nested definition usage. In FIG. 15, the usage C1 (reference 1065*a*) is based on the definition of the usage B1 (reference 1065*b*). A user may modify (e.g., override or tweak) one or more internal items from another usage. For example, in FIG. 15, a change to the UsageC1 (reference 1065*c*) is a tweak.

Figure 16:
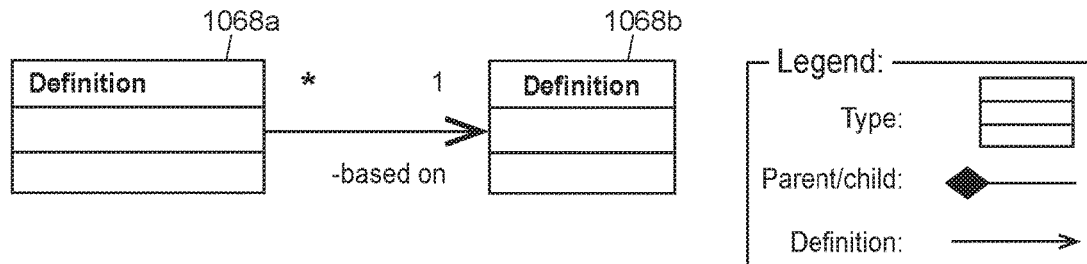
FIG. 16 illustrates a diagram of an example derived pattern.

Another pattern by which objects may be related is a derived pattern. A diagram of an example derived pattern is shown in FIG. 16. The derived pattern allows a definition to be extended without using aggregation (as in the case of the definition usage pattern discussed above). In particular, the derived pattern allows the creation of a new definition 1068*a* without creating another level in the hierarchy. As such, all internal items in the "based-on" definition 1068*a* are included in the derived definition 1068*b*.

Figure 17:
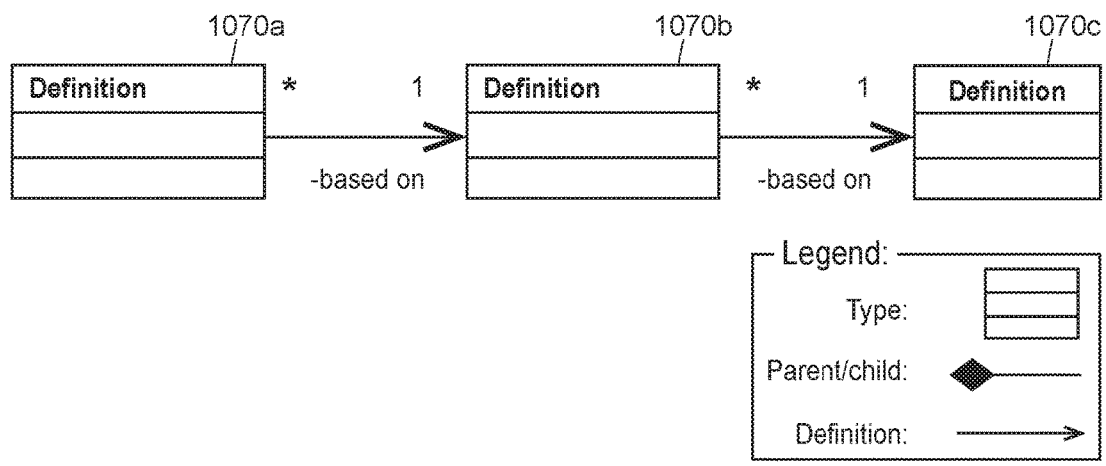
FIG. 17 illustrates a diagram of an example of a nested derived pattern.

The derived pattern may be nested multiple levels, e.g., a derived definition may be based on another derived definition, which ultimately may be based-on a non-derived definition. Any desired number of nested levels may be possible. FIG. 17 illustrates an example of a nested derived pattern in which a new definition 1070*a* is created from a first derived definition 1070*b*, which was created from a second derived definition 1070*c*, which was created from a non-derived definition (not shown).

Flexible Items and Objects:

As previously discussed, objects may be flexibly defined and used in the configuration system. A flexible object may include one or more internal items, which may in turn be defined by another object, in an embodiment. A description of flexible items, objects, and internal items that may be included in the configuration system follows. While these descriptions are presented in the context of graphical or display objects, the concepts and attributes discussed herein also apply to configuration objects.

Fields are internal items that represent states or attributes of a given object. For example, a rectangle size is stored in a width field and in a height field. Each field may have a name and value. In an embodiment, additional metadata associated with a field indicates other attributes of the field, such as whether or not the field can be animated, whether or not the field is read-only, and a data type of the field. The metadata may be used in configuration of the given object, for example. A value of a field may be a simple data type such as a string, or may be a reference to another object, such as a library object, a shape object, or a process element object. A value of a field may be modified or overridden by a user, in an embodiment.

Placeholders are generalized internal items that allow defined items to be used across multiple other objects. For example, for display objects, a placeholder may be a graphic item that allows animations and event handlers to be generalized and reused across various graphic or display objects and information source paths. As such, placeholders provide a level of indirection, and are resolved with a value at runtime. Placeholders may be nested, in some embodiments.

Parameters are internal items that represent states or attributes of a field. For example, for display and graphical objects, a parameter may be a graphic item having a value and a status. Parameters may be added to graphic items such as GEMs, Gadgets, displays and dashboards, layouts and forms, Global Sets, etc. Parameters typically are not visible during runtime. However, parameters may affect a visible aspect of an object during runtime (such as an animation) by creating expressions that reference the value. A user may add parameters to objects, but in some embodiments, a user may not be allowed to add parameters to particular library items or primitive objects.

Functions are internal items that provide behaviors for a specific object. For example, with display and graphical objects, a function may be a graphic item or a general behavior that is provided from a group or a global set. For example, a group visual item may provide an AddShape( )function, or a global set may provide an OpenDisplay( )function. Some functions may built-in and thus may not be modifiable by a user. Other functions may be created by a user. Functions may be executed during runtime via a programming API or a script, in an embodiment. Additionally, functions may take one or more arguments, e.g., a constant, a value of a field, a reference to another object, or a reference to a parameter. A function may return a value, e.g., a constant, a value of a field, a reference to another object, or a reference to a parameter, in some instances.

Animations are internal items that map data from an information source or object to a field of an internal item. For example, for a display or graphic object, an animation may map data to a rectangle's FillPercent field or to a Label's Text property. An animation includes an expression which is reevaluated and/or recalculated when a referenced value of the expression changes. Additionally, an animation is associated with a target field, e.g., the field on the parent object that is to be updated with the results of the recalculated expression. As such, at runtime, when the animation's calculated value changes, the target field is updated with the recalculated value, thus causing the screen rendering to change. In an embodiment, an animation includes an update frequency, and may include a converter to transform expression results.

Converters are internal items that transform an animation's expression result into a final animation result. For example, the transformation may change the recalculated value (result) of the expression, the data type or format of the result, both the result and the data type, or the transformation may perform some other type of conversion on the result of the expression. Each converter type may include specific fields that can be configured by a user.

Events are internal items of an object that define an action and a response. The definition of an event typically includes an event trigger, such as a user click, a mouse move, a mouse hover, or a data change. Optionally, events are also defined with an event handler which executes one or more response functions or behaviors when the trigger fires. The event handler may be configured by the user, may be provided as an OOB behavior on preconfigured definitions, or may be provided as a built-in behavior on specific shapes. Adding event handlers for specific events allows the customer to create behaviors based on specific triggers.

Each event trigger may support one or more specific arguments. Generally, an event trigger includes a sender argument that indicates the object that fired the event trigger. Additionally, the event trigger may include optional arguments that are appropriate for the type of event, such as information that is to be sent upon firing. For example, a mouse click trigger may have only the sender argument, whereas a mouse-move trigger may have a sender argument and mouse location coordinates (e.g. X, Y) which are to be sent when the mouse-move trigger is fired. In some cases, events are not fired based on user action but are fired when an object's field value or system state changes, e.g., from initialization to steady-state.

In some embodiments, an event handler is configured for an event trigger. In these embodiments, the event handler is called when the event trigger fires, and executes one or more functions in response to the trigger firing. In an embodiment, a user defines an event handler to include custom behavior or logic to be executed along with available functions (e.g., functions available to the display, the window, or a global set).

Tables are internal items that include one or more data structures with input values and output results. A table may be used with a table converter to transform the input value from one data type to another, in an embodiment. For example, for a graphic object, table usage may include converting a process value into a color, or converting a process value into a string. As such, a table provides a non-programmatic way to configure results for a range of input values. Tables may operate on an exact match of an input value or on a range of input values.

Shape objects are basic generalized visual building blocks that can be combined together to create visual representations of complex and specialized visual items, such as GEMs and Displays. Some shape objects may be built-in (e.g., have executables installed OOB with the configuration system), and are referred to herein as primitive shapes. Primitive shapes may belong to one of several categories such as geometric shapes (e.g., Rectangle, Line, Ellipse), containers in which other shapes can arranged (e.g., Group, Panels, Grids), or controls (e.g., TextBox, Dropdown combo box or Batch List Control, Trends).

Each shape (whether primitive or not) has a definition. The definition may include, for example, one or more fields, animations, events with event triggers, handlers, and/or connection points. In an embodiment, a shape may support a style field. Typically, most shapes are configurable and modifiable. For example, a rectangle is provided as a built-in of the configuration system, and a user may modify the rectangle object by setting field values and adding events or animations to the rectangle usage. The user may then save the modified rectangle shape as a new object, and may publish it after approval.

Figure 18:
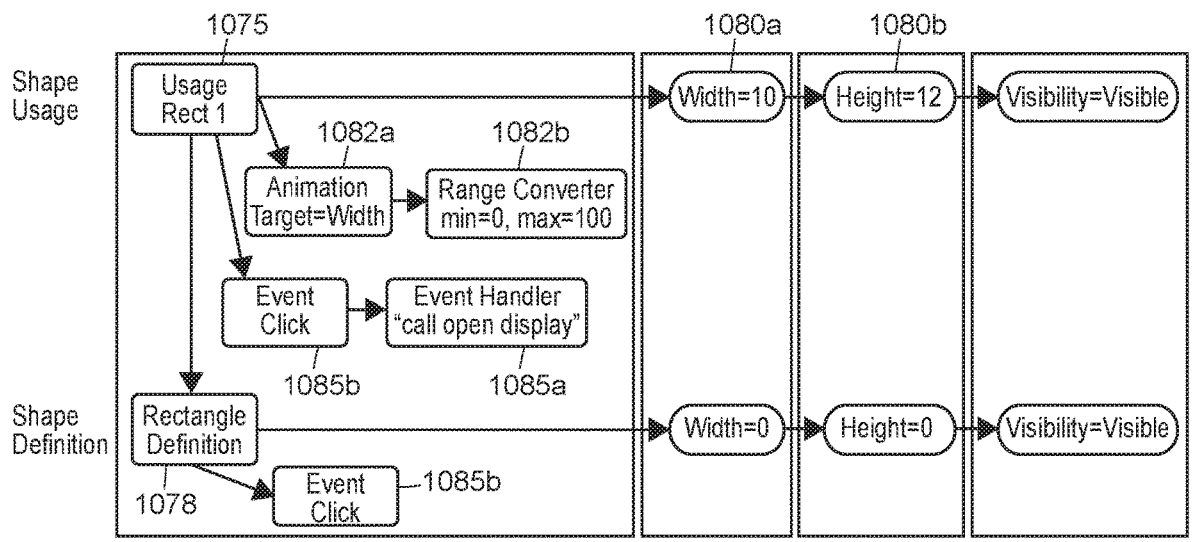
FIG. 18 illustrates an example of a shape usage created based on a definition.

FIG. 18 illustrates an example of a shape usage Rect 1 (reference 1075) created based on a rectangle's definition 1078. The user has modified the values of the Width 1080*a* and Height 1080*b* fields from the rectangle definition's default values. Additionally, the user has added an animation 1082*a* that targets the width field, and has added a range converter 1082*b* to scale the value appropriately. The user has also added an event handler 1085*a* on the usage 1075 for the click event 1085*b,* and the event handler has been configured to call the OpenDisplay( ) function. In an embodiment, only the fields that are specifically overridden (e.g., 1080*a,* 1080*b*) are persisted. That is, the shape usage 1075 links back to the definition 1078, and any field whose value has not been overridden comes from the definition 1078 (or the style, in some cases). For example, if the foreground brush of the rectangle definition 1078 is changed from Blue to Gray, any usages that do not override the foreground brush (e.g., usage Rect1 1075) will have a Blue foreground brush after the change is propagated from the rectangle definition 1078 edition.

With regard to geometric shape definitions, a group shape allows several shapes to be treated as one shape for actions such as visibility, resizing, placement/orientation, and events. As such, group shapes are copies of multiple shapes that relatively maintain their respective (X, Y) coordinate orientations. The behavior of the fields and events of a group and how they affect the fields and events of contained shapes within the group may be configurable. For example, a dynamo is one type of a group shape.

A panel shape may be similar to a group shape, but may allow for more specific control to the rendering of contained shapes (e.g., in size, position, arrangement, etc.). Items within a panel are generally ordered or docked to a specific area of the panel and, unlike groups, do not have a relative coordinate setting. Panels give the user the ability to control items when the exact number of items is not known, and the ability to arrange items visually without having to move every item individually as the panel or contained window is resized. Panels also provide behavior when items are added, removed or hidden within the panel by adjusting the position of other items to remove blank space and avoid overlap.

A connector usage represents a physical linking element in the process plant, such as a wire, pipe, duct or conveyor. During configuration, a connection point denotes an indication of a connection of the connection usage to a shape usage. The connector usage allows the connector to track and reroute and resize when the shape usage is moved during configuration. In particular, the connector follows and routes according to its defined algorithm and settings. As such, connectors are shapes that link other display objects together on displays, and are defined by respective properties and behaviors. When placed on a display and connected, a connector is able to route around different shape usages. A configuration user can modify the placement or routing of the connector, define default visuals, and/or modify connection points of a connector usage.

Layers are another type of display object can be used at configuration time to organize and improve a user's editing experience by hiding and locking shapes that may interfere with a current task or may prevent inadvertent modification of shape usages. Layers provide a way to organize the shape usages to aid in the configuration of a display definition and/or a GEM view definition. Layers can also be used to organize shapes to provide a runtime features such as showing and hiding details like a help, maintenance or diagnostics layer.

In particular, views may have one or more layers. Shapes within a view may be associated to a particular layer (e.g., the shape object and the layer object may be linked). A particular layer can be designated as configuration only, or both configuration and runtime. A layer can be visible or hidden. The layer can be locked and unlocked to prevent inadvertent selection or modification. When the layer's visibility is changed, a value may recursively propagate to all layers that match by name on the contained GEM usages. For example, the visibility on the "Help" layer applies to any GEM usages that are associated to the Help layer.

User Created Items and Objects:

At least some of the above-discussed flexible objects may be created by a user, such as:

Displays—e.g., a visual item that can be opened at runtime by users. A display typically represents a view of the operating process or provides detail about a specific area of the process.

GEMs and Gadgets—e.g., a configured shape that represents a process element or other entity within the process and may be included (e.g., placed) on displays or other GEMs. For example, a device, control module, dynamo, display view or other process element may be represented by a GEM. GEMs may be configured to be reusable so as to represent different instances of the same type of equipment or part of the process within the plant or process. As such, a GEM may be configured and tested once but used numerous times in other GEMs and Displays. Typically, a GEM includes a name, title, description, a selected view and other fields such as tables, events, parameters and functions. GEMs can be nested in other GEMs or within Displays, for example. Typically, a GEM has one or more view definitions which provide one or more corresponding visual representations of the GEM. A default view may be provided for a GEM, and in some embodiments, the user may be able to change the default view. Indeed, the user may be able to change any of the fields defined by a GEM.

A Gadget is a GEM that is available at runtime and can be placed on dashboard displays, in an embodiment. An operator may be able to create and modify Gadgets during run-time, for example.

A GEM definition may be derived from another GEM definition. When a GEM derives from another GEM, the derived GEM includes all the views from the based-on GEM. A user may modify these views of or add additional views to the derived GEM. The additional views may be independent, may be derived from an existing view defined in the present GEM definition, or may be created from the based-upon GEM definition.

When GEMs are placed in a display's view or another GEM's view, the placed GEMs become shape usages (similar to adding a built-in shape usage such as a rectangle or group), in an embodiment. The placed GEMs, however, remains linked back to their respective definition, and changes to the usages are propagated based upon propagation settings and strategies.

Modifying a GEM usage (e.g., resizing) is similar to modifying a group usage, in an embodiment. Additionally, a GEM or Gadget may be configured by using a standardized or partially standardized form that is presented to a configuration designer.

Views—e.g., a visual representation within a Display or GEM. Each display or GEM may have one or more defined views. Visual or graphical items (e.g., shapes and other GEMs) may be added to a view definition. A view may be independent, or may be derived from another view within the same parent definition or base parent definition.

Independent view definitions typically define their entire content and information, such as shapes, statically configured field values, animations, and event handlers. As such, independent view definitions are not based on any other view definition within the containing display or GEM definition. A display or GEM definition, however, may have multiple views that are independent and do not derive from a common view.

Derived view definitions, on the other hand, typically are based on another view definition within the same container definition. When the container definition is derived, a view definition can be derived from a view of the based-on definition of the container definition. For example if Display A defines ViewA and ViewB. If DisplayB is derived from DisplayA then DisplayB, will by default, have ViewA and ViewB but may also define a ViewC as derived from ViewB.

A view definition may include a set of known fields that the user may configure or to which the user may add animations targeting these fields. The view definition may also include one or more events with known triggers to which a user may add event handlers. Additionally, a particular view definition includes shape usages, e.g., all usages from the based-on view, as well as any shape usages added to this particular view definition. Views may provide a namespace so that items within the view definition are uniquely named.

Global Sets—e.g., a configured item that holds state (e.g., values) and behavior (e.g. functions) that can be referenced from unrelated displays, Gadgets and GEMs. Generally, global sets do not have any visual representation at runtime, but are available at runtime. A Global Set may be marked as singleton, or a Global Set may correspond to an instance or a group of objects. As such, global sets provide a way to share and reuse information between many objects.

Styles and Style Sets—e.g., a collection of field names and values (e.g., field/value pairs) that may be changed in one place and applied across a set of shape usages or other visual items to maintain consistency. A style set is a collection of styles, and typically includes a name, title, description and possibly other fields. In an embodiment, when a shape has a style set, the values for the fields in the style apply to the shape if the field has not been overridden and is not animated. Style sets may be editionable and versionable.

Thus, as discussed above, the configuration system supports a robust set of visual or graphic items, each of which is defined by a respective object. The set of visual or graphic items may include, for example, one or more display definitions, dashboards, layouts, GEM definitions, Gadget definitions, Global Sets, built-in shape definitions, group definitions, view definitions, shape usages, group usages, dynamos, GEM usages, Gadget usages, chrome usages, region usages, panel usages, connection points, connectors, animations, converters, event triggers, event handlers, place holders, parameters, functions, tables, name sets, styles, and/or style sets. At least a portion of the set of visual or graphic items may be created or modified by a user.

Furthermore, the object defining each visual or graphic item may include, for example, one or more internal items such as fields, event triggers, functions, view definitions, event handlers, animations, placeholders, parameters, tables, name sets, converters, usages of build-in shape(s), usages of GEM(s), usages of Gadget(s), chrome usages, region usages, group usages, dynamos, panel usages, connection points, connectors, global sets, style sets, and/or styles. Each of the internal items defined in the object of the visual or graphic item may be built-in to the configuration system, added by a user, configured by a definition, or a reference to another item.

Changes, Modifications and Tweaks:

As previously discussed, a user may change, modify or tweak the content of an object definition. That is, a user may change one or more internal items of an object while maintaining a link to its respective based-upon definition. These changes, modifications or tweaks may include, for example, an addition, a deletion, and/or a modification to the contents (e.g., a field or other internal item) of the object. Furthermore, these changes, when published into editions, generally take precedence over the based-upon definition of the object, and may allow future changes from the modified definition to be applied as new editions are propagated. For example, if an item contained in definition (e.g. a GEM) is modified and tweaked in a usage or derived view, the tweak takes precedence. However, tweaks to a usage or derived definition are lost if the item is deleted out of the based-upon definition. For example, an item contained in a based-upon definition (e.g. a GEM) is deleted, but was previously tweaked in a usage or derived definition. In this example, the tweak is lost. Furthermore, if an item contained in a based-upon definition (e.g. a GEM) is modified but has been deleted in a usage or derived definition the change to the based-upon definition is not propagated to the usage or derived definition.

In an embodiment, tweaks on a specific child object or usage may be pushed back into the based-upon definition, in an embodiment. In an example, the based-upon definition is updated to a new edition that includes the tweaks made to the child, and the tweaks are removed from the child.

Figure 19:
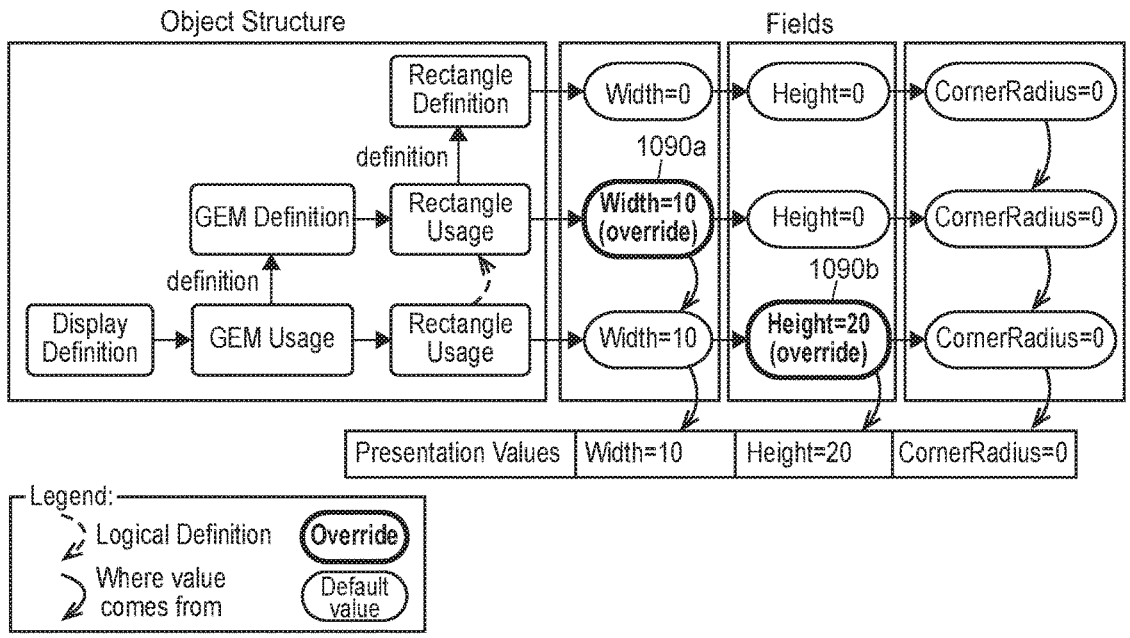
FIG. 19 illustrates an example of a field value override tweak applied to a usage pattern.
Figure 20:
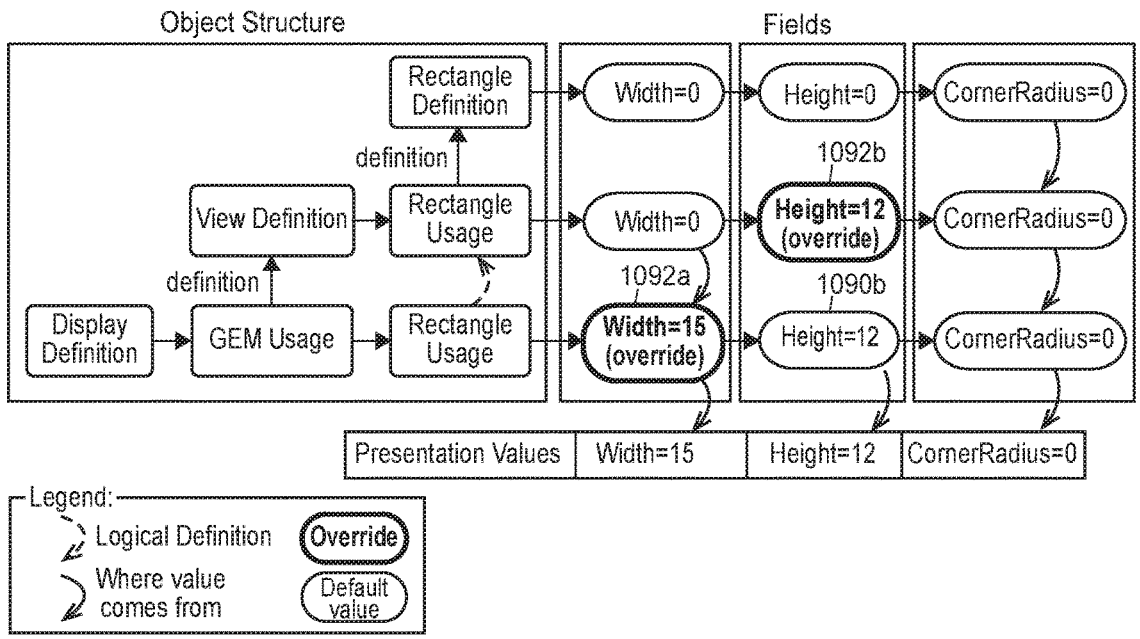
FIG. 20 illustrates an example of a field value override tweak applied to a derived pattern.
Figure 21:
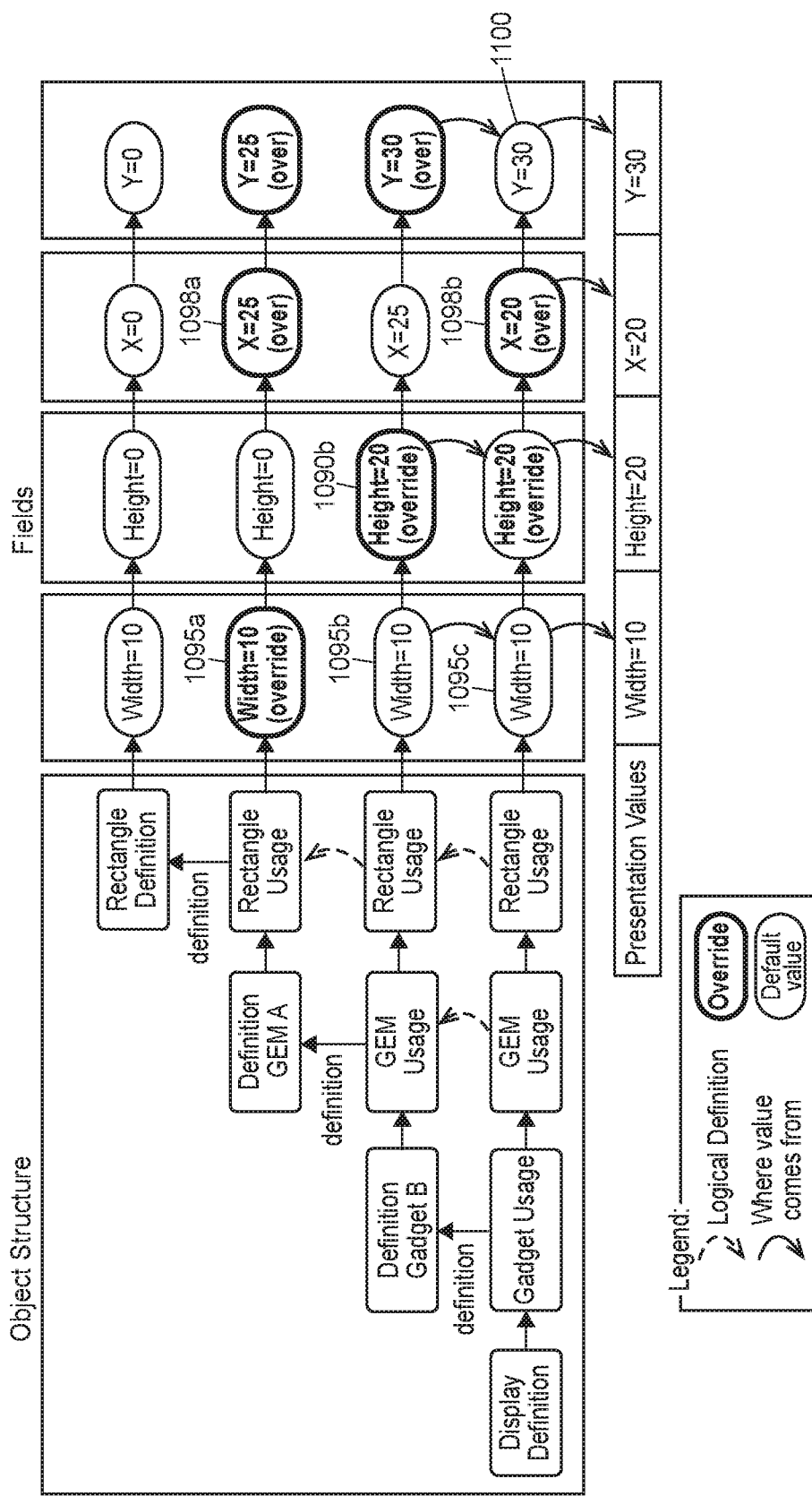
FIG. 21 illustrates an example of multiple modifications or tweaks to an object at multiple levels.

FIGS. 19-21 illustrate examples of modifications or tweaks that may be made to various visual items and objects. In particular, FIG. 19 illustrates an example of a field value override tweak applied to a usage pattern. In FIG. 19, the width field value 1090a and the height field value 1090b are overridden.

FIG. 20 illustrates an example of a field value override tweak applied to a derived pattern. In FIG. 20, the width field value 1092a and the height field value 1092b are overridden.

FIG. 21 illustrates an example of multiple modifications or tweaks to an object at multiple levels. In particular, FIG. 21 illustrates how a tweak applied to a lower definition becoming a default value for a next level (e.g., references 1095a-1095c), how a value may be overridden at multiple levels (e.g., references 1098a, 1098b), and how an override on an outermost definition takes precedence (e.g., reference 1100).

As illustrated in FIGS. 19-21, tweaking may be performed on usage patterns and derived patterns, in an embodiment. Furthermore, tweaks or modifications may be made to configuration items or objects, and/or to visual or graphic items or objects. For example, the set of visual or graphic items that may be tweaked may include, for example, one or more display definitions, dashboards, layouts, GEM definitions, Gadget definitions, Global Sets, built-in shape definitions, group definitions, view definitions, shape usages, group usages, dynamos, GEM usages, Gadget usages, chrome usages, region usages, panel usages, connection points, connectors, animations, converters, event triggers, event handlers, place holders, parameters, functions, tables, name sets, styles, and/or style sets. Further, tweaks may be performed on one or more objects included in other object definitions, such as fields, event triggers, functions, view definitions, event handlers, animations, placeholders, parameters, tables, name sets, converters, usages of build-in shape(s), usages of GEM(s), usages of Gadget(s), chrome usages, region usages, group usages, dynamos, panel usages, connection points, connectors, global sets, style sets, and/or styles.

When implemented, any of the methods and techniques described herein or portions thereof may be performed by executing software stored in one or more non-transitory, tangible, computer readable storage media or memories such as magnetic disks, laser disks, optical discs, semiconductor memories, other memory devices, or other storage media, in a RAM or ROM of a computer or processor, etc.

Although the forgoing text sets forth a detailed description of numerous different embodiments, it should be understood that the scope of the patent is defined by the words of the claims set forth at the end of this patent and their equivalents. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims and all equivalents thereof. By way of example, and not limitation, the disclosure herein contemplates at least the following aspects:

1. A configuration element presented on a configuration display view for configuring a graphic element object to be instantiated on a process control display view corresponding to a process entity included in a process plant, the configuration element comprising: an execution, in a configuration environment of the process plant, of an instantiation of a configuration element object corresponding to a set of properties for an attribute of the graphic element object, the configuration element object being configurable, the configuration element object including a link to a configuration display object from which the configuration display view is instantiated, and the execution of the instantiation of the configuration element object including: a visual representation of the set of properties for the attribute of the graphic element object; and a link to the graphic element object to send data corresponding to a property configured in the configuration element from the set of properties, the configured property corresponding to at least one configured attribute of the graphic element.

2. The configuration element according to aspect 1, wherein the configuration element object is configurable in the configuration environment of the process plant.

3. The configuration element according to any one of the preceding aspects, wherein the configuration display object corresponds to a plurality of properties for the attribute of the graphic element object from which the set of properties is selected to correspond to the configuration element object.

4. The configuration element according to any one of the preceding aspects, wherein the plurality of properties comprises one or more sets of properties from which the set of properties is selected to correspond to the configuration element object.

5. The configuration element according to any one of the preceding aspects, wherein the one or more sets of properties are configurable in the configuration environment of the process plant.

6. The configuration element according to any one of the preceding aspects, wherein the one or more sets of properties are configurable to add a property from the plurality of properties and/or delete a property from a set of properties.

7. The configuration element according to any one of the preceding aspects, wherein the one or more plurality of properties are configurable to create a set of properties comprising selected ones of the plurality of properties.

8. The configuration element according to any one of the preceding aspects, wherein instantiation of the configuration display view includes a preview of an instantiation of the configuration element object as the configuration element object is configured.

9. The configuration element according to any one of the preceding aspects, further comprising storing the configuration of the instantiation of the configuration element object, the configuration comprising a value of the property configured in the configuration element from the set of properties.

10. The configuration element according to any one of the preceding aspects, wherein storing the configuration of the instantiation of the configuration element object comprises reading the value of the property of the attribute of the graphic element object, and storing the value of the property as at least part of the configuration of the instantiation of the configuration element object.

11. The configuration element according to any one of the preceding aspects, wherein storing the configuration of the instantiation of the configuration element object comprises reading a selected value of the property in the configuration element object, and storing the value of the property as at least part of the configuration of the instantiation of the configuration element object.

12. The configuration element according to any one of the preceding aspects, wherein an instance of the configuration display object includes a visual representation of one or more attributes for the graphic element object.

13. The configuration element according to any one of the preceding aspects, wherein the one or more attributes for the graphic element object comprise a shape, and wherein the set of properties comprise multiple visual representations of the shape.

14. The configuration element according to any one of the preceding aspects, wherein the set of properties comprise options for one or more of a line thickness of the shape, a color of the shape, and a font of a label for the shape.

15. The configuration element according to any one of the preceding aspects, wherein the one or more attributes for the graphic element object comprise a dynamic graphical behavior, and wherein the set of properties comprise multiple visual representations of the dynamic graphical behavior.

16. The configuration element according to any one of the preceding aspects, wherein the set of properties comprise options for one or more of an animation of the dynamic graphical behavior, and a presentation of the dynamic graphical behavior.

17. The configuration element according to any one of the preceding aspects, wherein the property configured in the configuration element from the set of properties comprises a property of a shape for the graphic element object, the shape for the graphic element object configured in the instantiation of the configuration display view.

18. A method comprising: receiving, at a configuration element object instance in a configuration environment of a process plant, an indication of a configuration of at least a portion of a graphic element object in the configuration environment, the configuration element object instance (i) configured, in a configuration environment of the process plant, from a configuration element object and defining a set of properties for the graphic element object, (ii) instantiated from the configuration element object into the configuration environment, and (iii) executed, in the configuration environment, in an instance of a configuration display object, the configuration display object instance defining plurality of properties to configure the graphic element object; generating a definition of the configuration and linking the defined configuration to the graphic element object, thereby causing the configuration definition to be used in an instantiation of the graphic element object; applying, in a run-time environment, the configuration definition to the at least the portion of the graphic element object instance, thereby generating a configured graphic element object instance; and executing, in the run-time environment, the configured graphic element object instance in a display object instance, the display object instance (i) configured, in the configuration environment, from a display object, (ii) instantiated from the display object into the run-time environment, and (iii) executed in the run-time environment and thereby linked to a respective process element.

19. The method according to aspect 18, wherein the configuration display object corresponds to a plurality of properties for the graphic element object, the set of properties for the graphic element object selected from the plurality of properties to correspond to the configuration element object.

20. The method according to either one of aspect 18 or aspect 19, wherein the plurality of properties comprises one or more sets of properties, the set of properties for the graphic element object selected from the one or more sets of properties to correspond to the configuration element object.

21. The method according to any one of aspects 18-20, wherein the configuration display object includes a preview of an instantiation of the configuration element object as the configuration element object is configured.

22. The method according to any one of aspects 18-21, wherein receiving an indication of a configuration of at least the portion of the graphic element object comprises receiving a stored configuration of the instantiation of the configuration element object, the stored configuration comprising a value of a property for the graphic element object configured in the configuration element object from the set of properties for the graphic element object.

23. The method according to any one of aspects 18-22, further comprising storing the definition of the configuration, the definition of the configuration comprising a value of a property configured in the configuration element from the set of properties for the graphic element object.

24. The method according to any one of aspects 18-23, wherein storing the definition of the configuration comprises reading the value of the property of the graphic element object, and storing the value of the property as at least part of the configuration of the instantiation of the configuration element object.

25. The method according to any one of aspects 18-24, wherein storing the definition of the configuration comprises reading a selected value of the property in the configuration element object, and storing the value of the property as at least part of the configuration of the instantiation of the configuration element object.

26. The method according to any one of aspects 18-25, wherein generating the definition of the configuration comprises generating a value of a property of the graphic element object.

27. The method according to any one of aspects 18-26, wherein the configuration element object instance includes a visual representation of one or more attributes for the graphic element object.

28. The method according to any one of aspects 18-27, wherein the one or more attributes for the graphic element object comprise a shape, and wherein the set of properties comprise multiple visual representations of the shape.

29. The method according to any one of aspects 18-28, wherein the set of properties comprise options for one or more of a line thickness of the shape, a color of the shape, and a font of a label for the shape.

30. The method according to any one of aspects 18-29, wherein the one or more attributes for the graphic element object comprise a dynamic graphical behavior, and wherein the set of properties comprise multiple visual representations of the dynamic graphical behavior.

31. The method according to any one of aspects 18-30, wherein the set of properties comprise options for one or more of an animation of the dynamic graphical behavior, and a presentation of the dynamic graphical behavior.

An apparatus configured to perform any of the preceding methods or any combination of the preceding methods.

What is claimed:

1. A configuration element presented on a configuration display view for configuring a graphic element object, that is linked to a configuration element object, and to be instantiated on a process control display view corresponding to a process entity included in a process plant, the configuration element comprising:
an execution, in a configuration environment of the process plant, of an instantiation of a configuration element object that define a set of properties for an attribute of the graphic element object, the configuration element object being configurable, the configuration element object including a link to a configuration display object from which the configuration display view is instantiated, and the execution of the instantiation of the configuration element object including:
a visual representation of the set of properties for the attribute of the graphic element object; and
a link from the configuration element of the configuration display to the graphic element object to send data corresponding to a property configured in the configuration element from the set of properties, the configured property corresponding to at least one configured attribute of a graphic element to be instantiated on the process control display view based on the graphic element object, wherein the graphic element object is linked to the configuration element object via the link, wherein, upon instantiation of the configuration element object, the graphic element is displayed with the set of properties defined in the configuration element object, and wherein changes to the configuration element object propagate to graphic element objects that are linked to the configuration element object.

2. The configuration element of claim 1, wherein the configuration element object is configurable in the configuration environment of the process plant.

3. The configuration element of claim 2, wherein the configuration display object corresponds to a plurality of properties for the attribute of the graphic element object from which the set of properties is selected to correspond to the configuration element object.

4. The configuration element of claim 3, wherein the plurality of properties comprises one or more sets of properties from which the set of properties is selected to correspond to the configuration element object.

5. The configuration element of claim 4, wherein the one or more sets of properties are configurable in the configuration environment of the process plant.

6. The configuration element of claim 5, wherein the one or more sets of properties are configurable to add a property from the plurality of properties and/or delete a property from a set of properties.

7. The configuration element of claim 4, wherein the one or more plurality of properties are configurable to create a set of properties comprising selected ones of the plurality of properties.

8. The configuration element of claim 2, wherein instantiation of the configuration display view includes a preview of an instantiation of the configuration element object as the configuration element object is configured.

9. The configuration element of claim 2, further comprising storing the configuration of the instantiation of the configuration element object, the configuration comprising a value of the property configured in the configuration element from the set of properties.

10. The configuration element of claim 9, wherein storing the configuration of the instantiation of the configuration element object comprises reading the value of the property of the attribute of the graphic element object, and storing the value of the property as at least part of the configuration of the instantiation of the configuration element object.

11. The configuration element of claim 9, wherein storing the configuration of the instantiation of the configuration element object comprises reading a selected value of the property in the configuration element object, and storing the value of the property as at least part of the configuration of the instantiation of the configuration element object.

12. The configuration element of claim 1, wherein an instance of the configuration display object includes a visual representation of one or more attributes for the graphic element object.

13. The configuration element of claim 12, wherein the one or more attributes for the graphic element object comprise a shape, and wherein the set of properties comprise multiple visual representations of the shape.

14. The configuration element of claim 13, wherein the set of properties comprise options for one or more of a line thickness of the shape, a color of the shape, and a font of a label for the shape.

15. The configuration element of claim 12, wherein the one or more attributes for the graphic element object comprise a dynamic graphical behavior, and wherein the set of properties comprise multiple visual representations of the dynamic graphical behavior.

16. The configuration element of claim 15, wherein the set of properties comprise options for one or more of an animation of the dynamic graphical behavior, and a presentation of the dynamic graphical behavior.

17. The configuration element of claim 1, wherein the property configured in the configuration element from the set of properties comprises a property of a shape for the graphic element object, the shape for the graphic element object configured in the instantiation of the configuration display view.

18. A method for generating a graphic element from a graphic object element that is generated from an instance of a configuration element object that is linked to the graphic element object, the method comprising:

receiving, at a configuration element object instance in a configuration environment of a process plant, an indication of a configuration of at least a portion of a graphic element object in the configuration environment, the configuration element object instance (i) configured, in a configuration environment of the process plant, from a configuration element object and defining a set of properties for the graphic element object, (ii) instantiated from the configuration element object into the configuration environment, and (iii) executed, in the configuration environment, in an instance of a configuration display object, the configuration display object instance defining a plurality of properties to configure the graphic element object;

generating a definition of the configuration element object and linking the defined configuration to the graphic element object, thereby causing the configuration definition to be used in an instantiation of the graphic element object;

applying, in a run-time environment, the configuration definition to the at least the portion of the graphic element object instance, thereby generating a configured graphic element object instance; and executing, in the run-time environment, the configured graphic element object instance in a display object instance, the display object instance (i) configured, in the configuration environment, from a display object, (ii) instantiated from the display object into the run-time environment, and (iii) executed in the run-time environment and thereby linked to a respective process element, wherein the graphic element object is linked to the configuration element object, and wherein, upon instantiation of the configuration element object, the graphic element is displayed with the set of properties defined in the configuration element object.

19. The method of claim 18, wherein changes to the configuration element object propagate to graphic element objects that are linked to the configuration element object.

20. The method of claim 19, wherein the plurality of properties comprises one or more sets of properties, the set of properties for the graphic element object selected from the one or more sets of properties to correspond to the configuration element object.

21. The method of claim 18, wherein the configuration display object includes a preview of an instantiation of the configuration element object as the configuration element object is configured.

22. The method of claim 18, wherein receiving an indication of a configuration of at least the portion of the graphic element object comprises receiving a stored configuration of the instantiation of the configuration element object, the stored configuration comprising a value of a property for the graphic element object configured in the configuration element object from the set of properties for the graphic element object.

23. The method of claim 18, further comprising storing the definition of the configuration, the definition of the configuration comprising a value of a property configured in the configuration element from the set of properties for the graphic element object.

24. The method of claim 23, wherein storing the definition of the configuration comprises reading the value of the property of the graphic element object, and storing the value of the property as at least part of the configuration of the instantiation of the configuration element object.

25. The method of claim 23, wherein storing the definition of the configuration comprises reading a selected value of the property in the configuration element object, and storing the value of the property as at least part of the configuration of the instantiation of the configuration element object.

26. The method of claim 18, wherein generating the definition of the configuration comprises generating a value of a property of the graphic element object.

27. The method of claim 18, wherein the configuration element object instance includes a visual representation of one or more attributes for the graphic element object.

28. The method of claim 27, wherein the one or more attributes for the graphic element object comprise a shape, and wherein the set of properties comprise multiple visual representations of the shape.

29. The method of claim 28, wherein the set of properties comprise options for one or more of a line thickness of the shape, a color of the shape, and a font of a label for the shape.

30. The method of claim 27, wherein the one or more attributes for the graphic element object comprise a dynamic graphical behavior, and wherein the set of properties comprise multiple visual representations of the dynamic graphical behavior.

31. The method of claim 30, wherein the set of properties comprise options for one or more of an animation of the dynamic graphical behavior, and a presentation of the dynamic graphical behavior.

* * * * *

UNITED STATES PATENT AND TRADEMARK OFFICE
CERTIFICATE OF CORRECTION

PATENT NO. : 11,216,159 B2  
APPLICATION NO. : 15/722463  
DATED : January 4, 2022  
INVENTOR(S) : Julian K. Naidoo et al.

Page 1 of 1

It is certified that error appears in the above-identified patent and that said Letters Patent is hereby corrected as shown below:

In the Specification

At Column 1, Line 10, "2017," should be -- 2017, now U.S. Pat. No. 10,691,311, --.

At Column 1, Line 13, "2013," should be -- 2013, now U.S. Pat. No. 9,792,004, --.

At Column 9, Line 6, "DeltaV" should be -- DeltaV™ --.

At Column 12, Line 40, "Reactor 01," should be -- Reactor_01, --.

At Column 18, Line 23, "4400-440s)" should be -- 440a-440s) --.

At Column 18, Line 57, ""Water_Flow_Meter1"" should be -- "Water_Flow_Meter_1" --.

At Column 18, Line 58, ""Water_Flow_Meter1"" should be -- "Water_Flow_Meter_1" --.

At Column 18, Line 59, ""Water Flow_Meter_2"" should be -- "Water_Flow_Meter_2" --.

At Column 46, Line 29, "usage CI" should be -- usage C1 --.

At Column 46, Line 33, "UsageC1" should be -- Usage C1 --.

At Column 49, Line 13, "Rect1" should be -- Rect 1 --.

Signed and Sealed this  
Eleventh Day of November, 2025

John A. Squires  
*Director of the United States Patent and Trademark Office*